(12) United States Patent
Jackson et al.

(10) Patent No.: US 11,868,445 B2
(45) Date of Patent: Jan. 9, 2024

(54) SYSTEMS AND METHODS FOR FEDERATED SEARCHES OF ASSETS IN DISPARATE DAM REPOSITORIES

(71) Applicant: DISCOVERY COMMUNICATIONS, LLC, Silver Spring, MD (US)

(72) Inventors: Beth Jackson, Silver Spring, MD (US); William C. Hurst, Silver Spring, MD (US); Chris Goodacre, Silver Spring, MD (US); Melissa Roberts, Silver Spring, MD (US); Lisa Seeto, Silver Spring, MD (US); Pedro Lopez, Silver Spring, MD (US); Jarrod Clift, Silver Spring, MD (US); Brant Boehmann, Silver Spring, MD (US); Dennis Killingsworth, Silver Spring, MD (US)

(73) Assignee: DISCOVERY COMMUNICATIONS, LLC, Silver Spring, MD (US)

( * ) Notice: Subject to any disclaimer, the term of this patent is extended or adjusted under 35 U.S.C. 154(b) by 307 days.

(21) Appl. No.: 16/987,795

(22) Filed: Aug. 7, 2020

(65) Prior Publication Data

US 2021/0034714 A1    Feb. 4, 2021

Related U.S. Application Data

(63) Continuation-in-part of application No. 16/445,666, filed on Jun. 19, 2019, now Pat. No. 10,769,248, (Continued)

(51) Int. Cl.
*G06F 21/00* (2013.01)
*G06F 21/10* (2013.01)
(Continued)

(52) U.S. Cl.
CPC .......... *G06F 21/10* (2013.01); *G06F 16/9024* (2019.01); *G06Q 50/184* (2013.01); *G06F 21/1015* (2023.08)

(58) Field of Classification Search
None
See application file for complete search history.

(56) References Cited

U.S. PATENT DOCUMENTS

| | | |
|---|---|---|
| 7,996,449 B2 | 8/2011 | Chun et al. |
| 8,015,159 B2 | 9/2011 | Boicey et al. |

(Continued)

FOREIGN PATENT DOCUMENTS

| | | |
|---|---|---|
| WO | 00/45294 A1 | 8/2000 |
| WO | 2014037914 A2 | 3/2014 |
| WO | 2018144536 A1 | 8/2018 |

OTHER PUBLICATIONS

Kilic, Ozgur et al. Providing Interoperability of eHealth Communities Through Peer-to-Peer Networks. IEEE Transactions on Information Technology in Biomedicine, vol. 14, Issue: 3. https://ieeexplore.ieee.org/stamp/stamp.jsp?tp=&arnumber=5447733 (Year: 2010).*

(Continued)

*Primary Examiner* — Jeremiah L Avery
(74) *Attorney, Agent, or Firm* — Bookoff McAndrews, PLLC

(57) ABSTRACT

A central asset registry and associated satellite registries tie Digital Asset Management (DAM) repositories and satellite repositories into a unified enterprise system. The system removes rights and asset relationship tracking from the DAMs and the satellites by gathering asset metadata tags and capturing digital asset rights and relationships between assets to improve speed, scalability, and flexibility in analyzing and traversing networks of rights and relationships of digital assets. The central asset registry and the satellite (Continued)

registries use a pluggable architecture and track and store multi-dimensional relationships as an asset hierarchy. The asset hierarchy and rights model depicts rights and relationship data between the assets and provides a flexible array of asset types and properties for addition of new assets, new asset types, and new rights without re-factoring the other data, nodes, and edges. The system uses asset metadata to create edge relationships between the assets. The combination of the satellite registries and the central asset registry facilitates queries and retrieval of the media assets.

20 Claims, 23 Drawing Sheets

Related U.S. Application Data which is a continuation of application No. 15/420,478, filed on Jan. 31, 2017, now Pat. No. 10,372,883, which is a continuation-in-part of application No. 15/192,145, filed on Jun. 24, 2016, now Pat. No. 10,452,714.

(51) Int. Cl.
G06F 16/901 (2019.01)
G06Q 50/18 (2012.01)

(56) References Cited

U.S. PATENT DOCUMENTS

| | | |
|---|---|---|
| 8,078,618 B2 | 12/2011 | Vanepps et al. |
| 8,166,076 B2 | 4/2012 | Chen et al. |
| 8,214,394 B2 | 7/2012 | Krishnaprasad et al. |
| 8,266,138 B1 | 9/2012 | Collins |
| 8,296,682 B2 | 10/2012 | Sloo |
| 8,311,983 B2 | 11/2012 | Guzik |
| 8,429,131 B2 | 4/2013 | Blumenau et al. |
| 8,583,644 B2 | 11/2013 | Bedingfield, Sr. |
| 8,601,467 B2 | 12/2013 | Hofhansi |
| 8,626,877 B2 | 1/2014 | Greene et al. |
| 8,674,993 B1 | 3/2014 | Fleming et al. |
| 8,688,583 B2* | 4/2014 | Boccon-Gibod ... H04L 63/0492 705/50 |
| 8,799,945 B2 | 8/2014 | Ozawa et al. |
| 8,818,929 B2 | 8/2014 | Fraboulet-Laudy et al. |
| 8,886,674 B1 | 11/2014 | Chaudhry et al. |
| 8,954,441 B1 | 2/2015 | Baranov et al. |
| 8,977,646 B2 | 3/2015 | Abrams et al. |
| 9,589,250 B2 | 3/2017 | Palanisamy et al. |
| 2002/0032626 A1 | 3/2002 | Dewolf et al. |
| 2002/0033844 A1 | 3/2002 | Levy et al. |
| 2002/0103818 A1 | 8/2002 | Amberden |
| 2002/0188841 A1 | 12/2002 | Jones et al. |
| 2003/0074471 A1 | 4/2003 | Anderson et al. |
| 2003/0130953 A1 | 7/2003 | Narasimhan et al. |
| 2004/0034622 A1 | 2/2004 | Espinoza et al. |
| 2004/0148503 A1 | 7/2004 | Sidman |
| 2005/0131825 A1 | 6/2005 | Vijay |
| 2005/0132120 A1 | 6/2005 | Vijay |
| 2005/0182825 A1 | 8/2005 | Eytchison |
| 2006/0085370 A1 | 4/2006 | Groat et al. |
| 2006/0229911 A1* | 10/2006 | Gropper .......... G16H 10/60 705/2 |
| 2007/0073767 A1 | 3/2007 | Springer, Jr. et al. |
| 2007/0156726 A1* | 7/2007 | Levy .............. H04N 21/252 |
| 2007/0180468 A1 | 8/2007 | Gill et al. |
| 2007/0192140 A1* | 8/2007 | Gropper .......... G06F 21/6245 715/205 |
| 2008/0140433 A1* | 6/2008 | Levy .............. H04N 21/2543 705/26.1 |
| 2008/0253403 A1 | 10/2008 | Bondy |
| 2009/0076872 A1 | 3/2009 | Gosain |
| 2009/0222329 A1* | 9/2009 | Ramer .......... G06Q 30/0261 707/999.009 |
| 2009/0254562 A1 | 10/2009 | Casaccia |
| 2009/0254572 A1* | 10/2009 | Redlich .......... G06Q 10/06 |
| 2010/0010968 A1* | 1/2010 | Redlich .......... G06Q 10/00 707/E17.046 |
| 2010/0036879 A1 | 2/2010 | Friese et al. |
| 2010/0063877 A1* | 3/2010 | Soroca .......... G06F 16/68 705/14.46 |
| 2010/0251291 A1 | 9/2010 | Pino, Jr. et al. |
| 2010/0306197 A1 | 12/2010 | Jin et al. |
| 2010/0325140 A1 | 12/2010 | Hubner et al. |
| 2011/0126235 A1 | 5/2011 | White et al. |
| 2012/0078954 A1 | 3/2012 | Araya |
| 2012/0110043 A1 | 5/2012 | Cavet et al. |
| 2012/0221610 A1 | 8/2012 | Murphy et al. |
| 2012/0246105 A1* | 9/2012 | James .......... G16H 40/20 706/46 |
| 2012/0246734 A1 | 9/2012 | Pride et al. |
| 2013/0031364 A1* | 1/2013 | Glew .......... G06F 21/72 726/1 |
| 2013/0073387 A1 | 3/2013 | Heath |
| 2013/0073389 A1 | 3/2013 | Heath |
| 2013/0073473 A1 | 3/2013 | Heath |
| 2014/0068437 A1 | 3/2014 | Dedapper et al. |
| 2014/0195675 A1 | 7/2014 | Silver |
| 2014/0244429 A1 | 8/2014 | Clayton |
| 2014/0245166 A1 | 8/2014 | Morton |
| 2014/0304836 A1 | 10/2014 | Velamoor |
| 2014/0365468 A1 | 12/2014 | Ormont et al. |
| 2015/0006656 A1 | 1/2015 | Sinha et al. |
| 2015/0063102 A1 | 3/2015 | Mestery et al. |
| 2015/0163206 A1* | 6/2015 | McCarthy .......... H04L 63/104 726/4 |
| 2015/0193437 A1 | 7/2015 | Fleischman et al. |
| 2015/0213129 A1 | 7/2015 | Pingree |
| 2015/0310188 A1* | 10/2015 | Ford .......... H04L 63/0428 726/28 |
| 2017/0017986 A1 | 1/2017 | Mathis et al. |
| 2017/0041296 A1 | 2/2017 | Ford |
| 2017/0372043 A1 | 12/2017 | Hurst et al. |
| 2018/0137301 A1 | 5/2018 | Avery |
| 2019/0362052 A1 | 11/2019 | Hurst et al. |

OTHER PUBLICATIONS

Popp, Robert, L.; Yen, John. Anonymized Semantic Directories and a PrivacyEnhancing Architecture for Enterprise Discovery. Wiley-IEEE Press. https://ieeexplore.ieee.org/xpl/ebooks/bookPdfWithBanner.jsp?fileName=5444215.pdf&bkn=5444075&pdfType=chapter (Year: 2006).*

Sarkar, Pushpak. Master Data Services. Wiley—IEEE Press. https://ieeexplore.ieee.org/xpl/ebooks/bookPdfWithBanner.jsp?fileName=7268721.pdf&bkn=7268394&pdfType=chapter (Year: 2015).*

Cabri, G. et al. Web-assisted visits to cultural heritage. Proceedings Tenth IEEE International Workshop on Enabling Technologies: Infrastructure for Collaborative Enterprises. WET ICE 2001. https://ieeexplore.ieee.org/stamp/stamp.jsp?tp=&arnumber=953444 (Year: 2001).*

International Search Report and Written Opinion in International Application No. PCT/US2018/016142, dated Apr. 24, 2018.

Geer, David. Federated Approach Expands Database-Access Technology. Computer, vol. 36, Issue: 5. https://ieeexplore.ieee.org/stamp/stamp.jsp?tp=&arnumber=1198230 (Year: 2003).

Bhatti, Rafae, et al. Engineering a Policy-Based System for Federated Healthcare Databases. IEEE Transactions on Knowledge and Data Engineering, vol. 19, Issue: 9. https://ieeexplore.ieee.org/stamp/stamp.jsp?tp=&arnumber=4288147 (Year: 2007).

Kemp, Graham J.L. et al. Rewrite Rules for Quantified Subqueries in a Federated Database. Proceedings Thirteenth International Conference on Scientific and Statistical Database Management. SSDBM 2001. https://ieeexplore.ieee.org/stamp/stamp.jsp?tp=&arnumber=938546 (Year: 2001).

Bhatti, Rafae, et al. X-Federate: A Policy Engineering Framework for Federated Access Management. IEEE Transactions on Software

(56) References Cited

OTHER PUBLICATIONS

Engineering, vol. 32, Issue: 5. https://ieeexplore.ieee.org/stamp/stamp.jsp?tp=&arnumber=1642680 (Year: 2006).
Ghandhi et al., "Delinearizing Television—An Architectural Look at Bridging MSO Experiences with OTT Experiences," Motorola Mobility, Inc., May 22, 2012, Spring Technical Forum Presentation.
PCT International Search Report and Written Opinion for PCT International Application No. PCT/US2020/045377 dated Jan. 7, 2021.

* cited by examiner

SYSTEMS AND METHODS FOR FEDERATED SEARCHES OF ASSETS IN DISPARATE DAM REPOSITORIES

CROSS-REFERENCE TO RELATED APPLICATIONS

This application is a continuation-in-part of U.S. patent application Ser. No. 16/445,666 filed on Jun. 19, 2019, which is a continuation of U.S. patent application Ser. No. 15/420,478 filed on Jan. 31, 2017 (now U.S. Pat. No. 10,372,883 issued on Aug. 6, 2019), which is a continuation-in-part of application Ser. No. 15/192,145 filed on Jun. 24, 2016 (now U.S. Pat. No. 10,452,714 issued on Oct. 22, 2019). The disclosures of all these applications are incorporated by reference in their entirety in this application.

TECHNICAL FIELD

This technology relates to storing, tracking, accessing, and distributing media assets to viewers and business partners. More particularly, the technology relates to systems and methods to flexibly integrate multiple sets of Media Asset Management (MAM) repositories capturing the complex relationships between assets to provide rapid asset navigation, storage, search and retrieval and to managing inbound and outbound intellectual property rights to media assets. The technology also relates to systems and methods for searching content, viewing metadata, viewing content, and collecting media asset information across multiple sets of MAM repositories.

BACKGROUND

Devices that capture and produce still images, video images, audio recordings, animations, and other types of audio, visual, and written content allow the creation of large collections of media assets, including digital media assets. These assets can be stored in a common storage location or distributed across a wide variety of storage locations. The assets may also be physically stored on a wide variety of devices such as tape or computer disk. As the number and size of media assets increases and the storage devices become large and varied, it is increasingly difficult to navigate through the assets to locate and access particular content of interest.

Media companies have thousands of assets with complex, opaque, and multi-dimensional relationships to each other. The assets can be spread across many different institutions, facilities, and vendors. Broadcasters and those entities that deliver these assets must navigate these interconnections on a daily basis, and problems in one system can quickly transmit throughout the enterprise, impacting any number of other business processes in their wake. Understanding and managing relationships between assets is important for many key functions in the enterprise, including content delivery, licensing, advertising, and financial reconciliation. For example, advertising analysts need a clear, detailed understanding of asset viewing and license limitations to calculate values and expected returns on these assets. Yet, broadcasters struggle to understand and analyze the complex web of relationships that are fundamental to their daily operations.

Media asset management involves many diverse disciplines and requires data of various kinds, from a wide array of sources. Multi-platform media companies harness and manage assets from disparate sources to deliver interactive and engaging user experiences. The existing processes for gathering asset metadata and capturing relationships between assets is often manual, ad-hoc, and frequently, difficult to repeat or update. Conventional commercial Media Asset Management (MAM) systems require inclusion of all metadata into a single MAM system to capture relationships. This limits the choice of system to a single vendor or suite. The result is a monolithic system that cannot change quickly as new asset types or business needs are introduced.

Many current asset management tools and techniques focusing on relational databases lack both the necessary speed and flexibility to analyze and traverse networks of relationships in a media asset environment.

Distribution of video content is rapidly expanding across multiple platforms, each with different display characteristics and ability to interact with related content. In order to program and distribute efficiently across multiple platforms, content distributors must be able to quickly select a collection of related assets and bundle them for distribution.

The global nature of content creation and distribution combined with regional laws and restrictions has resulted in the need for local and regional satellite MAM systems that still provide a view into a global inventory.

While the scope and inventory of content is becoming global, increasingly diverse business activities in content distribution, licensing, and other initiatives affected by media rights are also driving the creation of complex content distribution packages. The complex content distribution packages incorporate diverse content elements and content types consumed by end users in non-traditional manners, including non-linear video (e.g., interactive multimedia content), social media, and third-party content distributors. This explosion of distribution channels and content packaging results in the need for equally complex hierarchical intellectual property rights administration to support the many asset monetization opportunities.

Companies may have extremely large libraries of media assets that are spread across multiple disparate media asset management systems and platforms. The large volume of media assets and the disparate systems and platforms in which the assets reside often results in an inability of users to find and access assets in a timely fashion. This often results in costly re-creation of the media assets or missed business and distribution monetization opportunities. Searching large volumes of media assets across different platforms can be time consuming and inefficient and can exacerbate difficulties in searching, locating, and accessing the assets.

Conventional commercial Media Asset Management (MAM) systems require inclusion of all metadata and assets into a single MAM system to capture relationships (e.g., relationships between assets, relationships between assets and people, relationships between assets, people, and organizations). This limits the choice of a MAM system to a single vendor or suite. The result is a monolithic system that cannot change quickly as new asset types or business needs are introduced and a system that is not well suited to all asset types. For example, the business needs for managing a recipe database are very different than for managing videos or photography. Users of DAM systems need to be able to view all asset types with their metadata and the relationships between them without a deep knowledge of the digital asset management systems. These existing commercial systems also have restrictive data models that, because they are more focused on the media assets themselves, cannot represent all of these entities as needed to provide the orbital searches that are critical to content exploration and usage (such as showing all content related to a particular talent).

SUMMARY

Media asset libraries include hundreds of thousands of media assets with complex, opaque, and multi-dimensional relationships to each other and to people and organizations. In order to explore, research, manage, and exploit this inventory of assets, users need a way to search and view inventory of different types of assets, relationships between them (such as which photos and recipes are related to an episode) and related information (such as talent, vendors, locations, and restaurants, for example). These media assets often are stored in specialized digital asset management systems determined by the type of asset and storage locations. For maximum efficiency, users need a technique for visualizing and accessing the assets and relationships that does not require knowledge of the specific digital asset management systems and that consolidates the information into an easily consumable format. The systems and methods of the invention provide visualization of media assets, relationships between them, and related people and organizations. The systems and methods of the invention provide an application layer on top of Media Asset Management (MAM) infrastructure as a single point for content discovery throughout the enterprise. The invention provides searching, viewing (of both content and content metadata), retrieving, curating, and processing capabilities across different MAM repositories to efficiently monetize the media. The media search invention builds an improved index for a search engine from all asset repositories and asset registries. The invention provides technical improvements over existing systems to exploit best-of-breed MAM (and DAM) repositories that are configured and optimized for each media asset type. The invention provides an enterprise-wide search of still images, recipes, and videos housed in separate repositories, as well as related people and organizations, and presents a hierarchical structure of assets using an intuitive user interface. Using the interface, operators can act on individual or groups of media assets by launching connected workflows such as editing, downloading files, or ordering assets for distribution. This single platform allows global accessibility, business evolution, and simpler technology updates.

The media search invention provides improved capabilities related to searching, viewing, and accessing media assets in repositories around the world. The invention provides improved availability, ease of information sharing, and enhanced interfaces and search capabilities for assets of all types. The invention provides improved search capabilities of digital content including videos, recipes, and still images. Real-time index updates are available as well. Searches may be personalized, filtered, saved, and shared. Metadata can be exported using systems and methods of the invention, and parametric searches can be performed.

Similar capabilities can be exploited when using the invention to view assets. For example, users can browse assets and view videos, recipes, and still images as well as rights associated with those assets. Viewing details can be personalized and saved for individual users or groups. The invention provides expanded media cart capabilities. Users can select groups of assets and place them in the media cart. The selected assets can then be edited individually or in a batch mode. Users can also request additional media (e.g., transcodes, recipes, etc.), create episodic versions of the asset, and download images. The invention provides the capability to download and/or transcode instances of the carts and includes a search service, mobile support, and a media asset search application.

The invention includes services and applications that identify search results, asset details, related assets, and other metadata. The search results may be identified using keywords or IDs, for example. Other services identify deliverables, proxies, recipes, still images, and closed captioning files. Additional processes perform bulk operations, such as downloading multiple files, adding multiple items to an asset cart, and exporting asset metadata.

The systems and methods of the claimed invention provide a central asset registry of media assets to tie together multiple Digital Asset Management (DAM) repository systems into a unified whole. By tying together multiple DAMs, the systems and methods of the claimed invention can optimize different DAMs for each major media asset type (e.g., video, recipes, images, writings, and the like). Implementing a centralized registry in accordance with the claimed invention allows the use of a pluggable system architecture. Digital Asset Management (DAM) systems are more general cases of Media Asset Management (MAM) systems. That is, Media Asset Management (MAM) systems include digital assets that are media assets. In this document, the terms are used interchangeably.

Removing the tracking of asset relationships from the Media Asset Management (MAM) repository and creating a central asset registry elegantly addresses problems with gathering asset metadata (with tags, for example) and capturing relationships between assets and provides the necessary speed, scalability and flexibility to analyze and traverse networks of relationships in a media asset environment.

The central asset registry tracks and stores the multi-dimensional relationships between the assets. Relationships such as show/series/episode "part of" hierarchies, inbound and outbound intellectual property rights inheritances, media "version" and "variant" derivation histories, "reference" relationships for ancillary materials, and ad-hoc grouping of assets into sets or containers all can be done in the central asset registry. Adding new relationship types is then just a change to the central asset registry, not to the individual MAM repositories.

While MAM repositories are usually implemented using a relational database, the central asset registry, as a separate system, can be implemented in any desired technology. In fact, the tracking of relationship and identifier information is an ideal candidate for a graph database. The "graph" in graph database refers to relating objects together as a mathematical graph structure. The entire graph area of mathematics is dedicated to studying and representing relationships. Therefore, the use of a graph database for the central asset registry simplifies the expression of the asset hierarchy, enables flexibility in adding relationship types dynamically, allows rapid retrieval from the asset hierarchy, and opens up analytical opportunities not easily available from other database types.

The systems and methods of the claimed invention use graph databases to implement a central asset registry as it relates to a media asset system, such as a multi-platform media company, including a cable television network. Likewise, over-the-top (OTT) and other forms of media distribution can also use the systems and techniques of the claimed invention. The systems implement a central asset registry in conjunction with one or more media asset repositories. Each repository that is referenced by the central asset registry is abstracted by a proxy service masking the underlying platform specifics and repository representation.

Instead, a uniform record is created in the central asset registry. Needed assets types and supporting repositories can be added quickly and normalized at the registry layer.

The claimed invention provides an analytical and visual depiction of relationship data. The systems and methods provide graph objects corresponding to the relationship data of media assets and categorize the graph objects that represent a network structure. Instead of storing all the asset metadata in one database along with the relationships, the asset metadata can be spread over multiple MAM databases with the relationships consolidated to a central graph database registry. The central asset registry of the claimed invention stores its data (and allows queries of the data) in the form of a graph, or network-like structure. The graph database of the claimed invention provides performance advantages over conventional relational databases and object-oriented databases.

The claimed invention provides a system and method of organizing cable television and other non-linear media content into a hierarchical tree of nodes. Each node can represent media content, such as a television show, season, episode, segment, or other content. The system can navigate between nodes of the graph with a user interface. In one example embodiment, the system employs a property graph data model with nodes, relationships, properties, and labels. The nodes function as containers for properties. The system uses nodes to represent "things" or "entities" or other things with identities in the realm of media assets, such as cable television content and other non-linear media content including videos viewed on websites, social media, standalone kiosks, and the like. Every node can contain one or more "properties," and the properties represent attributes or qualities of the nodes. The nodes connect or relate to one another with "relationships." Each relationship has a name and a direction to help structure the overall data set and to lend semantic clarity to the data set to understand the context of each of the nodes. The system also attaches properties to the relationships to denote a quality of that relationship (e.g., a qualifier, a weight, etc.). The system also uses metadata (tags) to denote qualities such as a time stamp, or a version number, or the like. Further, the system uses "labels" to assign roles to the nodes. The system can attach one or more labels to each of the nodes to represent the role(s) the node plays within the cable television media asset hierarchy. Labels allow the system to index and group the nodes and to associate specific constraints with the nodes.

The system user interface applications and associated services provide graphical data representing related content (assets) within the hierarchy of the assets consolidated from multiple MAM repositories. The services can be independent software components that can be called from other software components. For example, a service may look up information in a database and return metadata about an asset. Services are independent in that they are packaged and deployed separately to run on a given computer system. Services can call other services. The central asset registry itself and the various underlying repositories are exposed via a software service tier. The service tier provides a single programmatic interface to access asset information across all the integrated repositories. Requesting systems or users require no direct access to the underlying repositories, and security and access control can be enforced outside of the federated repositories. The service tier also abstracts the location of the repositories from the requesting agent. By providing uniform access to the data, the service tier is analogous to a Domain Name System (DNS) for assets. Physical retrieval of the asset instance is also supported at the service tier level supporting potentially long running asynchronous transfers of large files.

The system user interface browses the hierarchy levels of related assets. For example, the related media assets can include an ordered sequence of television show seasons, episodes for each season, video segments for each episode, and the like. The services and user interface applications allow the system to traverse the assets by any relationship type such as rights inheritance, derived assets, versions, reformats, reference assets, and the show/series/episode hierarchies example above. Additionally, the node and edge flexibility of the central asset registry allows the creation of arbitrary containers of assets sets called collections and media carts. This approach provides the flexibility to add new node types and edges while maintaining backwards compatibility. Older systems using the data can continue to use the old relationships to traverse, while new systems can take advantage of the new relationships and node types (such as abstract episode, for example).

Users navigate through the node tree by providing input to traverse to a sibling node (within the same level of the hierarchy) or to a parent or child node (to a different level of the hierarchy). Nodes of the hierarchy can be represented through an interface in a row of graphical content or images.

The media search invention allows internal users and partners to search for shows, episodes, collections, non-linear videos, still images, recipes, people, and organizations across the various MAMs throughout worldwide locations and to access those assets from any location. The invention provides a variety of filters to narrow the search results. Users can browse through listings of shows for each brand, search using rich metadata such as keywords or titles, and search for multiple videos using lists of different internal identifiers. The invention's user interfaces provide easy navigation between different pages and tabs to find more details. Users can view and download video files, closed caption, and production deliverables and can add videos and recipes to a media cart for exporting metadata to other applications or to initiate workflows in other applications.

The systems and methods of the invention provide benefits over previous systems by providing a computer infrastructure and framework to search, access, and monetize media assets across multiple platforms and distribution channels. The additional application layer over the MAMs provides seamless search/access/distribute across federated repositories. With the computer architectures and applications of the invention, queries do not have to be customized for particular MAMs or particular vendors, and all assets are available to users via a unified access point and a single application across enterprise-wide databases in global locations. The invention provides improved asset availability and provides a cohesive view of related media assets across asset types. For example, a user may view an episode along with its related recipes, still images, production deliverables, people, and organizations. The media search invention provides a modular cart with enhanced security controls around data to support changing business needs, including launching workflows in other applications, easier sharing of assets, and business partner use. The media search invention updates the layout of data to ensure that the placement of the data and the needs of the computer systems align with business needs.

The system and method of the claimed invention provides benefits over previous systems because it can store, manage and represent complex relationships of media assets used by broadcasters, including assets of similar types, of hierarchical relationships, between companies, and among people.

The systems and methods of the claimed invention are modular and can be integrated with any number of MAM repositories, and new relationships and node types can be added at any time. The data corresponding to real-world relationships can be stored in a database in a structure corresponding to the relationships that exists in the digital media field, making manipulation, searching, and representation of the data in the database more efficient and effective. In some embodiments, the graph engine can include an ontological structure, which is represented in the same manner as the asset relationship data. This provides an analytics, querying, and data input platform to maximize the utility of the representations presented to a user and the overall computational power of the graph engine. The system is fast and scalable and can thus analyze millions or billions of relationships quickly, accurately and flexibly. For example, query times for finding related items in a graph with 2.5 million nodes and 60 million edges averages under 5 milliseconds (ms), even when hosted on modest computer hardware. Conventional relational database queries that depended upon many "join" commands or many recursive joins can be performed many times faster on a graph database, as the traversal query time can be constant no matter how big the graph grows. Traversals in relational databases always get slower as the size of the database increases.

Pulling the relationship information together into a central asset registry of the claimed invention provides a single system with a complete picture of the complex relationships between assets. The resultant database can be quickly searched, using many underlying database implementation technologies. Various database technologies can be used for the central asset registry including search indexes such as Elasticsearch or Solr, relational databases such as Oracle or MySQL, Lightweight Directory Access Protocol (LDAP) directories, or noSQL databases such as a graph database.

Alternate, traditional approaches involving joins over multiple MAM relational databases or polling over multiple MAM systems all result in much more CPU-intensive and IO-intensive computations. The resultant relationship calculation using traditional approaches is more complex, slower, and more expensive from a resource perspective.

Although large improvements in search complexity and speed are due to the centralization of the registry, the choice of central asset registry technology further improves search speed and performance. One example implementation discussed below involves the use of a graph database. Graph database traversal time can be a constant no matter how big the graph grows. This is known as O(1) behavior in "Big O" notation for computational complexity. Traversals using other database technologies, such as relational databases like Oracle, always get slower as the size of the database increases. The best such databases can achieve is O(n) without an index (linear increase in time) or O(log n) at best with an index.

The central asset registry of the claimed invention uses graph structures for semantic (meaning) queries with nodes, relationships, and properties to represent and store media asserts. Semantic queries enable the retrieval of both explicitly and implicitly derived information based on syntactic (rules), semantic (meaning), and structural information contained in data (media assets). Semantic queries deliver precise results or answer more fuzzy and wide open questions through pattern matching and digital reasoning. When querying a graph database of the claimed invention, the query processes the actual relationships between information (nodes) and infers the answers from the network of data.

Each node in the graph database directly and physically includes a list of relationship-records that represents its relationships to other nodes. The relationship records are organized by type and direction.

The central asset registry graph database of the invention associates information with names to each of the participating entities. The registry node in the graph database acts as a proxy to the real asset stored in one of (possibly) many repositories. This allows the system to have multiple asset repositories (e.g., still image repository, video image repository, recipe repository, etc.) and allows the system to recognize any of the assets across any of the repositories and makes the overall solution look and feel like a single repository. The use of a service layer provides an abstraction layer over the multiple asset repositories. When combined with the central asset registry, the service layer can then transparently direct asset retrieval to the appropriate asset repository.

The central asset registry can maintain a variety of relationships. In addition to those described above, the central asset registry of the claimed invention can track inbound and outbound rights associated with assets over all the MAM repositories. Such rights tracking can be done by enhancing the central asset registry to track relationships between assets and a contract(s) that bears the rights for that asset. In one example implementation, rights are hierarchical. For example, the contract at the show level can be different from a contract at the series level, which can be different then a contract at the episode level. The rights are the composition of these contracts tied together. Having rights tied to the asset hierarchy makes it easier to resolve the rights at any given episode or any given time. The systems and methods of the claimed invention allow users to fold in restrictions as well. For example, inbound rights of a media distributor to a show can include all territories in perpetuity. In licensing the outbound rights to another entity, the outbound rights can be a subset of the inbound rights, such as an exclusive right to a Canadian broadcaster to show the episode in Canada for six months. These rights and restrictions can all be reflected as data on the graphs.

The extensible nature of the central asset registry not only allows incorporation of multiple MAM repositories and inheritable attributes such as intellectual property rights, but also provides a way to add new relationship dimensions. For example, the system supports adding geographical relationships to quickly find episodes about restaurants in Chicago or locations within an arbitrary map polygon.

The claimed invention includes a system and method to create a single, uniform, highly performant view of multiple federated repositories. One example implementation includes a system for managing digital assets in a distributed repository framework. The system includes a plurality of federated repositories connected to a network, and each of the plurality of federated repositories maintains digital assets with metadata tags. The system also includes a central registry of digital assets. The central registry of digital assets receives relationship information, asset identifiers and location information concerning the digital assets from the plurality of federated repositories based on the metadata tags of the digital assets when a digital asset is saved to one of the plurality of federated repositories. The central registry of digital assets stores the relationship information and location information of the digital asset to provide a comprehensive view of the digital assets in the plurality of federated repositories that make up the system.

The system of the invention can include a central asset registry with an asset relation hierarchy that allows rapid navigation and read performance across assets held in multiple repositories. Likewise, the central asset registry can include an asset relationship hierarchy incorporating multiple media types.

In one example system, the central asset registry of digital assets is a graph database. The graph database can include a registry node as a proxy to a corresponding digital asset stored in at least one of the federated repositories. The graph database objects can show a hierarchy of the assets. For example, the graph database can include graph objects corresponding to the relationship data of the digital assets and a categorization of the graph objects representing a hierarchy of the digital assets. Additionally, the graph database can include a property graph data model with nodes, relationships, properties, and labels in a hierarchy of the digital assets.

A system for managing digital assets in a distributed repository framework in accordance with the claimed invention can include a central asset registry that includes a uniform record to each of the digital assets.

Additionally, the system can include a pluggable architecture that provides a proxy of multiple repositories and media types. For example, in one embodiment, the plurality of federated repositories includes at least one pluggable digital asset management (DAM) repository. Further, the pluggable repository can be configured to house a single digital asset type to allow optimization for that asset type. The single digital asset type can be still images, videos, text, recipes, and the like.

In one example implementation, the system for managing digital assets in a distributed repository framework can also include a proxy service masking underlying platform information to abstract the plurality of federated repositories and provide a single interface to the plurality of federated repositories. The systems of the invention have the ability to federate repositories and access to assets in disparate geographic locations, such as when the federated repositories are located in disparate geographic locations.

In some implementations, the central asset registry includes a rights registry. The central asset registry receives rights information concerning the digital assets from the plurality of federated repositories based on the metadata tags of the digital assets when a digital asset is saved to one of the plurality of federated repositories. The relationship registry and/or rights registry is a pluggable architecture.

The structure of the invention provides the ability to rapidly add new media types and relationships to other assets while scaling efficiently. For example, digital assets saved to one of the plurality of federated repositories can include a new relationship type of relationship information based on the metadata tag of at least one digital asset. Similarly, digital assets saved to one of the plurality of federated repositories can include a new asset type or new media type that includes relationship information and location information concerning the new media type digital asset based on the metadata tag of the at least one digital asset. The central asset registry updates the database(s) based on the new media type of asset and its relationship information. That is, the central asset registry receives the new media type relationship information and location information when the new media type digital asset is saved to one of the plurality of federated repositories and updates the comprehensive view of the digital assets in the plurality of federated repositories that make up the system.

In one example embodiment of the invention, the system for managing digital assets in a distributed repository framework includes a service tier that provides a programmatic interface to access digital asset metadata across the plurality of federated repositories. Also, the system can include a digital asset service configured to read metadata tags in the digital assets stored in the federated repositories and provide the metadata tags to the central asset registry.

The systems and methods for managing digital assets in a distributed repository framework of the claimed invention provide additional capabilities and performance not available with previous systems, both in terms of flexibility to integrate with other commercial systems and in the ability to optimize repositories and registries for each type of data.

Just as a central registry can be used to integrate diverse repositories into a single overall MAM, another configuration of the invention uses a central registry to link together a hierarchy of satellite MAM systems in one overall MAM. This satellite and central registry system automatically assesses intellectual property rights and inventory related to large numbers of digital assets, including video assets and the like, stored in satellite MAMs where each satellite MAM includes one or more repositories and a local registry. The system recognizes the location of the repository (or repositories) in which the digital asset resides. The system utilizes a (web) service layer to create a local view of each satellite MAM as well as a unified view across all the multiple satellite MAMs. Each satellite MAM may contain one or more repositories appropriate for the various asset types as outlined above. Additionally, each satellite MAM includes a local registry integrating the local repositories and linked back to the central registry. For example, a recipe for a Brazilian chicken dish can be stored in a recipe repository in Virginia and/or another repository in Sao Paolo where the asset was created. The service layer and central registry brings the local asset registries and repositories together as a single, unified view, regardless of the type and location of the asset repository and asset registry. Thus, the central registry records the Brazilian chicken dish asset having local copies in a Virginia MAM and Sao Paolo MAM.

The rights registry system associates an asset to a set of inbound and outbound intellectual property rights derived from the contract for that asset. Because rights are hierarchical, just like the assets, there may be a set of intellectual property rights associated at the show level, another set at the series level, and yet another at an episode level. The system determines the rights as the combination/composition of the hierarchies. The system ties the rights to the asset hierarchy to resolve the actual rights a user has in any given asset or at any given point in time.

The system also folds in restrictions as well. A contract for a particular show may include inbound intellectual property rights to the system with restrictions on the outbound rights that can be granted. The satellite and central registry can reflect the rights and restrictions in a graph database or other suitable persistent store. For example, the graph database of the invention can concisely represent the intellectual property rights associated with the assets. The graph database abstracts the hierarchies into a network of relationships where any entity can be related to any other. Intellectual property rights are linked to assets, and restrictions and terms may be attributes on the graph edges linking the nodes. Restrictions and terms include territory, time ranges, and language. Intellectual rights may then be traversed to include restrictions such as "find all assets with non-allocated rights in Mexico for a given time frame."

The relationships of assets and intellectual property rights leads to a data network that can be navigated or traversed in the same hierarchy as the media, and any related information can be retrieved quickly from any starting point. Although other persistent database stores are possible, the flexibility and scalability of the graph database accurately represents intellectual property rights at each level of the rights hierarchies and at each level of the asset hierarchy. The graph structure of the relationships allows analysis of asset and market sectors, content creation and distribution partnerships, and other opportunities not evident with traditional databases, which are unable to scale to support the types of data volumes and flexibility required for modeling the rights relationships. As outlined above, a URI is used for identifying data resources and metadata, and a federated platform query accesses multiple types of data using that URI, regardless of the location and type of database in which the asset is stored.

Satellite systems may be nested to form a hierarchy. An example is shown in FIG. 12 where Satellite B 1151 might represent a regional European system which further supports Satellite B1 1251 and Satellite B2 1252 systems which might represent United Kingdom and Polish local systems.

Performance enhancements over other available systems is enabled by a combination of nested, federated satellite systems (e.g. Satellite B 1151) with registries covering inventory, rights, and other data about local assets and a central registry providing the same information for all enterprise assets. The satellite systems provide a more local view of inventory and intellectual property rights. The central registry provides an enterprise view. Queries often can be satisfied at one of the nested satellite levels, precluding the need for a remote query to the central enterprise system.

Another benefit of the approach using federated systems linked by a central registry is the ability to combine local inventories into a single global inventory. The central registry tracks where physical copies of the assets exist anywhere in the enterprise. Users requiring a copy of the physical asset may therefore pull a copy from the closest/fastest location.

The invention for managing rights and distribution of digital assets in a distributed repository framework includes a plurality of federated repositories connected to a computer network, a satellite repository connected to the computer network, a central registry of digital assets, and a satellite registry of digital assets. Each of the federated repositories maintains enterprise digital assets with metadata tags, and the satellite repository maintains a local digital asset with metadata tags. The central registry of digital assets receives digital asset rights attributes, relationship attributes, asset identifiers, and location attributes concerning the enterprise digital assets from at least one of the federated repositories based on the metadata tags of the digital assets when a digital asset is saved to one of the plurality of federated repositories. The satellite registry of digital assets receives digital asset rights attributes, relationship attributes, asset identifiers, and location attributes concerning a local digital asset from the satellite repository based on the metadata tags of the local digital asset when a local digital asset is saved to the satellite repository. The central registry of digital assets registers the local digital asset as an enterprise digital asset upon receiving an indication that the local digital asset will be available throughout the enterprise, and the central registry of digital assets stores the digital asset rights attributes, the relationship attributes, asset identifiers, and location attributes of the digital asset to provide an enterprise-wide view of the digital assets in the federated repositories and the satellite repository that make up the enterprise system.

The central registry can include a relationship registry and a rights registry, and the central registry can update these registries as a local asset is designated as an enterprise asset that will be available throughout the enterprise system. To speed up searches, the rights registry can include cached queries, flattened views of hierarchical data, and pre-calculated query values for retrieval and inclusion in a search index of the rights attributes.

Additionally, the satellite registry of digital assets can record a global identifier of the enterprise asset upon receiving an indication that the local digital asset will be available throughout the enterprise system.

Graph databases work well as the central registry and/or as a satellite registry (registries). A registry node can be a proxy to digital assets stored in the federated repositories and the satellite repository. The graph database of the rights registry can include graph objects corresponding to the rights information of the digital assets and a categorization of the graph objects representing a rights hierarchy of the digital assets. The graph database(s) can include a property graph data model with nodes, relationships, properties, and labels in a rights hierarchy of the digital assets.

The central registry can include a uniform record of each of the digital assets and can automatically resolve intellectual property rights and distribution rights of digital assets stored in the federated repositories and the satellite repository based on the metadata tags of the enterprise digital assets and the local asset. The intellectual property rights can include inbound and outbound intellectual property rights, and the outbound intellectual property rights can include restrictions. Further, the automatic resolution of intellectual property rights and distribution rights includes tying the intellectual property rights to an asset hierarchy to resolve the intellectual property rights a user has in the digital asset at a point in time.

In the systems of the invention, the central asset registry, the relationship registry, and/or rights registry can be pluggable between systems and system architectures. Additionally, the central registry can include an asset rights hierarchy for rapid navigation across digital assets in the federated repositories and the satellite repository. The central registry can include an asset rights hierarchy with multiple media types. Further, the repositories can be in different geographic locations.

In the systems of the invention, when a digital asset is saved to the satellite repository, new and different rights types and rights information can be specified by metadata tag of the digital asset.

The systems of the invention can also include a service tier that provides access to the metadata in all the repositories. For example, the service tier can provide a programmatic interface to access digital asset metadata across the federated repositories and the satellite repository that make up the enterprise.

Additionally, the systems of the invention can also include a digital asset service that reads the metadata tags in the digital assets stored in the federated repositories and the satellite repository and provides the metadata tags to the central registry of digital assets.

Key features of the invention include the aforementioned federation of satellite media DAMs and the ability to leverage (asset) relationship data in a relationship service. The former, in combination with a "take-action" feature, allows users to find and use content without having knowledge or necessary navigation familiarity with the underlying source DAMs. The latter allows users to find content without having to know media and DAM-specific identifiers (e.g., a recipe ID versus a cut UUID versus a show code versus a GUID, and other unique identifiers) by using an associative search (e.g., all seasons for "Expedition Unknown," all the images for Episode 3 of Season 6 of "Chopped," etc.) and other queries using known relationships to locate the asset or entity for which the user is ultimately searching.

The invention provides a single application for searching media assets across different vendors and different MAMs (and DAMs) and extends enterprise-wide database searches to build a media cart of assets. The invention improves asset availability with increased efficiency and provides a cohesive view of related media assets across different asset types. The media search applications enable location, modification, and distribution of media assets. The systems and methods of the invention aggregate all versions of an episode to provide relevant search results and eliminates the need to modify and re-create different versions as well as eliminating multiple versions of the same episode in a search results set of assets.

The invention includes an interface created for a distributed search and analytics engine, a user interface patterns library, a web service that provides programmatic access to the search index, and a search engine using an index built from metadata from the digital asset management systems and the relationship registry of the central asset registry. Data from repositories is consolidated into subject area flat files. The interface houses the search engine, allows users to view metadata, allows users to view videos, and collects media asset information. The invention updates the layout of the data to ensure that the placement of data aligns with the user's needs. The media cart enhances security controls around the data to support changing business needs, including launching workflows in other applications, easier sharing of assets, and concurrent business partner use.

The invention allows users to search for shows, episodes, collections, non-linear videos, still images, recipes, people, and organizations. The index provides a variety of filters to narrow down the search results. Users can browse through listings of shows for different vendors and search multiple videos using lists of internal identifiers. The interface provides easy navigation between different pages and tabs to find more details. Users can view and download video files, closed caption, and production deliverables and can add videos and recipes to the media cart for exporting metadata or initiating workflows in other applications.

The invention includes systems and methods for federated searches of assets in disparate DAM repositories. One example embodiment of the invention includes a computerized media search system for searching, viewing, and organizing content and metadata of digital assets in a distributed repository framework. The system includes a processor for executing applications stored in a non-transitory computer-readable medium. The applications include a search index data collector service configured to construct a linked cross-referenced representation of digital assets in a plurality of federated repositories based on relationship attributes of the digital assets which are stored in a relationship registry. Relationship registries can be components of the central registries. Additionally, the relationship registry can include an asset relationship hierarchy for rapid navigation across digital assets incorporating multiple media types.

Additionally, the cross-referenced representation of digital assets in the digital asset management system can be a graph database, and the graph database can include graph objects corresponding to relationship attributes of the digital assets and a categorization of the graph objects representing a relationship hierarchy of the digital assets. The graph databases can include a property graph data model with nodes, relationships, rights, properties, and labels in a relationship hierarchy of the digital assets. The search index data collector service is also configured to provide the linked cross-referenced representation of digital assets in the plurality of federated repositories to a search engine. In some example embodiments of the invention, the linked cross-referenced representation of digital assets is in JSON format for each digital asset type.

The systems and methods in accordance with the invention can also include a federated search service configured to provide an independent programming interface to the search engine and services queries and retrieval requests for the digital assets from the plurality of federated repositories. Additionally, a federated media search application can be included that initiates workflows and operations on digital assets from the plurality of federated repositories as a result of the queries and retrieval requests.

In an example implementation of the invention, systems and methods can include a central registry of digital assets, where the central registry of digital assets receives digital asset rights attributes, relationship attributes, asset identifiers, and location attributes concerning the digital assets from one or more of the plurality of federated repositories based on metadata tags of the digital assets when a digital asset is saved to one or more of the plurality of federated repositories.

In some examples of the invention, the digital assets are stored in both a federated repository and a satellite repository, where the satellite repository maintains a local digital asset with metadata tags. The plurality of federated repositories and the satellite repository can be located in disparate geographic locations. Additionally, the systems and methods of the invention can include a satellite registry of digital assets, where the satellite registry of digital assets receives digital asset rights attributes, relationship attributes, asset identifiers, and location attributes concerning a local digital asset from the satellite repository based on the metadata tags of the local digital asset when a local digital asset is saved to the satellite repository.

In some instances, a federated media search application builds a satellite registry index of digital assets for each satellite registry by receiving a digital asset attribute from the satellite registry, searching the central registry for relationship attributes of the digital asset associated with the retrieved digital asset attribute, constructing a list of related digital assets and their corresponding satellite registries, retrieving additional digital asset attributes for each of the listed related digital assets, and repeating the receiving, searching, constructing, and retrieving steps for each satellite registry. In some example implementations, the federated media search application further builds a satellite registry index of digital assets for each satellite registry by cross-referencing the received digital asset attribute and the retrieved digital asset attributes for each of the listed related digital assets across all of the satellite registries.

The invention includes systems and methods that, in response to a type of search query, the federated media search application receives a digital asset attribute that corresponds to the type of search query, searches the search index (part of a pluggable search engine, for example) based on the received digital asset attribute to identify digital assets in the repositories that satisfy the type of search query, and returns a representation of identified digital assets corresponding to the received digital asset attributes to the search engine. In some example embodiments, in response to the type of search query, the federated search service also receives a selection of an identified digital asset corresponding to the received digital asset attribute, searches the search index based on relationship attributes of the selected digital asset to identify related digital assets in the repositories, and returns a representation of identified related digital assets to a search engine. The federated search service also can display a relationship attribute of the identified related digital assets to the selected digital asset.

The invention includes a computerized media search system for searching, viewing, organizing, and editing content and metadata of digital assets in a distributed repository framework. Example implementations of systems and methods in accordance with the invention include a processor for executing applications stored in a non-transitory computer-readable medium. The applications include a search index data build service that constructs a list of digital assets from a satellite repository, collects asset attributes from each of the listed digital assets, and creates a search record for each of the listed digital assets, where the search record for each of the listed digital assets includes the asset attributes of the listed digital asset. The systems and methods in accordance with the invention also include a relationship registry that determines assets related to each of the listed digital assets based upon a relationship attribute of the listed digital asset and that updates the search record for each of the listed digital assets to include identifying information of the related assets.

In some examples of the invention, the search index data build service constructs the list of digital assets from the satellite repository using a central registry composition service layer and/or a service layer of a satellite DAM corresponding to the satellite repository. Also, some example embodiments of the invention include a federated search service that provides an independent programming interface to a search engine and services queries for the digital assets.

DETAILED DESCRIPTION

Figure 1:
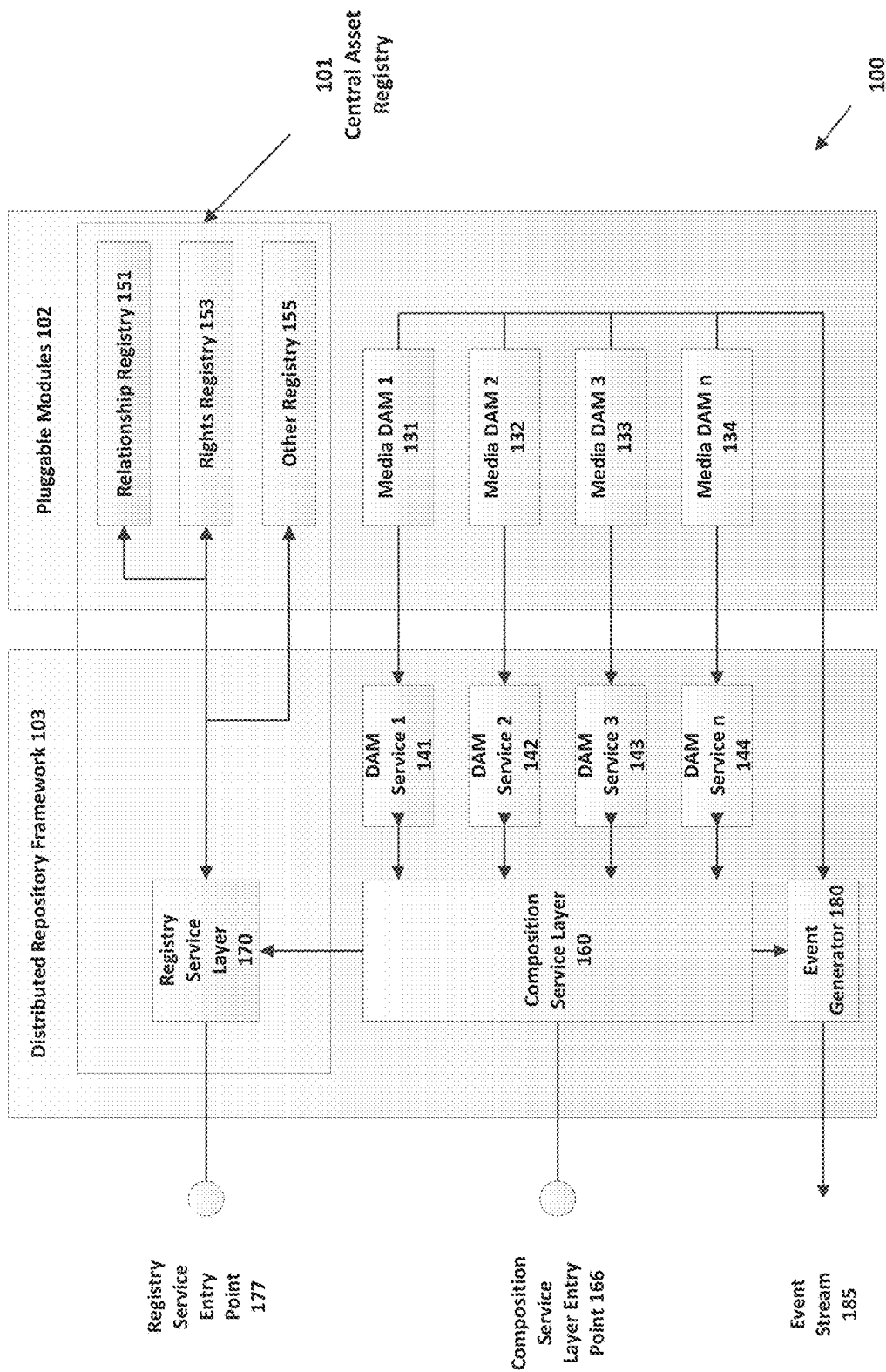
FIG. 1 shows a generic system for registering assets and accessing multiple federated media repositories.

One example implementation of the invention consolidates data from the central video metadata repository and other source systems into subject area flat files that are used to build a full-text, distributed database. The system uses documents rather than schema or tables. The database configuration and architecture allow for real-time searching and analyzing of the media assets and associated data.

The files in the database can be stored as simple data structures and objects in a variety of data interchange formats, such as JSON (JavaScript Object Notation), for example. In one example system of the invention, the files are grouped together by Data Type and Record ID. The invention runs a number of different workflows that drive the processing. The workflows are typically sets of multiple tasks connected with a start task link that triggers the proper sequence to execute a process. When a workflow is executed, it triggers the start task and other tasks connected in the workflow.

One example workflow generates JSON files for each specific asset type and one with a list of IDs that have data changes between runs. In one example of the invention, there are nine JSON files grouped by show, series, episode, segment, NLV (non-linear video), collection, person, organization and recipe. A full baseline build runs once per day, and a partial build runs continuously to pick up changes in near real time. Each of the build processes calls a script at the end of their run to build out or upsert the data store that is the primary source for the search application (described further below) and also a support source for several additional applications and processes.

The full and partial workflows pull data from the central video metadata repository sources and create the show, series, programs, and segment JSON files. The workflows share the same core code, and a full build baseline is run each day and the partial build runs continuously. Differences exists in the two runs, such as in the setup, housekeeping tasks, and the amount of data pulled. The full build creates a set of baseline JSON files that are used to baseline the data store. The partial build pulls in data that has changed between runs and then pushes those changes to the data store via JSON files. Changes are tracked using asset update tables, such as the asset_update_log table. The asset update table is updated by triggers on key tables such as assets, asset date, asset relation, asset title, and other asset attributes. The triggers place an entry with the table name and update date in the asset update log table. The partial build keys on that date and aggregates all of the asset ids that where changed between the last successful index build and the current date and time set for the operating system on which the database resides (e.g., sysdate).

In addition to the asset type JSON files, the processes also send out a JSON file with the system IDs of the assets that were changed. For each JSON file there is a corresponding intermediate storage area for data processing (e.g., a stage table in the ESEARCH_BO schema). The table contains record id (asset id), srt group, srt key, and data values. Once the tables are built, they are sorted by the first 3 columns and output into the corresponding JSON file. Each file includes a header record for each record and a data record that is stored in a single row of data. The files are then split into files that are less than 100 MB each. They are logically split so that the header and data records are kept in together. The files are labeled show1.json, show2.json, segmentl.json, segment13.json, etc. Those files are picked up and used to build out or update the data store by a shell script that is called from within the workflow. The Recipe, Organization and People JSON files and index creations are handled in additional workflows.

In one example system, those workflows run every two hours and follow the same basic processing steps described above. The data store associated to these data sources is rebuilt each time so there are no partial update workflows for these data sets. In addition to the core JSON file builds, there are several support workflows that run separately to create and update support tables needed by the workflows. There is a workflow that moves data from the central asset registry into flattened out tables in a data services reporting environment database. From those tables, there are processes that pull out and stage unique identifiers (e.g., GUID or UUID), version relationships, recipe show code relationships, assets related recipes, and still image thumbnails, for example. In one example implementation of the invention, these stage tables are loaded each day at 0700 and then upserted throughout the day via service lookup calls. The central registry data is processed this way to improve workflow performance. An additional process that pulls in new and updated closed caption text files related to programs assets can run concurrently or sequentially depending upon the volume of closed caption text files. In one example of the invention, the closed caption text file data is stored in a file (e.g., an Oracle table) and then cached to improve workflow performance.

The claimed invention provides a central asset registry system, implemented as a graph database. The central asset registry system provides a database and set of services to access aggregated information of distributed media asset sources. The central asset registry system maintains a list of assets and their relationships. The central asset registry provides end users and programmatic access the ability to efficiently query and retrieve assets across multiple repositories in multiple locations. The system allows an arbitrary number of underlying repositories to be represented and scaled effectively.

The claimed invention also provides a pluggable architecture to provide extensibility and dynamic expansion as needed. The pluggable architecture supports parallel development by different teams as features can be implemented as separate components. Pluggable repositories may be custom-developed, commercial suites, centrally located, or may be geographically dispersed. Additionally, the pluggable architecture provides a defined interface to facilitate additional development.

The claimed invention includes a scalable, graph-centric data storage and analysis system (i.e., graph engine instantiating the enterprise logic implemented as service wrappers around a graph database) as the central asset registry. The graph engine instantiates, manages, and stores complex networked (related) structures through the use of a relationship or "graph" database. The graph database stores and represents actors and relationships as graph structures, instead of table entries in a relational database. The data structure of the graph engine uses graph objects to represent the data, including nodes and edges. Each of the graph objects can be defined by and coupled with ontological categories of a particular ontology. In one embodiment of the invention, the ontology includes a cable television ontology—a "concept framework" that models cable television programming interaction as a set of interrelationships between MVPDs (multichannel video programming distributors) and shows. As will be discussed, utilizing data structures that are composed of graph objects, coupled with a particular ontology, allows the graph objects to be stored, combined, and represented in a semantically meaningful way, which facilitates data consistency, advanced analytics, and visualization of complex networks.

At a top level of a multilevel storage hierarchy, a digital asset management (DAM) system is configured to provide management actions and decisions regarding the ingestion, annotation, classification, storage, retrieval, and distribution of digital assets. In one example embodiment of the claimed invention, the digital assets include media assets (media content) such as still images, video images, audio recordings, animations, and other types of audio, visual, and written content, and the DAM system can be termed a "media asset management system" (MAM). While recognizing differences between these types of systems, for simplicity and brevity, the term "repository" can be used to connote a system for managing a set of metadata about an inventory of digital assets.

Likewise, an "asset" is a general term for a media entity such as an episode of a television show. Assets are hierarchical and may be a container for other entities. For example, a show titled "Chopped" could be an asset. A specific episode of that show titled "Fried Chicken Time" would also be an asset. An "abstract asset" is a term used to represent a grouping of the variations of a single media entity. For example, an abstract episode would represent a linear broadcast episode for a given show and series. Many variations of the abstract episode may exist, differing in format and editing to meet business requirements.

"Variants" are concrete, actual implementations of the abstract episode that differ only in format. A low resolution and high resolution implementation of the same abstract episode would be considered variants of each other.

"Versions" are concrete, actual implementations of the abstract episode that differ materially in the content, not just the format. For example, an implementation of an abstract episode that was edited for time would be a version.

The graph engine manages a database that stores graph objects (media assets) that proxy media assets held in one or more media repositories. Each media repository holds detailed asset metadata and an inventory of asset instances. An instance is the actual media physical object. Examples of instances include image files of various formats, such as "jpeg," "tiff," or "bmp." Examples of video instances include digital files of various formats such as "mov," or "mp4." Instances may be digital or analog and may be physically stored on a variety of media such as tape or computer disk. Instances may exist in multiple physical locations, such as one instance in a repository in data center A with another instance in a repository in data center B. A given asset may have many associated instances.

A media registry can include many hundreds of millions or billions of graph objects. Repositories can be partitioned from a single storage medium or can be located alongside each other in one physical computer system or can be geographically separated in different computers, different buildings, different cities, and different countries. The graph objects in the registry may proxy assets in remote repositories (media DAMs) that allows for the federation of repositories. The remote repositories control access to their digital assets. With federated repositories, the size of the maintained data set can be effectively unlimited.

The underlying detailed metadata for the assets can be located in the individual media repositories. The graph objects in the central asset registry act as proxies with identifiers that act as keys into the individual media repositories. In this manner, relationships between assets can be recorded in the graph database without having to import or replicate all the repository metadata.

Repository and registry underlying technology may be replaced over time, allowing each module to be horizontally and vertically scaled as needed. The pluggable architecture prevents lock-in to any given vendor solution or technology.

A registry can include a set of media assets (graph objects) that include an ontology, that is, a formal naming and definition of the types, properties, and relationships of the media assets. The ontology can have a general purpose facility for defining and refining categorical structures and other ontological elements. The ontology does not need to be dedicated to a particular ontological domain, such as cable television. These facilities are also used to define the overall system ontology, which categorizes the objects used in the implementation of the graph engine itself and can be used to build other ontological structures.

Repositories (DAMs) can contain different ontological structures, but in one embodiment of the invention, every repository contains a base ontology. In another embodiment of the invention, the repositories can include different media asset types. For example, one repository can include still image objects, another repository can include video objects, and another repository can include recipes. To simplify boot-strapping of the system, the base ontology can correspond to a small set of pre-defined unique identifiers. The overall system ontology can use these identifiers the same way in every DAM, to identify the built-in ontological categories and other ontology-related objects that are required by the system. As a minimum, each DAM repository just needs an asset identifier, which can be used by the central asset registry to link the registry with the given repository.

The system uses metadata to describe the media assets in the DAM repository. For example, the metadata can describe the asset contents, the location of the asset, the means of encoding/decoding, the history of the asset, ownership, access rights, and the like. In one example embodiment, the system uses the Dublin Core schema of vocabulary terms to describe the assets. In another example embodiment, the system uses the PBCore metadata standard as a set of specified fields in the database to catalogue and manage the assets.

Figure 5:
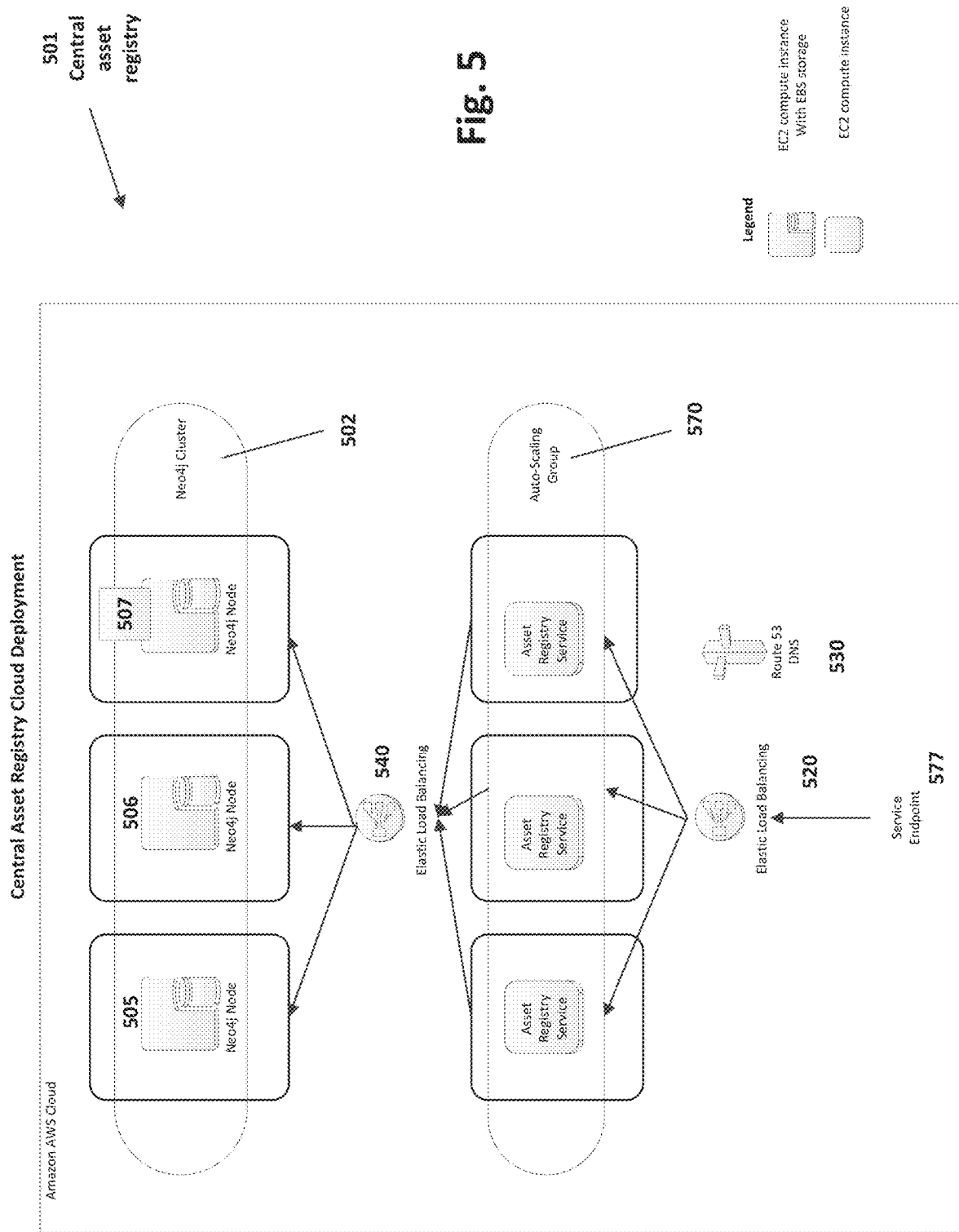
FIG. 5 shows a central asset registry system deployed in a cloud infrastructure in accordance with the claimed invention.

The central asset registry has been implemented in several different physical configurations. For example, FIG. 5 shows a central asset registry 501 in a cloud deployment to an Amazon Web Service (AWS) cloud environment. This cloud deployment diagram (FIG. 5) can be directly mapped to the generic distributed repository framework shown in FIG. 1. For example, the Asset Registry Service 570a, 570b, 570c (collectively shown as an Auto-Scaling Group 570) in FIG. 5 corresponds to the Registry Service Layer 170 in FIG. 1. Similarly, the Neo4j Cluster 502 in FIG. 5 is (are) the database(s) housing the relationship registry 151, the rights registry 153, and the other registry 155 shown in FIG. 1. The Neo4j master slave clustering architecture (cluster 502) is a set of database instances working together in a master/slave relationship. The cluster management is managed by the Neo4j nodes 505, 506, 507 via a TCP connection between the nodes. The nodes 505, 506, 507 handle self-nomination to master and settle consistency checks between the nodes. Lastly, the Service Endpoint 577 in FIG. 5 corresponds to the Service Entry Point 177 in FIG. 1.

The cloud deployment shown in FIG. 5 leverages Amazon Web Service (AWS) cloud built-in environment functions. The Auto-Scaling Group 570, Elastic Load Balancing 520, 540, and Route 53 DNS 530 are all available as components of the AWS cloud environment. For example, auto-scaling group 570 relates redundant copies of a service and/or application over one or more availability zones (essentially different data centers). In the cloud deployment of FIG. 5, the claimed invention can leverage the inherent capabilities and features of the AWS cloud environment. Likewise, in other deployment environments, the central asset registry of the claimed invention can capitalize on the capabilities and features of those deployment environments as well.

Figure 8:
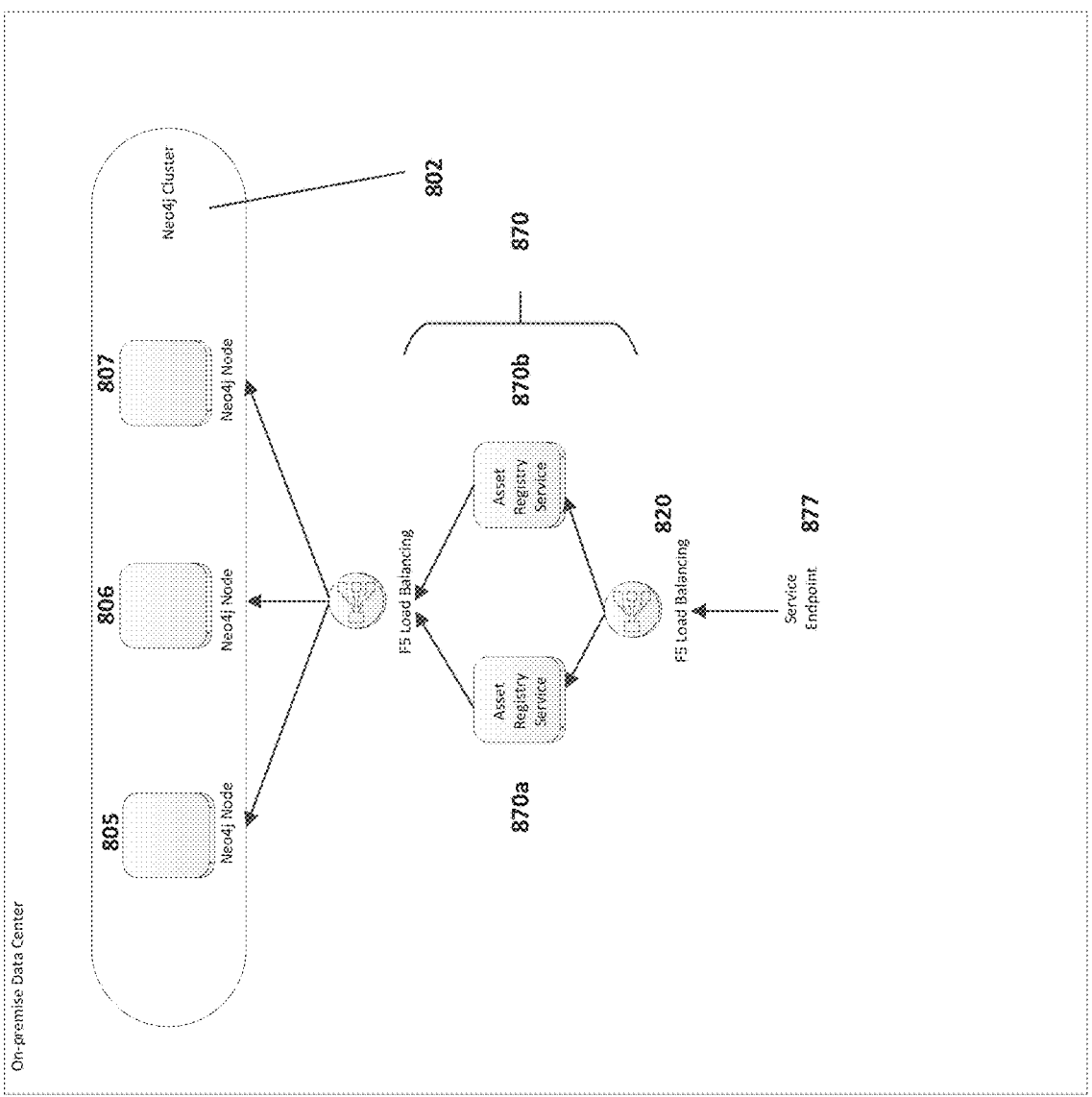
FIG. 8 shows a central asset registry system deployed in a data center in accordance with the claimed invention.

For example, FIG. 8 shows a deployment of a central asset registry 801 to a corporate data center environment. The corporate data center deployment can be on physical computer systems, virtual systems, or a combination of the two. This corporate data center deployment (FIG. 8) can be directly mapped to the generic distributed repository framework shown in FIG. 1. For example, the Asset Registry Service 870a, 870b, (collectively 870) in FIG. 8 corresponds to the Registry Service Layer 170 in FIG. 1. Similarly, the Neo4j Cluster 802 in FIG. 8 is (are) the database(s) housing the relationship registry 151, the rights registry 153, and the other registry 155 shown in FIG. 1. The Neo4j master slave clustering architecture (cluster 802) is a set of database instances working together in a master/slave relationship. The cluster management is managed by the Neo4j nodes 805, 806, 807 via a TCP connection between the nodes. The nodes 805, 806, 807 handle self-nomination to master and settle consistency checks between the nodes. Lastly, the Service Endpoint 877 corresponds to the Service Entry Point 177 in FIG. 1.

Figure 7:
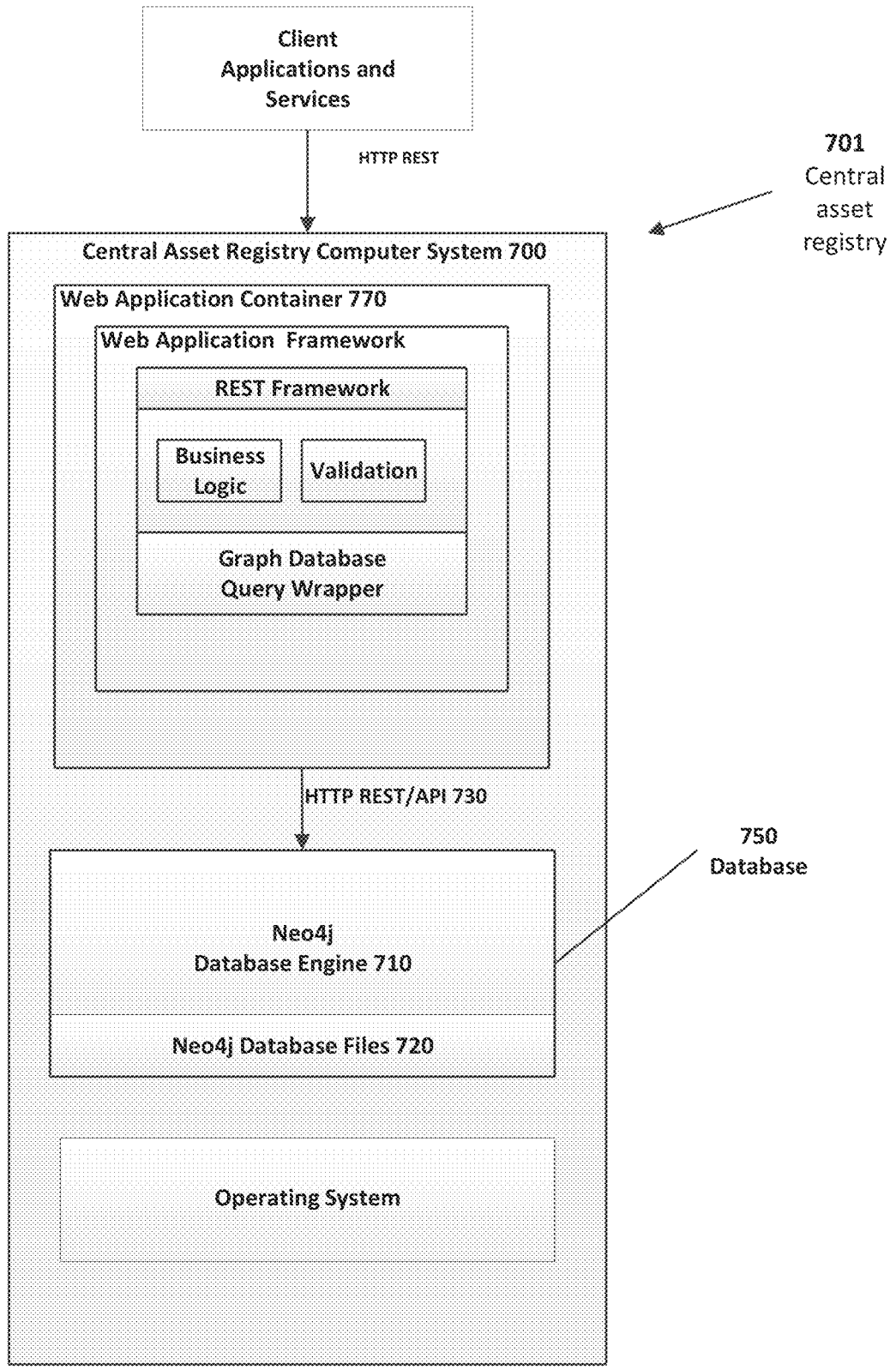
FIG. 7 shows a component drawing of a central asset registry system deployed in a single computing device.

These example deployments are representational only, and the central asset registry can be deployed to a number of physical configurations, including a combination of those described above. For example, FIG. 7 shows a central asset registry 701 deployed to a single physical computing device (system 700). The web application container 770 of FIG. 7 holds an implementation of the registry service layer 170, DAM Service1 141, DAM Service2 142, DAM Service3 143, DAM Service n 144, composition service layer 160, and event generator 180 depicted in FIG. 1. Additionally, the computer system 700 holds an instance of registry database 750, including database engine 710 and database files 720. The registry database 750 includes an implementation of the relationship registry 151, rights registry 153, and other registry 155 shown in FIG. 1. In FIG. 7, the registry database 750 shown is the Neo4j graph database deployed as a single node. Other databases can be used in a similar fashion. The registry service layer contained in the web container 770 can query the database either via a REST service call or via a native API call 730.

Central Asset Registry System for Media Assets

As shown in FIG. 1, a central asset registry system 100 of media assets in accordance with the claimed invention separates the registry 101 from the various DAMs (repositories) 131, 132, 133, 134. The registries 151, 153, 155 together provide a central logical place to hold a list of all the assets spread over the various repositories 131, 132, 133, 134. The resultant framework integrates multiple DAMs (repositories) and registries through a service layer allowing abstraction of the actual underlying repositories and registries. The architecture allows new DAMs or registries to be plugged into the framework seamlessly. Existing DAMS and registries can be refactored or switched to entirely new technologies without impact to the overall system.

Figure 9:
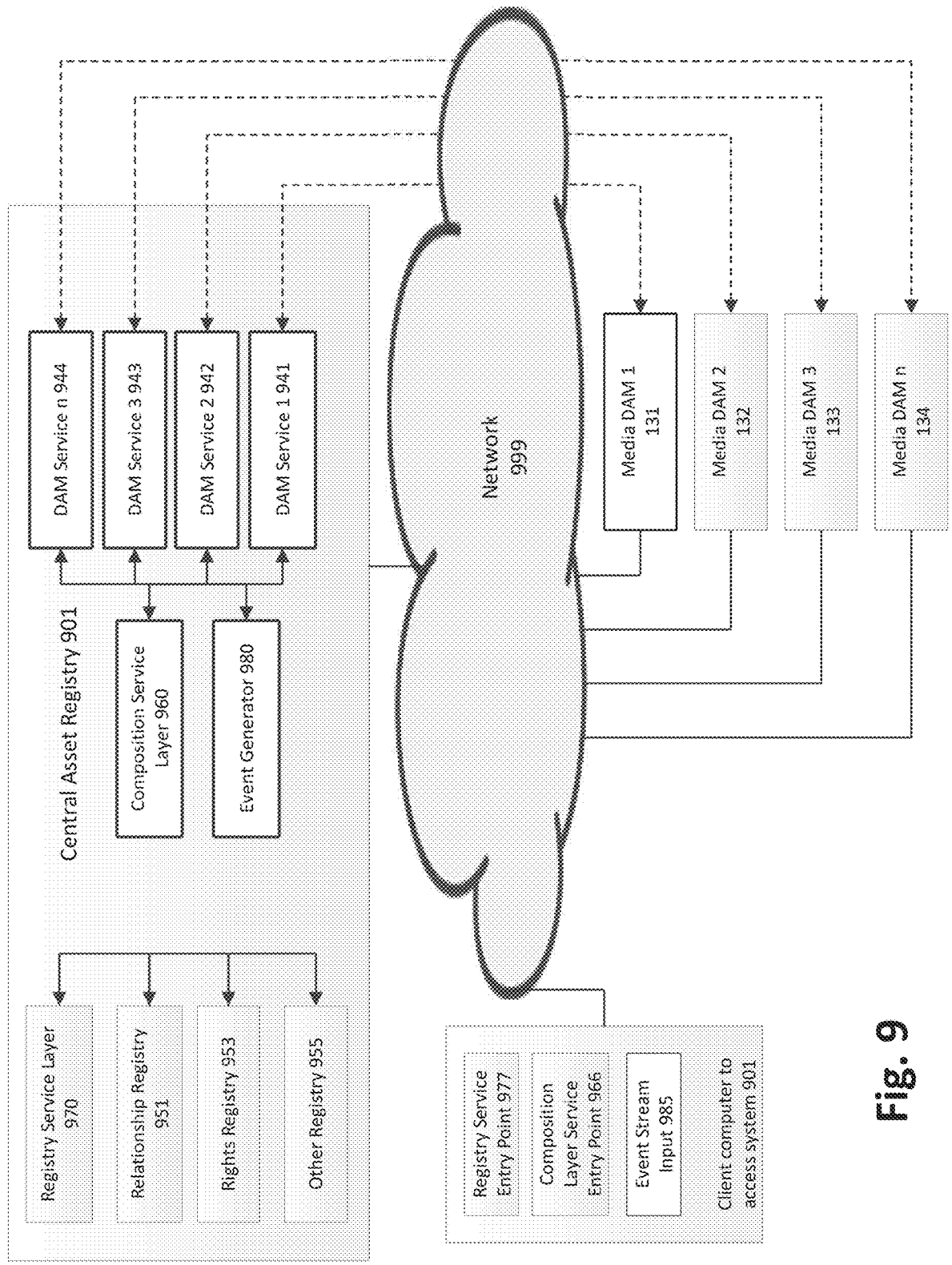
FIG. 9 shows a component drawing of a central asset registry system deployed as a computing device in contact with a network of computing devices.

FIG. 9 provides a simplified component drawing of a system 900 with a central asset registry 901 of media assets separated from the various DAMs (repositories) 131, 132, 133, 134, such as a deployment that can be implemented on a single computer system. The central asset registry 901 of media assets shown in the system 900 of FIG. 9 incorporates a registry service layer 970 (akin to registry service layer 170 in FIG. 1) as well as a relationship registry 951, rights registry 953, and other registry 955. The central asset registry 901 of media assets of FIG. 9 also includes a composition service layer 960 (akin to composition service layer 160 in FIG. 1) as well as DAM services 941, 942, 943, 944 to service the media DAMs 131, 132, 133, 134. The resultant central asset registry 901 of media assets provides a centralized registry as well as services to access the federated media DAMs 131, 132, 133, 134. Other configurations of the components are also possible, such as cloud deployments, data center deployments, and the like, as described above. The components described with regard to FIG. 9 can also be hosted on separate computer systems to allow for independent clustering and scaling.

Returning to FIG. 1, the pluggable modules 102 on the right side of FIG. 1 represent the actual implementations of each registry and DAM (repository). For example, Media DAM1 131 can be a repository for image assets implemented by a third party vendor in their data center. Media DAM2 132 can be a repository of video assets implemented as a custom system in a cloud data center, such as in a SaaS DAM. Similarly, Media DAM3 133 can be a repository of recipe assets stored in an on-premise system data center. Any number of DAMs can exist and can be distributed geographically and/or implemented to focus on specific asset types (e.g., still image assets, video assets, recipe assets, and the like). The framework allows separate scaling of individual DAMs to match business needs as each repository grows. While FIG. 1 shows four DAMs 131, 132, 133, 134, the number and type of DAMs can be scaled and customized based on content stored in each DAM, location of each DAM, vendor and business relationships, and other factors.

As further shown in FIG. 1, the registries 151, 153, 155 together provide a central logical place to hold a list of all the assets spread over the various DAMs (repositories) 131, 132, 133, 134. The resultant framework integrates multiple DAMs (repositories) 131, 132, 133, 134 and registries 151, 153, 155 through a service layer 103 allowing abstraction of the actual underlying DAMs (repositories) and registries. The architecture allows new registries to be plugged into the framework seamlessly. Existing DAMS and registries can be refactored or switched to entirely new technologies without impact to the overall system.

Multiple registries can exist that focus on different asset relationships. One Relationship Registry 151 may associate assets in a hierarchical inheritance structure such as shows/series/episodes. Another Rights Registry 153 may relate the inbound and outbound intellectual property rights to each asset. Yet another registry 155 may relate assets to various geographic locations. Other registries can also be used to relate assets to business partners. The registries 151, 153, 155 can be implemented separately or combined. Also, they may be deployed in a number of combinations such as cloud or on premise. The number and types of registries is expandable and can be based on many factors in addition to the examples listed.

The left side of FIG. 1 depicts the framework 103 built over the actual DAMs (repositories) and registries. The framework 103 includes several layers of services. At the lowest layer, a DAM service exists for each actual Media DAM (repository). For example, DAM Service1 141 is a service implementation over Media DAM1 131, DAM Service2 142 is a service implementation over Media DAM2 132, DAM Service3 143 is a service implementation over Media DAM3 133, and DAM Service n 144 is a service implementation over Media DAM n 134, and so on for all the actual repositories. This service abstraction layer allows any given repository to be replaced by a new vendor implementation, custom system, or even refactoring of an existing repository without disrupting the other DAMs (repositories). The DAM services 141, 142, 143, 144 can be optimized for the particular type of media asset stored in each of the DAMs to provide optimal interface service and support.

A composition service layer 160 exists over each DAM service 141, 142, 143, 144, abstracting the interface to each DAM (repository) 131, 132, 133, 134. In this way, new DAMs can be introduced without changing the service entry point 166 to the composition service layer 160. The composition service layer 160 can include asset entity services, instance retrieval services, and search and view capabilities. Consumers of the composition service layer 160 do not have to change when new DAMs are introduced or lower interfaces (such as DAM services 141, 142, 143, 144) change. The composition service layer 160 provides a single entry point (composition layer service entry point 166) to access assets from any DAM (repository).

The registry service layer 170 provides a single entry point 177 to access information from any of the underlying registries 151, 153, 155. The use of the registry service layer 170 allows introduction of new registries or changes to implementations of existing registries without impacting consumers of the service via the registry service entry point 177. All assets from the various repositories have at least an entry in the relationship registry 151. The list of assets in the relationship registry 151 therefore ties all the repositories 131, 132, 133, 134 together.

The framework 103 provides an event generator 180 to publish events whenever asset metadata, relationships, or physical instances change in the system 100. The event generator 180 provides a fast, reliable, and scalable message queuing service. Subscribers can access queues and topics to exchange data using point-to-point or publish and subscribe patterns. The event stream 185 is available for any other system to be notified of changes in any aspect of the data contained in one of the pluggable modules (registries 151, 153, 155 or DAMs 131, 132, 133, 134).

Figure 2B:
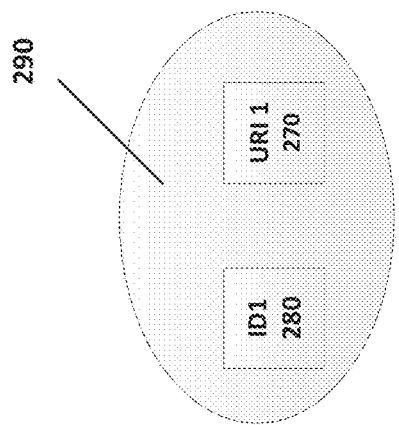
FIG. 2B shows a sample representation of an example media asset registry entry used in accordance with the claimed invention.

Central Asset Registry Method for Media Assets shows a central asset registry system 100 for registering and accessing assets over multiple federated media repositories (DAMs 131, 132, 133, 134). As further shown in FIG. 2B, upon ingest, each media asset (registry entry) 290 is added to the central asset registry 101 and assigned a unique identifier 280 via the central asset registry service 170. Detailed metadata about the asset and the physical asset itself is placed in a repository (DAMs 131, 132, 133, 134). That unique identifier 280 is used to "relate" the asset 290 to a position in an asset hierarchy 200 (shown in FIG. 2A). The repository (DAMs 131, 132, 133, 134) maintains the detailed metadata about the asset 290 and the instance inventory. Multiple repositories (DAMs 131, 132, 133, 134) can exist distributed over multiple geographic areas or separated by asset type. A central asset registry 101 is used to hold the identifiers 280 of assets over all repositories (DAMs 131, 132, 133, 134) and holds the relationships between the assets 290. The central asset registry 101 can have a sparse set of metadata including reference to the underlying repository (DAM 131, for example) with asset and instance location. In the central asset registry 101, location of asset repository 270 and instance entities are represented by a URI and other descriptive metadata.

Figure 2A:
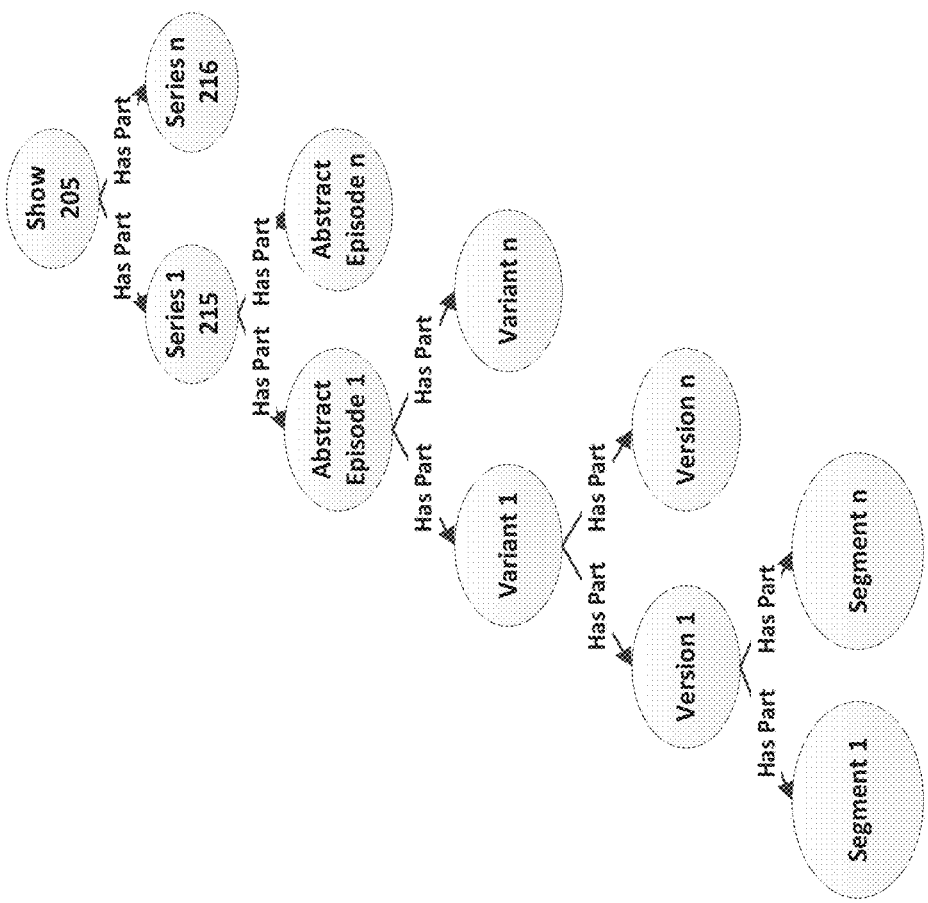
FIG. 2A shows a sample representation of a media asset hierarchy over one of many possible relationship dimensions.

The central asset registry 101 can be implemented as a graph database to efficiently track asset relationship and identifier information. FIG. 2A shows an example media asset hierarchy 200 as a directed graph. In general, graph edges or relationships can be "directed" or "undirected." A directed relationship points explicitly from one node to another. For example, a directed edge may point from a "Show" 205 to a "Series 1" 215 with edge type "Has Part" 210. An undirected edge can be used to point from one peer to another, without implying a hierarchy. For example, an undirected edge may point from one variant of an episode to another or from one actor to another.

In more complex ontologies, category nodes must be organized into a categorical structure, such as a hierarchy, where categories "lower" in the hierarchy represent specializations (or descendants) of categories "higher" in the hierarchy. For instance, the node that represents the category of "Show" 205 might have several more specific descendant categories that represent specific kinds of shows, including different "Series" of the "Show" 205, such as "Series 1" 215 and "Series n" 216. To model this using the graph object structure discussed above, the graph engine can include as part of the built-in ontology an edge category called "Has Part" 210. In practice, an edge that refers to the "Has Part" 210 as its ontological category can link, for example, the "Show" category node 205 with a descendant category node, such as "Series1" 215, to indicate that the "Series 1" category node 215 is a sub-type of the "Show" category node 205. The semantic meaning of edges 210 that are marked with the "Has Part" category can be part of the built-in ontology of the graph engine, and can be how the ontological machinery is boot-strapped.

Figure 3:
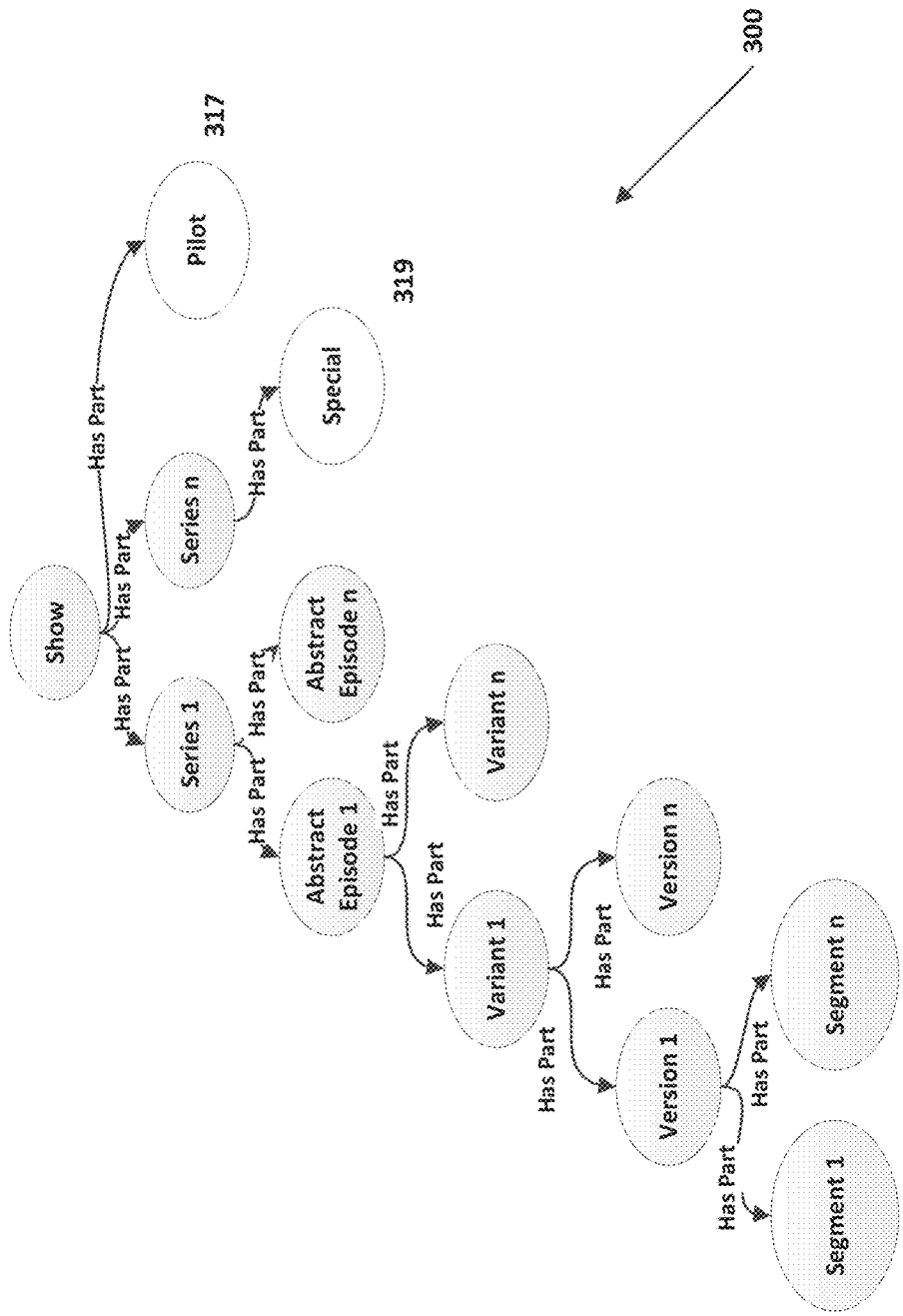
FIG. 3 illustrates a dynamic addition of a new asset type in the media asset hierarchy ontology structure of FIG. 2A.

Another example can be the addition of "Pilots" 317 and "Specials" 319 as new asset types as shown in the asset hierarchy 300 in FIG. 3. The use of a graph database allows new asset types to be dynamically added without refactoring the rest of the system or any clients that access the graph engine. Client modules or downstream systems that don't need to know about "Specials" can continue to use the system without change.

Figure 4:
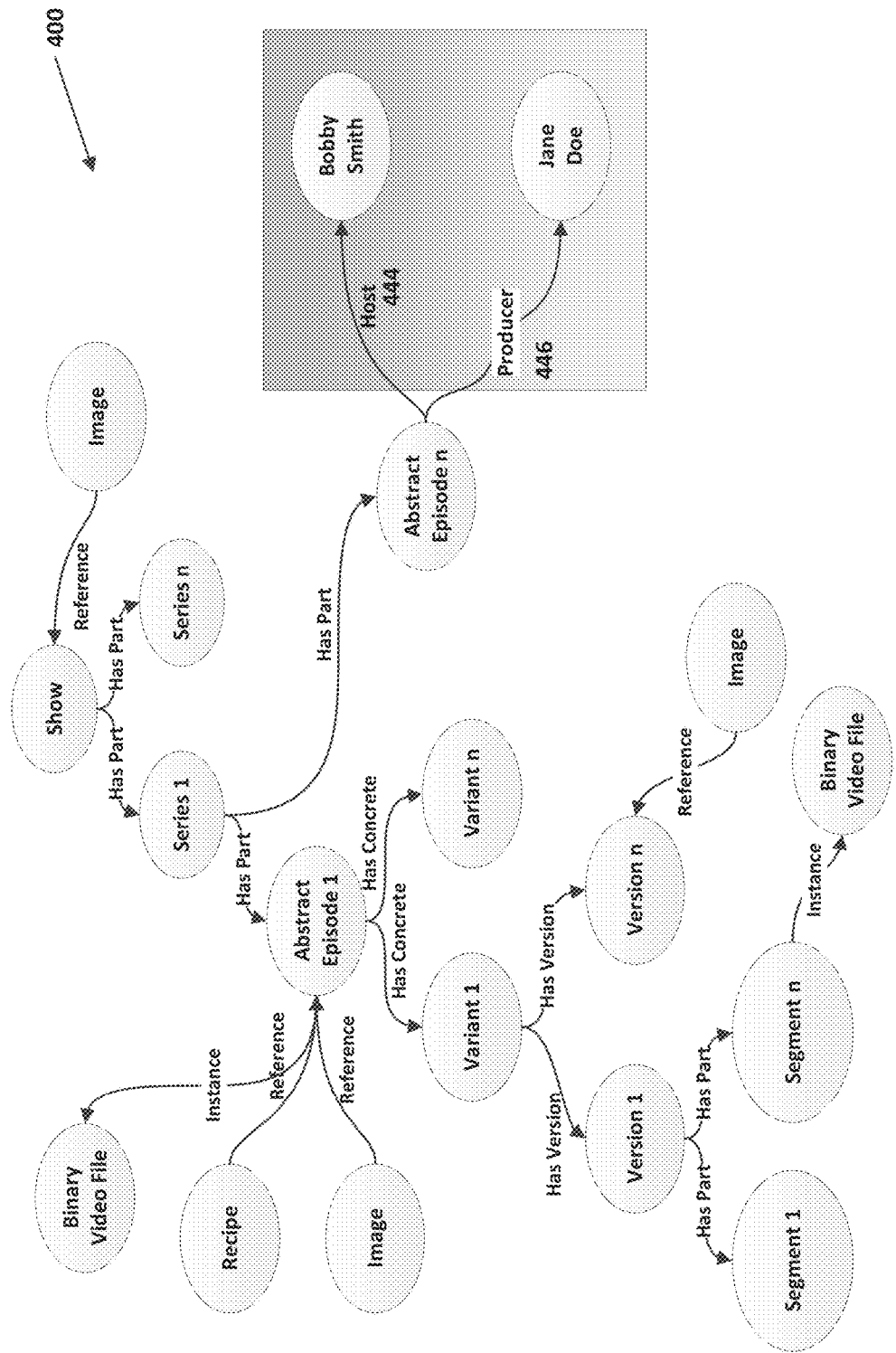
FIG. 4 shows a dynamic addition of a new relationship type in the media asset hierarchy ontology structure of FIG. 2A.

Using media assets as a graph allows dynamic addition of new relationship types, such as the ability to relate people to media assets and include their role such as "Host," 444 "Producer," 446 and so forth as shown in the asset hierarchy 400 in FIG. 4. Relationship types may be added dynamically without refactoring the rest of the system or any clients that access the graph engine.

Integration to the system 100 shown in FIG. 1 is via the Registry Service Entry Point 177, The Composition Layer Service Entry Point 166, and the Event Stream 185. The implementation of the module integrating to the service entry points 177, 166, 185 might be a graphical user interface, an API call from another system, a module polling a watch folder, or other mechanism. Calls using an API interface, for example, typically involve REST or SOAP protocols via HTTP over TCP/IP networks. Interface via a graphical user interface might involve a web browser-based application, a thick client installed on a workstation, or other user interface technology.

A media database of the claimed invention can include people, who are actors, directors, producers, and the like. The media database also includes movies, videos, television shows, still pictures, and other "productions" that are viewed by an audience. Many actors appear in many television shows, and many video productions. The actors' roles can be defined and tracked as well. Additionally, television shows can include a number of different episodes, and actors may star in a single episode or in many episodes over many seasons.

Figure 6:
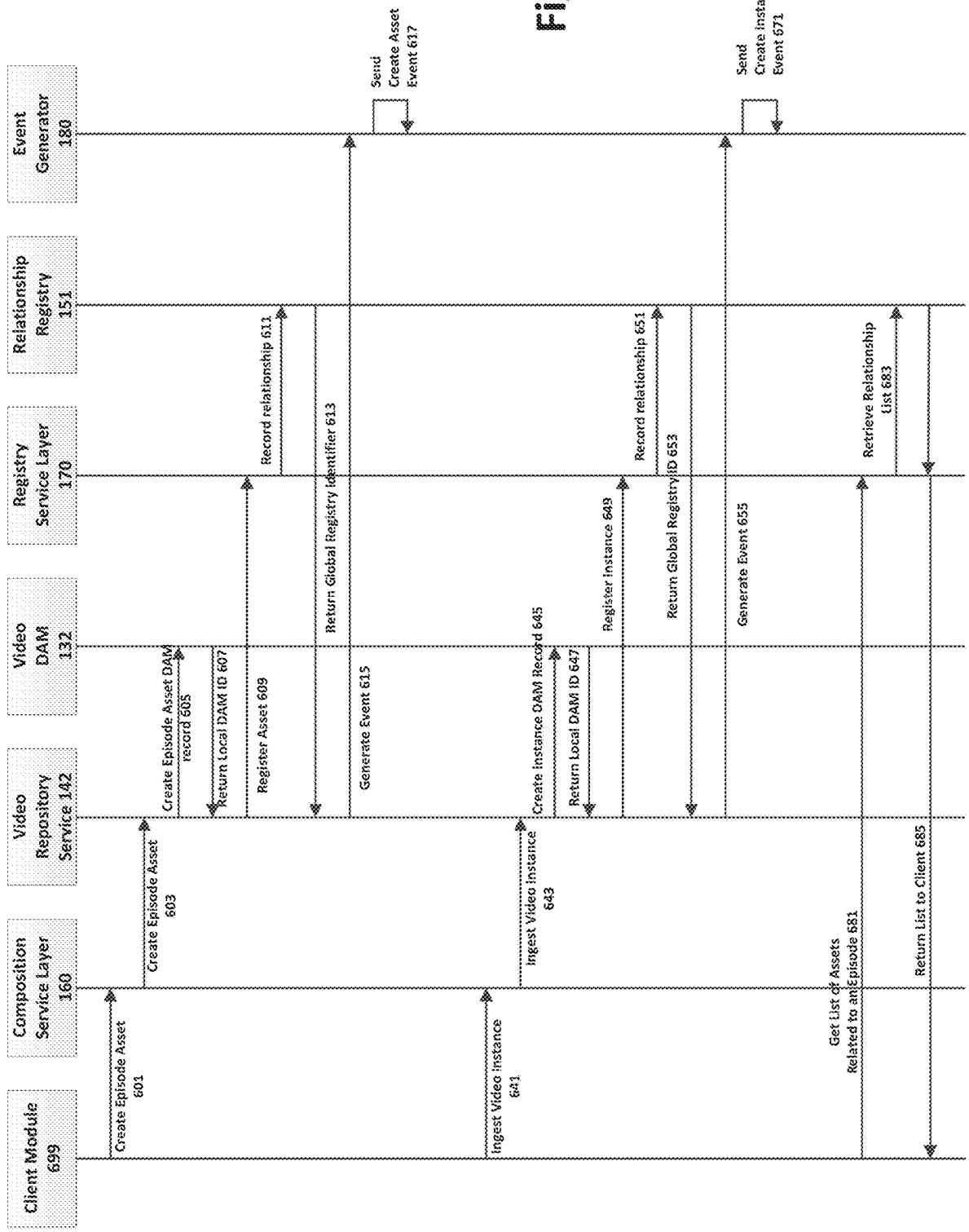
FIG. 6 is a sequence diagram showing one example of how assets can be added to the system and registered and how they may be subsequently accessed via an API interface.

FIG. 6 is a sequence diagram showing one example of how assets may be added to the system 100 and how they may be subsequently accessed via an API interface. For asset creation, the client module 699 calls the Composition Service Layer 160 to create an episode asset 601, which directs the call to the Video Repository Service 142 to create the episode asset 603. The Video Repository Service 142 provides a service wrapper over the actual Video Media DAM 132 to create an episode asset DAM record 605. The Video Media DAM 132 is responsible for holding the detailed metadata about the new asset and returns a local DAM identifier 607 to the Video Repository Service 142. The Video Repository Service 142 now calls the Registry Service Layer 170 to record 609 the new asset in the central asset registry 101. The Registry Service Layer 170 calls the Relationship Registry 151 to record 611 the new asset in the graph database, returning 613 the global registry identifier back up the call chain to the Video Repository Service 142. Lastly, the Video Repository Service 142 calls 615 the Event Generator 180 to send out an Asset Creation event 617. The Event Generator 180 is responsible to distribute the event to any listeners of the Event Stream.

Once an asset is created, instances of the asset may be added to the system. Instances are the actual physical objects corresponding to the asset. For an episode, for example, the instance may be an MP3 video file. In the example of FIG. 6, the client module 699 calls the Composition Service Layer 160, which directs the call the Video Repository Service in much the same sequence as when creating an asset. The main difference is in this case the Event Generator would send out an Instance Creation event to indicate a physical copy of the asset has been added to the system.

Once the asset is created in the repository, the instance (or physical asset files) can be ingested. During this process, the client module 699 calls the Composition Service Layer 160 to ingest a video instance 641, which directs the call to the Video Repository Service 142 to create the video instance 643. The Video Repository Service 142 provides a service wrapper over the actual Video Media DAM 132 to create an instance DAM record 645. The Video Media DAM 132 is responsible for holding the detailed metadata about the new instance and returns a local DAM identifier 647 to the Video Repository Service 142. The Video Repository Service 142 now calls the Registry Service Layer 170 to record 649 the new instance in the central asset registry 101. The Registry Service Layer 170 calls the Relationship Registry 151 to record 651 the new instance in the graph database, returning 653 the global registry identifier back up the call chain to the Video Repository Service 142. Lastly, the Video Repository Service 142 calls 655 the Event Generator 180 to send out an Instance Creation event 657. The Event Generator 180 is responsible to distribute the event to any listeners of the Event Stream.

Similar mechanisms exist to modify and delete assets and asset instances. Again, multiple protocols and transports may be used.

Once the assets and instances have been added, the system can be queried to retrieve metadata, relationships, or the actual instance files. As an example, the sequence at the bottom of FIG. 6 depicts retrieving a list of assets related to a given episode. In this example, when a user commences a search for an asset, the client module 699 calls the Registry Service Layer 170 for a list of related assets 681. The Registry Service Layer 170 in turn calls the Relationship Registry 151, retrieves the information 683, and returns the list of related assets back to the client 685. The list of related assets can include assets stored in many of the distributed repositories. The client query to the central asset registry 101 looks up descriptors and identifiers of the content, and returns an identification of the related assets, their respective locations, and their relationship to one another based upon matching metadata descriptors. The system returns pointers to the related assets to provide a list to the user. The identification can be provided as thumbnail images of the asset, size, location, rights, and the like. The user can then select and receive a digital asset or set of assets from the list. In this fashion, the graph data is accessed by accessing a node by index and then traversing through the set of relationships. To further improve performance of the system, search results can be cached to avoid repeated accessing operations of the same content.

Rights Registry and Rights Model

Just as the repositories can be modular, allowing use of multiple repositories optimized for different media types, the central asset registry can be extended to multiple registry types while maintaining a centralized registration of assets from all repositories, thereby maintaining the enterprise ID and relationships between assets. For example, the central registry may be expanded by adding another registry focused on intellectual property rights. Such a rights registry includes an intellectual property rights model and can be extended by plugging other modules into the framework further defining relationships between assets such as asset hierarchies, intellectual property rights in and rights out, talent roles, and other aspects of the features and restrictions that are tied to each asset.

Figure 10:
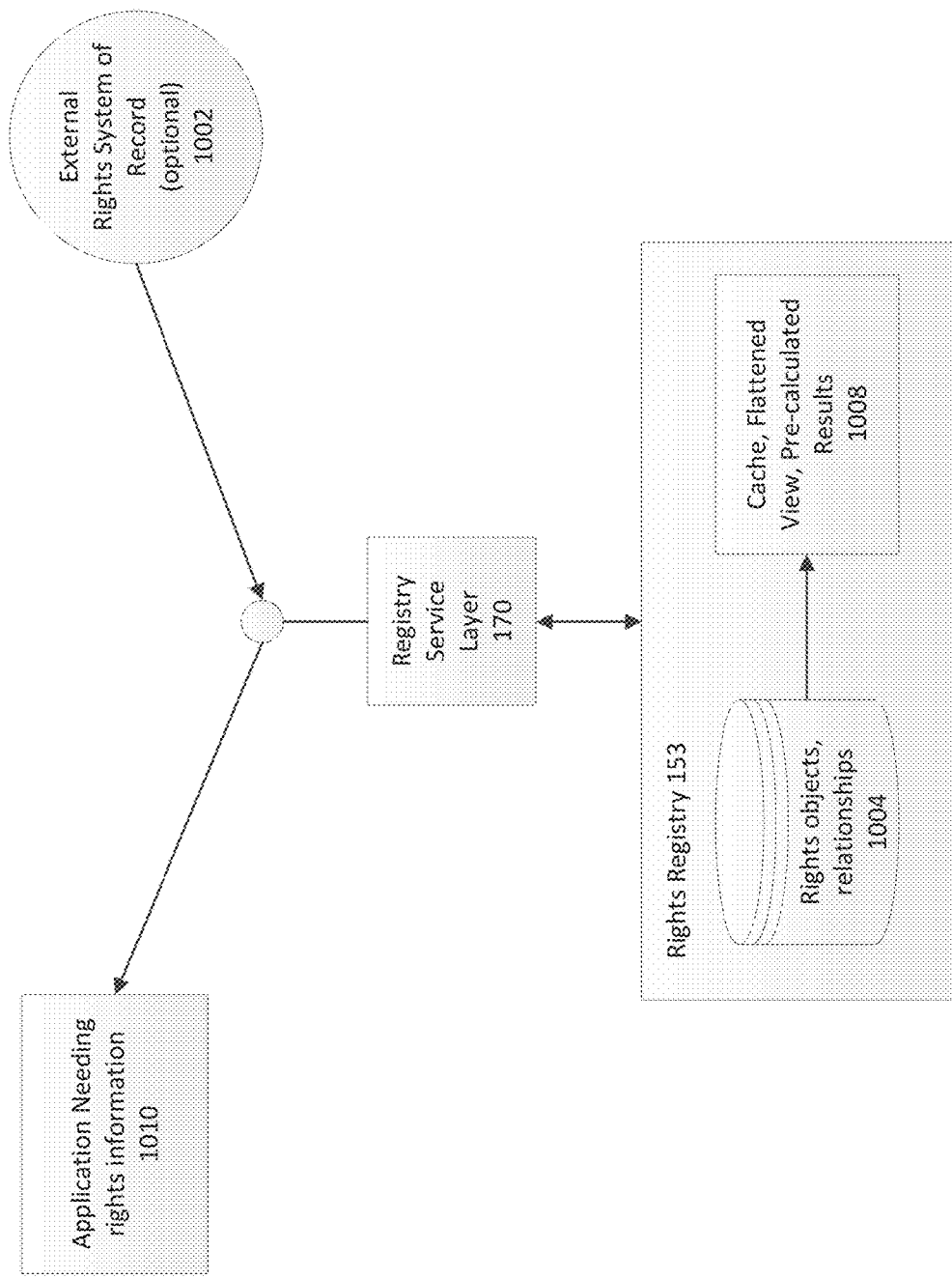
FIG. 10 shows a block diagram of a rights system in accordance with the claimed invention.

FIG. 10 shows two sample implementations of a rights registry as an extension of the central registry in the framework of the claimed invention. In one configuration the rights registry 153 acts as an operational data store holding a copy of the intellectual property rights as rights objects and relationships to media assets in a database 1004.

In this configuration, an external rights system 1002 acts as a system of record for intellectual property rights and may be a custom implementation or a commercial system. As a system of record, the external system is typically responsible for overall contract and intellectual property rights management and supports complex reporting and planning surrounding inbound and outbound intellectual property rights. For example, if a given asset has been licensed exclusively to a third party in Canada for 2017, the asset is not available for further licensing in Canada during that timeframe.

The intellectual property rights current state data is fed from the external rights system 1002 into the central rights registry 153 via the registry service layer 170. By feeding a copy of the intellectual property rights into the rights registry 153, the MAM system can make current state intellectual property rights known throughout the enterprise.

Another implementation of an intellectual property rights registry depicted in FIG. 10 omits the external rights system 1002 (shown by dashed line around external rights system 1002 in FIG. 10). In this configuration, the rights registry 153 (shown in FIGS. 11 and 12) becomes the authoritative system of record for intellectual property rights in the central registry 101. As a system of record, the rights registry 153 is responsible for tracking the inbound and outbound intellectual property rights for a given asset. The difference in this configuration is that the rights registry 153 would have fewer reporting and analytic capabilities than the external rights system 1002. The ability to configure the rights registry 153 with or without an external system of record 1002 provides great flexibility to integrate to other systems optimized for contract and rights management. In this configuration the rights registry 153 would provide a minimum set of intellectual property rights management, just as if the data was fed in from the external system 1002.

The rights registry 153 can be configured in a number of ways to improve performance and optimize capabilities of the system. For example, the rights registry 153 includes dependent structures built off the rights objects to increase query speed and to handle the query load. These dependent structures can be cached queries, flattened views of hierarchical data, and pre-calculated values stored in 1008 and kept up to date by the rights registry 153. The structures 1008 therefore allow fast retrieval and inclusion in a search index for an application that needs rights information 1010. Intellectual property rights associated with the asset hierarchy and inheritance can be used to evaluate the actual rights for any given asset. For example, the rights assigned to a series would need to be considered when determining the rights of a specific episode in the series. Pre-calculating the results of such inheritance can dramatically speed up a query for rights on a specific asset.

When the rights objects and relationships 1004 are stored in a graph database, the rights relationship attributes themselves lend to extremely fast queries. Attributes such as license duration, country, music license details, can be added to the relationships and automatically considered by the query, filtering out unwanted or otherwise unavailable assets. Complex queries involving graph traversal including impact of restrictions are substantially faster than those implemented on traditional relational databases as outlined above.

Likewise, given that system access and reads to the rights data in an operational system far outweigh the inserts and/or updates of the rights data, the system can store the data in a flattened manner. That is, if the rights of a series are changed, the corresponding rights of all children would be changed at the same time. This optimization extends the time to perform update and inserts, but speeds up reading the rights for a given asset. The flattened rights can also directly feed a search index build process.

Figure 15:
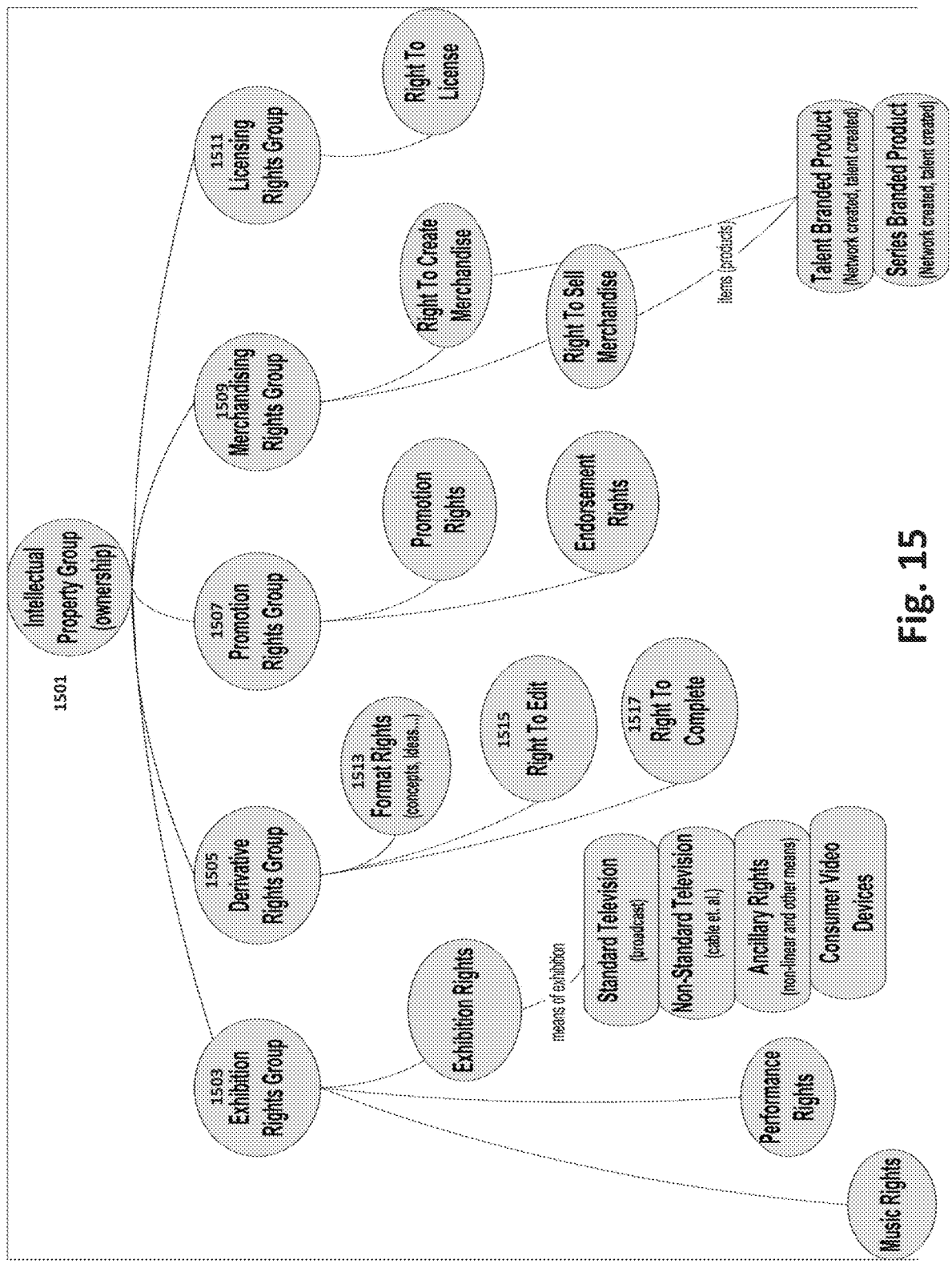
FIG. 15 shows an example intellectual property rights model used in the invention.

FIG. 15 shows an intellectual property rights model used in this invention. While there are existing systems that model intellectual property rights, those systems either focus on a small set of intellectual property rights groups with limited extensibility or require all the assets to be held in a single vendor system. The modular approach to the central asset registry 101 allows inclusion of other registries such as the rights registry 153 (shown in FIGS. 11 and 12). Implementing the rights registry 153 as a graph in a graph database allows expansion of rights groups to cover any or all intellectual property rights groups simply, without a system outage. As shown in FIG. 15, these groups might start with exhibition rights 1503 and be expanded to cover other complex groups such as derivative rights 1505, promotion rights 1507, merchandising rights 1509, and licensing rights 1511. These major intellectual property rights groups are further divided into subgroups. For example, derivative rights 1505 is subdivided into format rights 1513, rights to edit 1515, and rights to complete 1517, forming a tree structure.

By implementing both the asset relationship registry 151 and the rights registry 153 (shown in FIGS. 11 and 12) in a graph database, assets may be associated to any rights group at any level with inheritance. Restrictions on the rights are kept in the graph database edges, allowing very fast, complex queries when determining asset availability for any given purpose. Lastly, as discussed in the next section, using distributed satellite registries (e.g., satellite A registry 1113 from FIG. 11) allows rights information to be queried locally, reducing network traffic and the size of the queried dataset.

Satellite and Central Registry System

Figure 11:
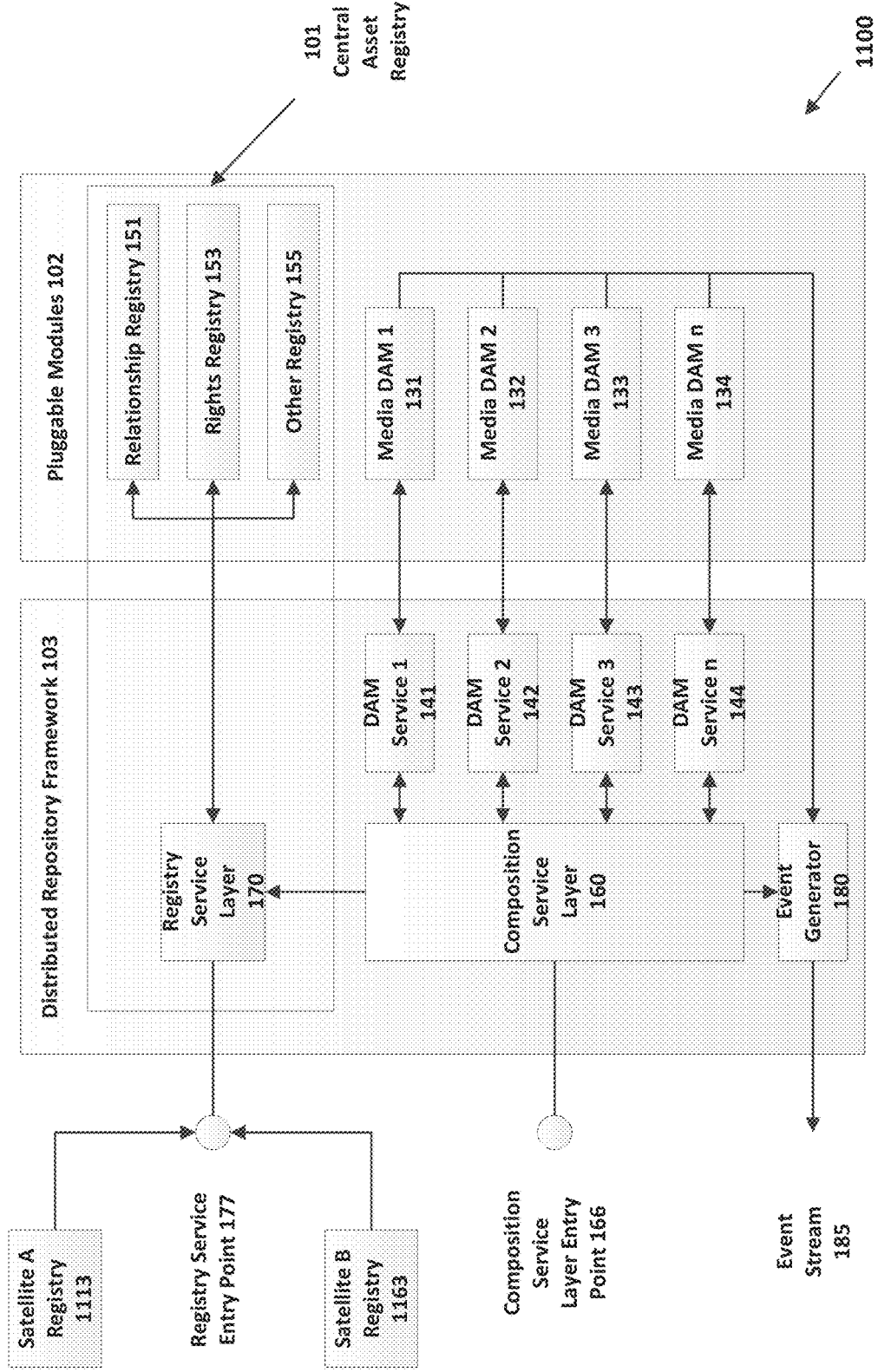
FIG. 11 shows an example system for registering assets and accessing multiple federated media repositories and satellite repositories and registries.
Figure 12:
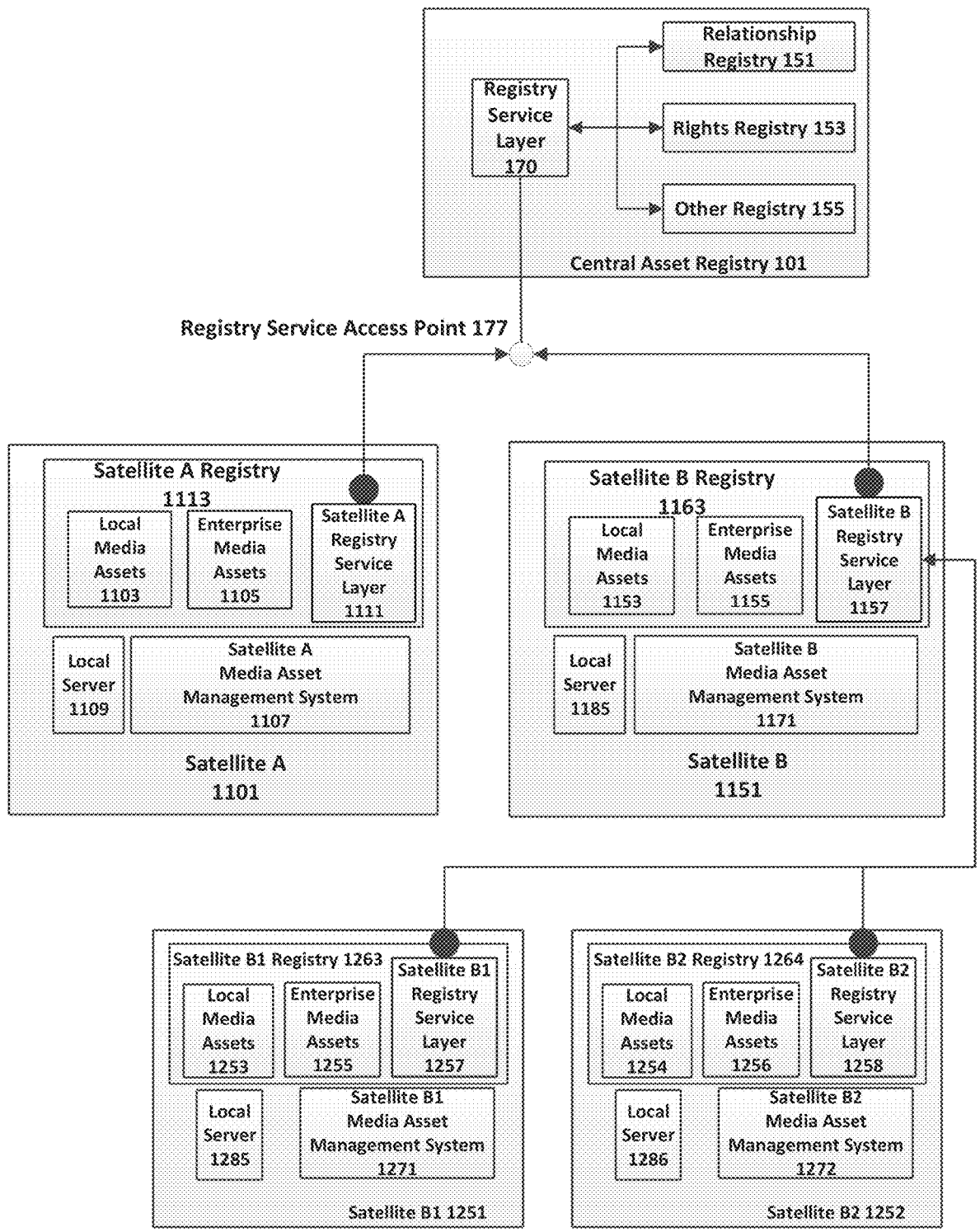
FIG. 12 illustrates example satellite locations with their respective registries, repositories, and their connectivity and interaction with the central asset registry.

FIG. 11 shows an example satellite and central registry system 1100 according to the claimed invention. The satellite and central registry system 1100 takes the initial distributed repository framework and the asset hierarchy databases and distributes the registry and repositories (for example, a registry and one or more repositories can be distributed geographically among satellite offices as shown in FIG. 12). In FIG. 11, satellite A registry 1113 and satellite B registry 1163 both access central asset registry 101 via registry service entry point 177. Registry service entry point 177 can also provide access to a quick search indexing mechanism implemented in central registry 101. In accessing the central asset registry 101, a user in satellite A can view enterprise assets through the lens of the central asset registry as if the assets were in a single repository (i.e., media DAMs 131, 132, 133, 134 appear as one, as described above).

The arrangement of a satellite registry and central registry provides several innovations to improve performance. For example, assume satellite A 1101 in FIG. 12 is geographically separated from the central asset registry 101. A local user of satellite A 1101 can search for and retrieve local-only assets without any communication to the central registry 101. Only when a search needs to expand to other satellites would a query be directed to the central registry 101. While the central registry 101 has a record of all enterprise assets, the satellite A registry 1113 has a record of all local-only assets and only those enterprise assets that have a local copy in the satellite MAM. By limiting communication from the satellite 1101 to the central registry 101 to queries involving enterprise assets, the traffic to the central registry 101 is greatly reduced. Also, since enterprise users can only see enterprise assets, there is no chance local-only assets might be mistakenly used by other satellites.

FIG. 12 shows one example implementation of the invention where satellite A 1101 can be Sao Paulo, where local users create and store digital assets in satellite A 1101. The actual physical media assets are stored in satellite A MAM 1107 repository and are registered in satellite A registry 1113. Assets that will never be used outside the satellite A 1101 are registered as local-only media assets 1103, whereas assets to be used throughout the enterprise are registered as enterprise assets 1105. The process of registering enterprise assets 1105 (as opposed to local-only assets) involve a registration to the central asset registry 101 via the central registry service access point 177 as described below.

Satellite B 1151 is another satellite system, which may be geographically or logically separated from satellite A 1101. Satellite B local-only media assets 1153 are not visible to other satellites or to the central registry 101. Only upon promotion to enterprise assets do the satellite assets get registered to the central registry 101 and become visible to other satellites and the enterprise as a whole.

Since they are registered to the central asset registry 101, the enterprise media assets 1105 may be used outside satellite A 1101 in other enterprise locations, including satellite B 1151. Satellite A 1101 registers these enterprise assets 1105 with the enterprise for users in the rest of the enterprise to become aware of and have access to these enterprise media assets stored in satellite A 1101. Upon registering the enterprise media assets 1105 with the central asset registry 101, users throughout the enterprise have information and knowledge regarding the assets. The once local media assets are now enterprise media assets. However, there is no requirement for satellite A 1101 to register all assets (local media assets 1103 and enterprise media assets 1105) with the central registry. Satellite A 1101 can selectively register assets in this fashion. The assets not registered with the central registry remain local-only media assets 1103.

Although a new asset may be registered first in a satellite and then with the central registry as an enterprise asset, this is just one of several ingest paths. For example, a new asset may be registered first with the central registry and then physically stored in DAMs 131-134. Copies of the physical asset may or may not be also sent to the satellites.

By use of the satellite registry service layers 1111 and 1157 (shown in FIG. 12), the actual implementation of the satellite registries 1113 and 1163 can vary from custom code to commercial products. The flexibility to integrate with third party implementations of satellite registries is a major advantage of the invention. The invention provides benefits over previous systems as it includes both features from the central registration of enterprise assets, and local registration of local assets. The system realizes benefits of a global view of enterprise assets courtesy of the central registry, yet satellites however are free to have their own assets as well. Further, by using a system wrapper on the service (for example, on satellite A registry service layer 1111 and on satellite B registry service layer 1157), the system can be vendor agnostic and plug in other registries, just like it plugs in DAM vendors.

In contrast, other asset registry systems either don't allow a federated registry with a distinction between local and enterprise assets, or they require all registries to lock into the same vendor. The approach used in this invention provides both federation and the ability to integrate with various vendor products.

In the claimed invention, each satellite (satellite A 1101, satellite B 1151, and the like) can have their own satellite registry (satellite A registry 1113, satellite B registry 1163, and the like). As outlined above, enterprise media assets 1105 can physically remain in satellite A MAM 1107, but metadata describing the enterprise media asset 1105 is registered in central asset registry 101 giving location information, rights information, and other information regarding the enterprise media asset 1105. In this fashion, a query against the central registry 101 or against any of the satellite registries shows an integrated view of the assets held in any of the federated MAMs (e.g., 1107 and 1171) and DAMs. The view from the central registry 101 can see all enterprise assets. The view from the satellite registries 1113 and 1163 can see both the enterprise assets and those local to the given satellite. Similarly, satellite A physical enterprise media assets held in satellite A MAM 1107 can be copied to other locations (e.g., Media DAM1 131, Media DAM 2, 132, Media DAM 3, 133, Media DAM n, 134, Satellite B media asset management system 1171, and the like). The enterprise physical media assets can then be distributed throughout the enterprise in various MAMs, with central asset registry 101 tracking the assets.

The hybrid approach of centrally registering enterprise assets while allowing local-only assets in the satellite registries 1113 and 1163 allows the satellite systems to vary from autonomous to tightly integrated with the central registry 101 while a service layer abstraction (e.g. 1111 and 1157) provides the ability to integrate with different vendor systems (vendor agnostic).

In these systems, much of the workflow for satellite systems revolves around local assets and doesn't require communication to the central registry 101. However, when an enterprise asset view is needed, the satellites make a simple query to the central registry, saving the need to concatenate queries from each of the satellite systems.

Additionally, the hybrid approach to registration allows the enterprise to provide the asset where it is used most, eliminate it where it is not used saving storage costs, store it where storage charges are least expensive, optimize for network traffic by positioning physical copies near the consumer, and take advantage of other storage and access variables that can change over time such as storage latencies. With the central asset registry 101 tracking the location and rights of enterprise assets, the system knows the asset exists and where the asset exists (along with other information from the asset metadata), and can access it accordingly. The resulting system provides faster queries, quicker access to physical media, and is more responsive to load variations.

Using satellite A registry 1113, a user in satellite A 1101 has a view of the local media assets 1103 in satellite A 1101 as well as the enterprise media assets 1105 physically in satellite A and all other enterprise media assets stored in other locations of the enterprise (e.g., DAMs 131, 132, 133, 134, and satellite B media asset management system 1171) via the registry service access point 177 to access the central asset registry 101. Likewise, users can search the enterprise for assets in a similar fashion.

As outlined above, the registry service layer 170 provides a single entry point 177 to access information from any of the underlying registries 151, 153, 155 (and now satellite A registry 1113). The use of the registry service layer 170 allows introduction of new registries or changes to implementations of existing registries without impacting consumers of the service via the registry service entry point 177. All enterprise assets from the various repositories, including enterprise media assets 1105, have at least an entry in the central relationship registry 151. The list of assets in the relationship registry 151 therefore ties all the repositories 131, 132, 133, 134, satellite A 1101, and satellite B 1151 together for those assets designated to be enterprise assets.

Although FIG. 12 shows only two satellites, satellite A 1101 and satellite B 1151, the configuration is logically extensible to any number of satellites all accessing the central asset registry 101 via register service access point 177. Further, each satellite can include more than one registry. Satellite B 1151, for example, could include additional satellites B1 and B2 (reference numerals 1251 and 1252, respectively), each with their own registry 1263, 1264 as keeping track of other (local) assets within satellite B1 1263 and within satellite B2 1264. The satellites and satellite registries can be configured based on asset characteristics, rights attributes of the assets, physical storage characteristics, and other business considerations. In all configurations, the central registry 101 is authoritative for enterprise assets, and the satellite registries are authoritative for local-only assets.

Registration of an Asset in a Satellite and Central Registry

Figure 13:
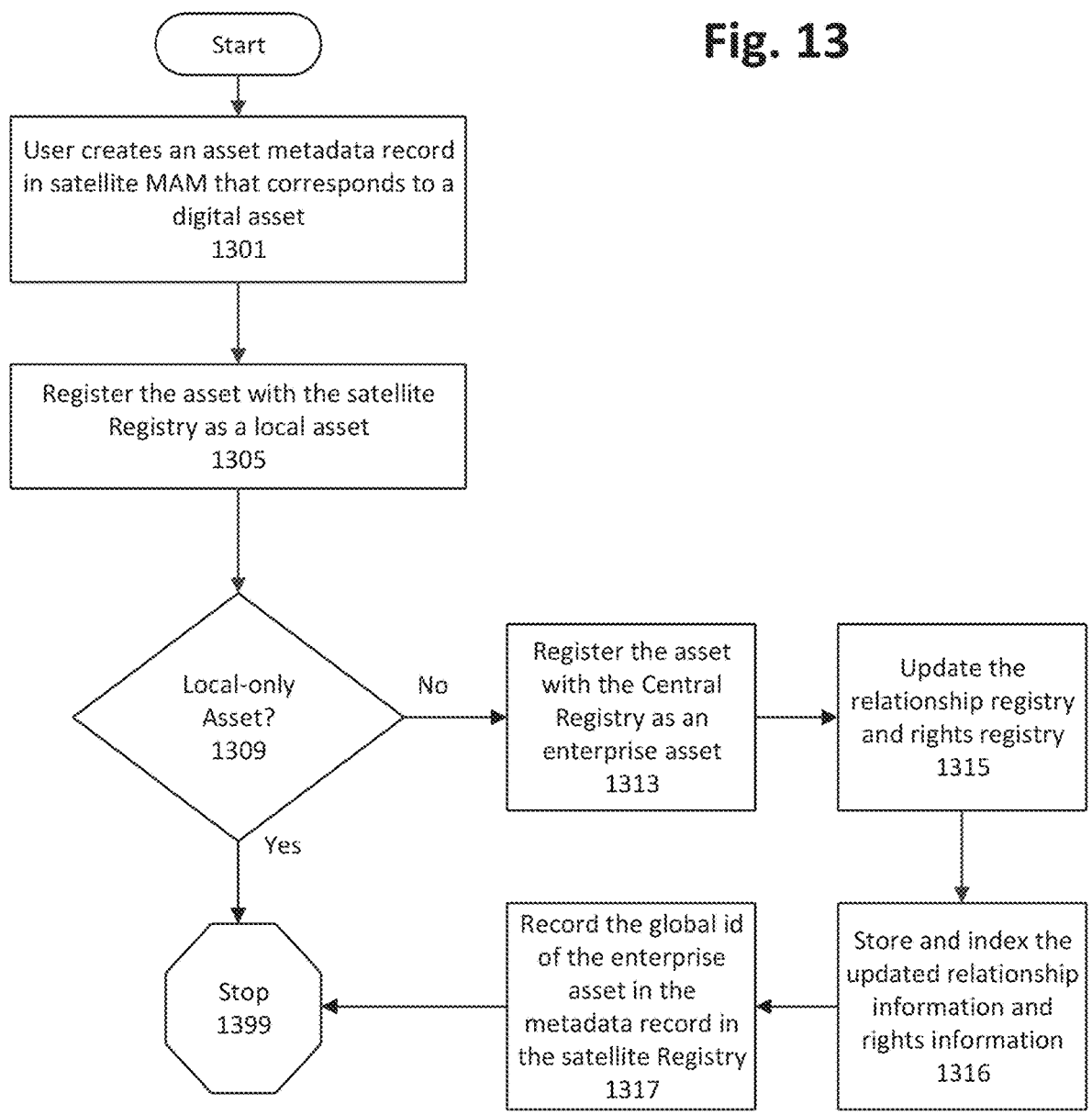
FIG. 13 shows a process flow for an example system registering assets at satellite locations.

FIG. 13 shows a process flow and program function of the registration of a media asset in a satellite in one example of the claimed invention. Registration includes creating a metadata record for the asset in a media DAM (or MAM) and optionally, recording the asset in the central registry for enterprise assets. Ingest of the physical media asset is a separate process where the physical asset is associated with metadata record. In this example of the claimed invention, FIG. 13 focuses on the registration of the asset metadata record as opposed to the ingest of the physical asset.

The process begins when a user creates an asset metadata record in block 1301 at a satellite location, such as satellite A 1101 FIG. 12. The satellite A media asset management system 1107 receives a command to create a metadata record.

In block 1305, satellite A then registers the MAM asset with satellite registry 1113 as a local asset. If the asset is a local-only asset, as determined in block 1309, the process then stops at block 1399.

However, if the asset is determined to be an enterprise asset (that is, not a local-only asset) in block 1309, the process continues in block 1313 to register the asset with the central registry 101 using registry service access point 177. As shown in FIG. 12, central asset registry 101 uses the registry service layer 170 to update the relationship registry 151 and rights registry 153 in block 1315 characterizing the enterprise media asset 1105 residing in satellite A 1101. The rights information is either entered by the user in the satellite MAM 1101, determined by inheritance in the central registry 101, or fed from an external rights system 1002. If determined by inheritance, the asset hierarchy is traversed upwards till a rights object is found. For example if adding an episode, the parent series or show would be checked for rights assignment. Any rights found in the series or show could then be applied to the episode. In block 1316, the updated information is stored and indexed to facilitate retrieval. The central asset registry 101 can also update other registries, including Other Registry 155, based upon characteristics of the enterprise media asset 1155. A global ID is returned from the central registry 101 to the satellite registry 1117.

Once the central registry step is complete, the process continues in block 1317 by recording the global ID obtained from the central registry 101 in the satellite registry 1113. The process then stops at block 1399.

Although the process shown in FIG. 13 block 1301 describes an action from an interactive user, registration may be triggered by any of a typical set of automation such as API call, batch processing, message queueing, or other common automation technique.

Search and Retrieval of a Physical Asset in a Satellite Registry

Figure 14:
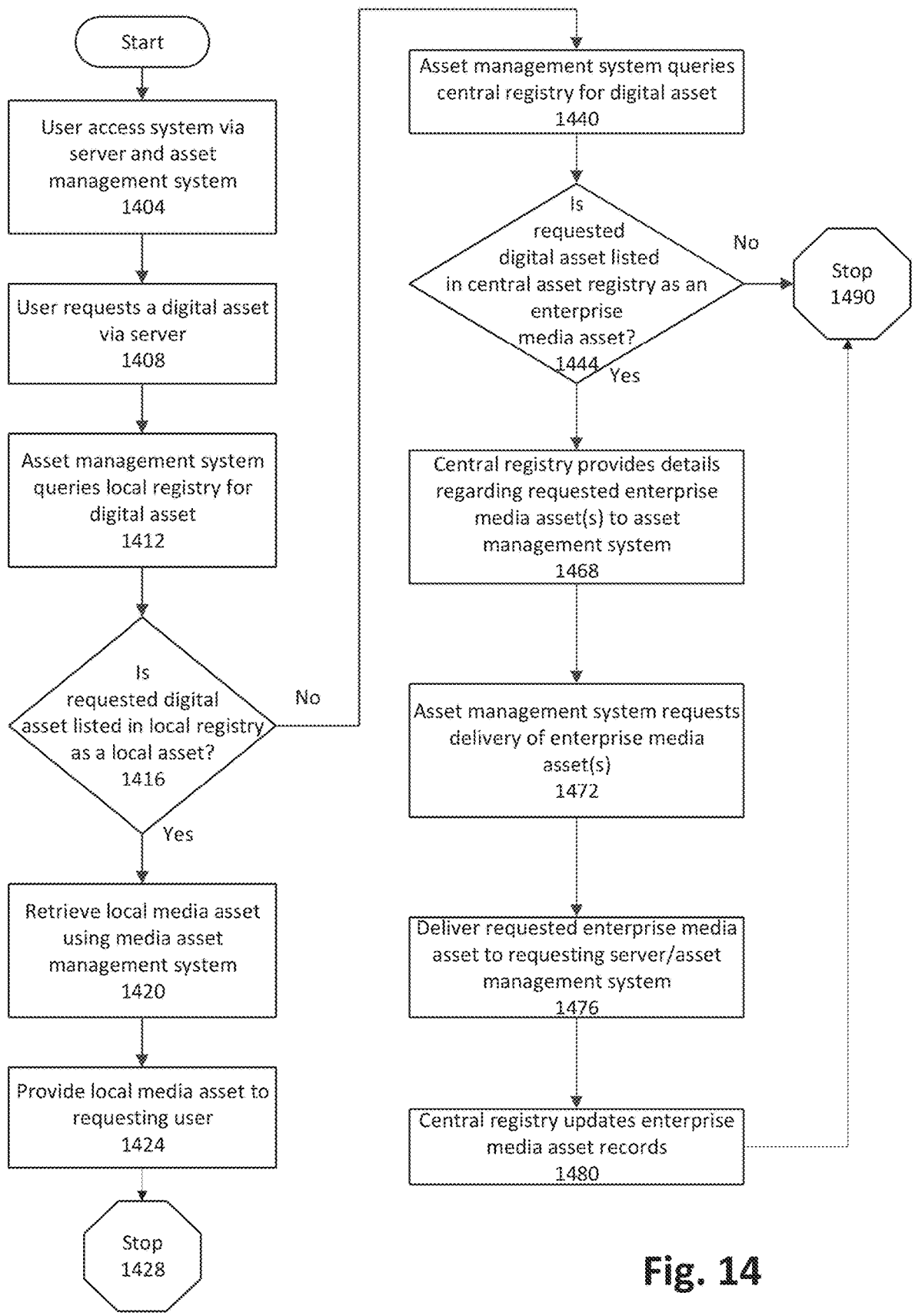
FIG. 14 shows a process flow for an example system searching and retrieving assets at satellite locations.

FIG. 14 shows a process flow and program function of the retrieval of a digital asset in one example of the claimed invention. For simplicity, Satellite B 1151 from FIG. 12 will serve as an example for the asset request process. In block 1404, a user (e.g., local server 1185) accesses a media asset management system 1171. The local server can be a part of a media asset management system as shown by reference numerals 1185 and 1109 in FIG. 12, or the local server can be a different access point to the overall system.

Figure 18:
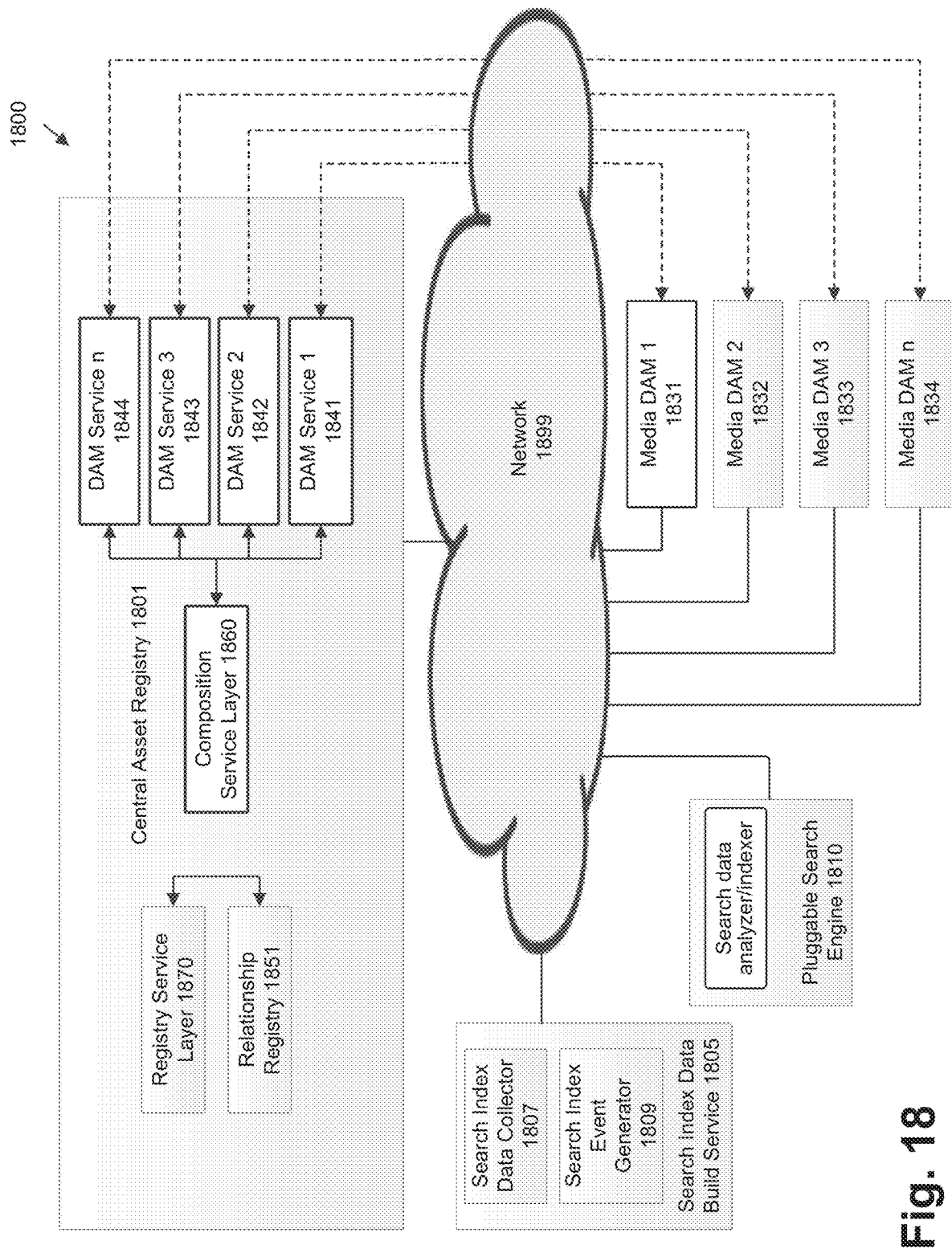
FIG. 18 shows an example search index builder system in accordance with the media search invention.

As shown in FIG. 18, the search index data build service 1805 is comprised of a search index data collector 1807 and a search index event generator 1809. The search index data collector 1807 constructs a cross-referenced representation of each asset present in each of the satellite MAM systems 1831, 1832, 1833, 1834 by using the relationship registry 1851 component of the central registry 1801 to identify and query data for related assets and entities (in one example, actors, production companies, and production managers, among many, may be the related data) and then provide the linked data from the plurality of MAM systems 1831, 1832, 1833, 1834 to a (pluggable) search engine 1810, which processes that data into an optimized search index. The search engine 1810 can be a bespoke component or a commercial product, so long as it is able to respond to a query and return representations of the media assets, including information about related assets, to the requestor.

A component of the search index data build service 1805 is a search index event generator 1809 that notifies interested parties when changes recently made to assets are reflected in the search data. This occurs during an incremental or partial search index build.

Figure 19:
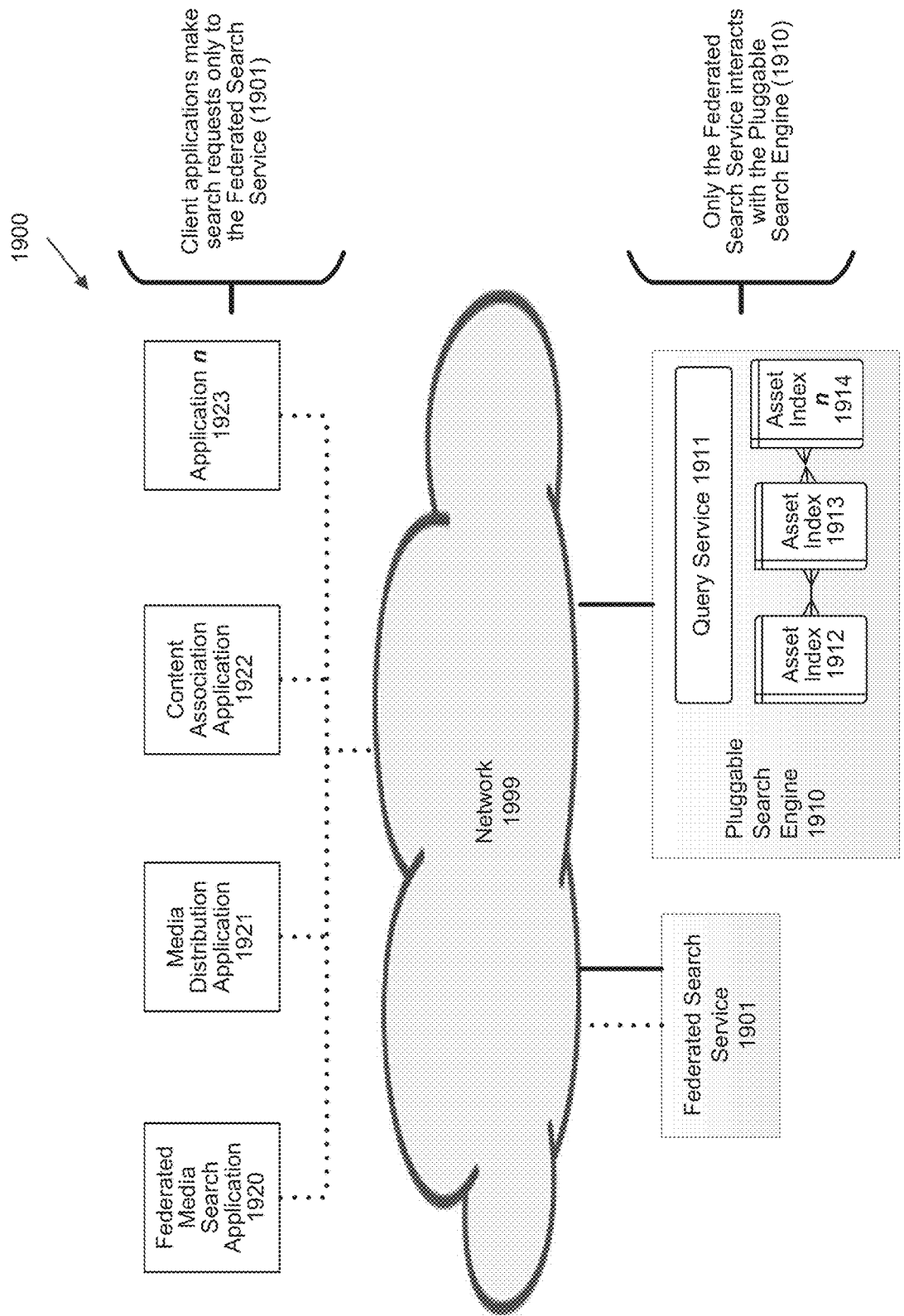
FIG. 19 illustrates a simplified component drawing of a media search system in accordance with the invention that includes a federated search service that is a service implementation over a separate, pluggable search engine.

FIG. 19 depicts elements of the invention related to search once the relevant data has been provided to the search engine 1910. A separate federated search service 1901 provides an independent programming interface to the search engine 1910, regardless of the underlying data presentation of the search index, or the search engine 1910 analyzing that data. The federated search service 1901 can be called by programs that wish to query for and retrieve assets (and their relationships) from the plurality of media DAM systems.

The federated media search application 1920 is a chief consumer of the federated search service 1901 and provides additional functions to initiate relevant business workflows on assets that the user finds and retrieves through the combination of user interface elements in the federated media search application 1920 and other applications (including media distribution application 1921, content association application 1922, and other applications 1923) and the multi-media asset search capabilities exposed by the federated search Service 1901. These types of client applications 1920, 1921, 1922, 1923 make search request to the federated search service 1901 rather than to the pluggable search engine. In turn, the federated search service 1901 interacts with the pluggable search engine 1910.

Figure 20:
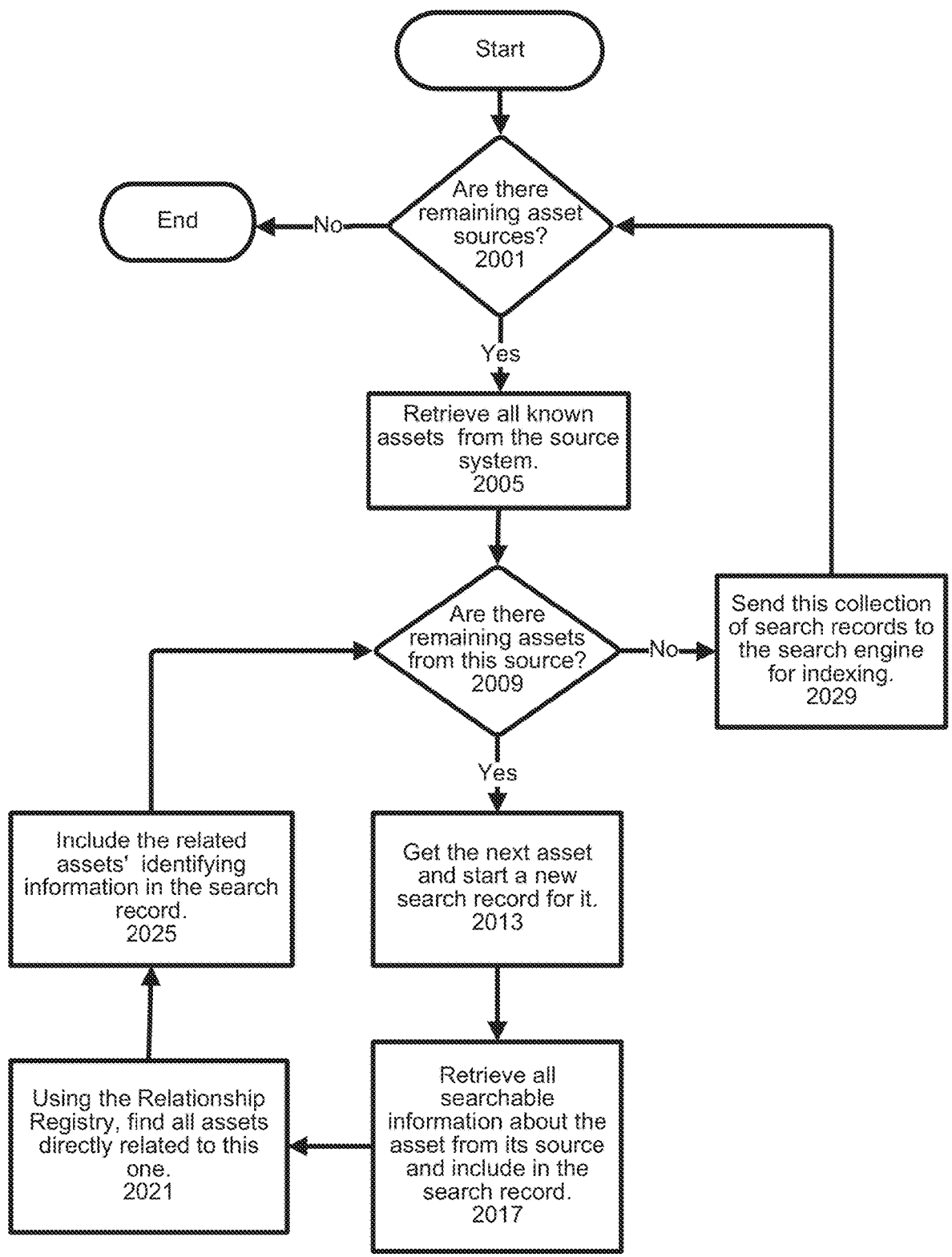
FIG. 20 shows an example algorithmic process of an example implementation of a full search index build process in accordance with the invention.

FIG. 20 shows an example process flow for the construction of a searchable index or indices comprised of digital asset identifiers, attributes and/or metadata (searchable properties) and relationships to other digital assets (and information germane to each).

For each satellite registry (e.g., 1113, 1163 in FIGS. 11, 12), the search index data build program (service 1805 in FIG. 18) begins in block 2005 by retrieving a single digital asset (i.e., record of the asset) from the satellite registry 1113, 1163 as well as additional asset attributes and/or metadata (that which has been designated as searchable).

The search index data build service 1805 then in block 2017 looks up that asset in the central (asset) registry (1801 in FIG. 18), where information about relationships to other digital assets are stored, and (in blocks 2021 and 2025) constructs a list of all of the asset's parents, siblings and children, as well as which source/satellite registry would be the system of record for each related asset. For each of those related assets, the search index build program 1805 retrieves additional information about that asset from the appropriate satellite registry of record until all familial relationships are exhausted (in block 2009).

Once that process is complete for a single satellite registry, the search index build program 1805 records all of that information in a record or other form suitable for a search index to scan and analyze. The search index build program 1805 then proceeds to the next satellite registry and repeats the process, so that for each satellite registry, a search index containing all of the information pertinent to that type of asset, as well as "cross-references" to assets in other search indices is created.

Note that satellite registries might contain information and attributes about digital assets, or they might contain information about other entities, such as people, organizations, geographic locations, as examples.

In one example implementation of the invention, a user enters any pertinent information into a search text field. The search application (related to the pluggable search engine 1810) then makes a request to the search engine 1810, for each known asset or entity type, to query for matching records. The search application organizes the results of the different queries by asset or entity type. In this fashion, a user can explore the federated digital asset inventory (for example, searching for "condo", and finding all shows with "Condo" (or similar) in the title or description, all talent with "condo" (or similar) in the name, all recipes authored by anyone with "condo" (or similar) in the name or containing ingredients with or like "condo" (e.g. "condiment"), or companies related to any of the digital assets (e.g., Conde Naste) and so on. For each search result, a small subset of pertinent information is displayed. The displayed subset of information regarding the search results can be customized based on user preferences, common search results, rights to the content, and other use and workflow factors.

A user selects a single search result (of any type) of the displayed results to obtain further information. Because each of the constructed search indices contains cross-referenced information to other assets and entities, this information can be easily displayed to users. Examining a specific television episode, for example, the user can view not only details of that episode (e.g., its title, listing description, etc.), but related information such as the rights associated with the episode, when the episode has aired, the people who appeared on the episode, the production company that shot the episode, the show to which the episode belongs (and which season), any still images of the talent, set, location for that episode, and other related information.

As shown in block 1408 of FIG. 14, users can request a digital asset by searching for an asset or by displaying a list of available assets based on user-chosen criteria. The user (such as local server 1185) uses APIs provided by the media asset management system 1171 to initiate a query.

In block 1412, the media asset management system 1171 in turn queries the satellite registry 1163 to get a list of assets known to the satellite matching the user query parameters. The system can return an asset list that displays asset metadata characteristics including asset title, thumbnails (for graphical assets), asset size, asset location, IP rights, and other asset criteria that can be specified by users. Satellite B Registry 1163 has a view of all local media assets 1153 as well as an access point (via registry service access point 177) that provides access to the central asset registry 101 for an enterprise-wide view of all enterprise media assets, including those enterprise media assets 1155 that reside in satellite B 1151, enterprise media assets 1105 that reside in satellite A 1101, and enterprise media assets that reside in other satellite locations and in other media DAMs, including Media DAMs 131, 132, 133, 134, and the like. The requesting location (that is, satellite B 1151) receives the location information and the rights constraints of the requested digital asset from the central asset registry 101. The located media assets can then be retrieved by satellite B if they reside in other locations.

When a requested digital asset is listed in the satellite B registry 1163 as a local media asset 1153, local server 1185 can retrieve the local media asset 1153 using satellite B media asset management system 1171 as shown in block 1420. The satellite B media asset management system 1171 can request authentication credentials (e.g., passwords, certificates, biometric access controls, and the like) from the requesting user prior to retrieving and providing the local digital asset to the requesting user in block 1424 and stopping the process in block 1428.

In the case in block 1416 that a requested digital asset is not listed in the satellite B registry 1163 as a local media asset 1153, local server 1185 via asset management system 1171 can query the satellite B registry 1163 to in turn query the central registry 101 using registry access point 177 as shown in block 1440. In block 1444, the central registry 101 checks to determine if the requested digital asset in listed in the central asset registry 101 as an enterprise asset. Since the central registry 101 has a global view of inventory and metadata for enterprise assets, the local satellite registry 1163 can be updated with global inventory information via a single, efficient call. That is, the system does not have to poll the various other satellites in response to individual requests to present a global view.

If the requested digital asset is not listed in the central registry as an enterprise media asset (e.g., the requested digital asset does not exist, was not found, could not be identified, and the like), the process stops at block 1490.

If the requested digital asset is listed in the central registry as an enterprise media asset, the process continues to block 1468.

For available enterprise media assets, in block 1468, the central registry 101 reports the location information, the security constraints, and the IP rights constraints of the requested digital asset back to the satellite registry 1163 which in turn passes the information to the local server 1185 via the media asset management system 1171.

If the local media asset management system 1171 already has a copy of the physical asset in the proper format and the MD5 (or other cyclic redundancy check) of the local file matches the metadata values returned from block 1468, the process can continue on to block 1476. The caching of the physical assets locally combined with CRC values to verify the file is currently dramatically reduces the load on the network, especially for large media files.

If the local media asset management system 1171 does not have a local copy of the physical asset, a list of inventory locations retrieved as part of the block 1468 data is presented to the local user server 1185. The local server may then either access the physical file remotely (as in retrieving from a remote cloud storage locations) or request a copy as shown in block 1472. The request involves the local media asset management system 1171 calling the service layer entry point 166 (see FIG. 11) to retrieve an authoritative copy from the relevant DAM 131, 132, 133, or 134.

In block, 1476, the located enterprise media assets can then be retrieved by satellite B if they reside in other locations. The central asset registry 101 and/or the media asset management system satellite B media asset management system 1171 can request authentication credentials (e.g., passwords, certificates, biometric access controls, and the like) from the requesting user prior to retrieving and providing the local digital asset to the requesting user in block 1476.

Since the physical asset for media files may be quite large, various technologies are leveraged in moving a copy of the physical asset from DAMs 131-134 to the local media asset management system 1171. Another innovation of the system is the ability to leverage third party tools that specialize in the error free movement of large media files.

Should the physical local asset or the other copies located elsewhere not be in the required format, the local media asset management system 1171 can initiate a transcode of the physical asset. Such a new physical asset may be held as a local-only asset in the satellite 1151 or may be go through the registration process described previously in FIG. 13.

Lastly should the physical asset be copied to Satellite B MAM 1171, the central registry 101 is updated as shown in block 1480 and the process stops in block 1490. By updating the central registry 101 when a copy of the physical asset is sent to Satellite B, the central registry maintains a global inventory of all copies of the physical asset.

In some embodiments of the invention, the requesting server/asset management system may know in advance that certain authentication information is needed to receive the enterprise media asset. In those cases, passwords, certificates, and other authentication information can be provided along with the original request for the enterprise media asset.

Previous systems required the management of the physical asset and IP rights to be managed by the same system or vendor architecture. By separating the management of the physical asset and the rights into separate systems along with using service wrappers like the satellite registry service layer 1111 and 11157, users are not locked into a single vendor's product or architecture. Each satellite MAM repository (1107 or 1171) and satellite registry (1113 or 1163) can be a different commercial product made by different companies, for example. The central asset registry pulls the assets together and is authoritative for relationships between enterprise assets and IP rights of enterprise assets.

Central Search Technical Architecture

FIG. 19 provides a simplified component drawing of a system 1900 with a federated search service 1901 that is a service implementation over a separate, pluggable search engine, such as search engine 1910. The search engine may be a commercial product or bespoke. Expertise, cost and other factors will influence which approach is taken, and these factors can vary over time, resulting in transitioning between commercial products, from bespoke to commercial, or vice versa. The pluggable engine 1910 includes a query service 1911 to allow clients to submit search requests and includes one or more search indices 1912, 1913, 1914. As a component of the overall media search invention, the search indices can represent different (types of) media assets as well as related entities (such as people and organizations, for example) and that those separate indices include information provided by the relationship registry (1851 in FIG. 18) that allows them to be federated and cross-referenced, such that a record in Asset Index 1912, for example, contains enough information to look up related assets in Asset Index 1913. Like the underlying Media DAMs, the indices can represent different asset types, different subsets of the same asset type sourced from different systems (e.g., geographically distributed source systems), and other subsets of assets. A subsequent discussion describes how the search indices are built in accordance with the invention.

Although the pluggable search engine 1910 may be implemented as a single program running on a single computer server, in one example implementation it is implemented as a cluster of multiple network servers, each running the search engine program/application for purposes of availability, reliability, and scalability. Each network server with the pluggable search engine 1910 executing on it operates on the same data as all others, and with client search queries being randomly directed to any member of the cluster.

The federated search service 1901 provides an application programming interface that insulates client applications from the underlying implementation of the search engine. It can expose the asset types independently, or as a single search service that operates across all of the underlying asset subsets. It communicates with the pluggable search engine 1910 over a computer network 1999. While in practice, it is beneficial for the federated search service 1901 to be in close network proximity to the pluggable search engine 1910, it is not required.

In one example implementation, the federated search service 1901 exposes an application programming interface (API) that allows clients to query for each of the known asset types individually, as well as a generic search capability that retrieves information about one or more assets, regardless of type.

The federated search service 1901 can be implemented as a single program running on a single computer server, but in one example implementation of the invention, the federated search service 1901 includes multiple computer servers running the federated search service 1901 for purposes of availability, reliability and scalability. In one example implementation, the federated search service 1901 executes on multiple computer servers, each running the federated search service 1901 and capable of conducting requests to one or more pluggable search engines 1910.

Client computers (not shown separately) communicate with the federated search service 1901 over a computer network 1999. Clients can include applications whose sole purpose is inventory exposure and exploration 1920, as well as other programs 1921, 1922, 1923 that seek to retrieve information about one or more media assets.

Building a Logically Federated, Cross-Referenced Media Search Index

The goal of the search index builder system 1800 shown in FIG. 18 is to collect and federate the asset data from the plurality of media DAMs 1831, 1832, 1833, 1834, in combination with the relationship data provided by the relationship (registry) service layer 1870 such that the entire inventory of media assets and associated entities (e.g., people, organizations, locations) is represented such that the pluggable search engine 1810 can construct a logical, queryable representation of all assets present in the plurality of media DAMs 1831, 1832, 1833, 1834 and to leverage known relationships between assets to provide a mechanism for associative search.

The term "associative search" here is intended to convey the notion that, in the absence of knowledge of the underlying asset or entity to be retrieved, a user can use information about a related asset to retrieve it, and then use the known relationships to locate the underlying asset or entity for which the user is ultimately searching.

As an example, in one implementation, a user might be trying to obtain information about a specific television episode but have no specific information about the date (or dates) that the episode aired, or even the title of the episode. However, if the user knows the name of the Show of which the episode belonged, the user can retrieve the Show, and then from the Show, examine all Seasons (chronologically grouped episodes) for that Show. If the user has no information at all about when the episode aired, the user can still examine all Seasons of the Show. In each season, the user can examine all episodes of that Season. In this manner, the user can find the target episode without knowing any specific information that would allow the episode to be retrieved directly. In this example, only via its association to other known assets (Shows or Seasons) can the episode be located.

It is these two characteristics: the federation of a plurality of media DAMs and other data sources and the knowledge of the relationships between the various media assets and entities made available via the central repository system that constitute the core underlying capabilities and applications of a media asset search component in accordance with the invention. The media search application (see FIG. 19, reference numeral 1920) further utilizes these capabilities in novel and useful ways.

Returning to FIG. 20 provides a simplified algorithmic outline of one example implementation of a full search index build process in accordance with the invention. The phrase "full search index" indicates that the searchable information for all media assets and related entities is generated "from scratch." A more selective, incremental index update is also described subsequently. Heuristically speaking, this algorithm proceeds from the edge of the system—from the individual satellite DAMs—and proceeds inward to the central relationships registry in order to determine the identifiers of related assets so that the asset type indices can be cross-referenced such that if media asset 1 is related to media asset 2, that media asset 2 is listed as a related asset in the search record of media asset 1, even if it is of a different (asset) type.

The process begins in block 2005 with the search index builder program retrieving a list of all managed assets from one of the satellite media DAMs. Due to the flexibility of the central asset registry architecture, this can be accomplished in a number of fashions: from the central registry's composition service layer (FIG. 1, reference numeral 160) through any of the DAM services (FIG. 1 reference numerals 141, 142, 143, 144) or directly from the satellite DAMs themselves (FIG. 1 reference numerals 131, 132, 133, 134).

In one example implementation, a mixture of all these DAM access methods is utilized. Some data is retrieved through the composition service layer from commercial/proprietary DAMs with specialized interfaces, while other data is retrieved directly from bespoke-developed DAMs.

The process continues when remaining assets from this source exist in block 2009, and for each asset known to that media DAM, a new search record is started as shown in block 2013. The process continues by retrieving all searchable information about that asset from the source DAM in block 2017, and that information is added to the new search record. Examples of searchable information of a media type can include its title, the geographical origin of the media, a list of the people participating in the media content, the name of the person or people that created the media as well as technical characterizations of the media and system "audit" information (e.g., the date and time the record for the media asset was created in the internal systems, and by whom; and/or the date and time the record was last updated).

In one example implementation, it is in the satellite DAMs that relationships between media assets and people and organizations are stored. In another example implementation, those relationships can be maintained by the relationship registry across the plurality of media DAMs. In an alternative implementation, the relationships between some of the media assets are stored in the underlying media DAMs, and determining the full breadth of relationships both within and between media asset types includes merging the relationship data in some of the individual media DAMs with that relationship data stored in the relationship registry.

Returning to FIG. 20, next, all of the relationships of the current asset to other assets is obtained from the relationship registry 1851 in block 2021. For each related asset, the relationship type and identifying information for that asset are also included in the current search record as shown in block 2025. If there are remaining assets known by the current satellite DAM in block 2009, these steps (blocks 2013-2025) are repeated until the list of assets managed by the satellite DAM is exhausted, at which point in block 2029 this collection of like-asset search records is provided to the search engine (FIG. 18, reference numeral 1810) for analysis, profiling and indexing.

The process repeats itself beginning in block 2001 until all sources of media assets (i.e., satellite DAM systems) are exhausted, and a collection of like-asset search records from each source has been provided to the search engine for indexing.

In environments with many different types and numbers of media assets, this can be a time-consuming and computationally expensive process. For these reasons, the indexed search data can quickly become stale. Updates to assets in the satellite DAM systems are not reflected in the indexed search data in a timely fashion. For this reason, an incremental search index update process was developed that leverages the asset event stream (FIG. 1 reference numeral 185) of the central asset registry.

Figure 21:
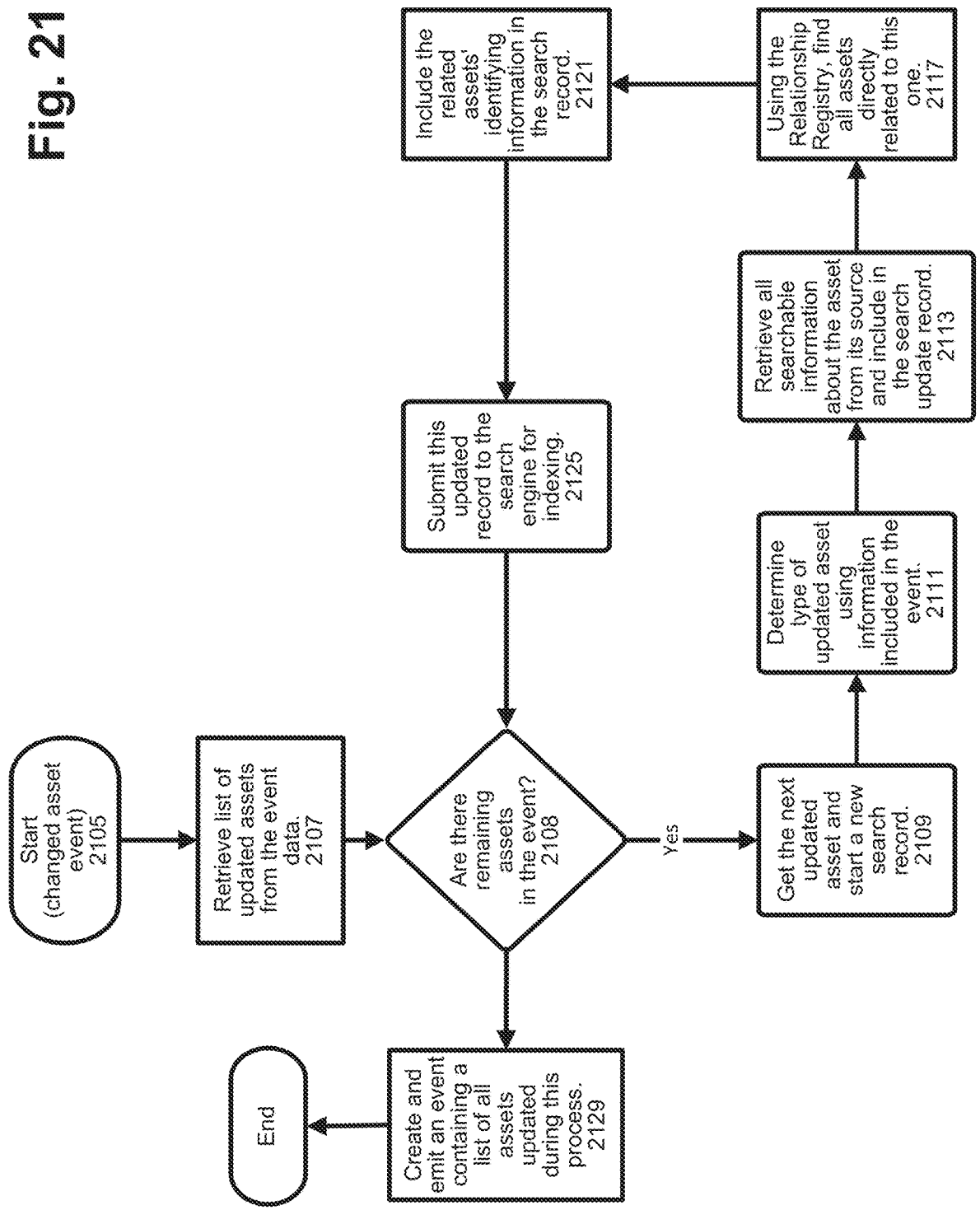
FIG. 21 illustrates an example incremental update process in accordance with the media search invention.

FIG. 21 illustrates an example incremental update process. As expected, many of the same steps are involved in this incremental update process but are limited to assets described in the change event. Note, that for this process to proceed in this form, the search engine itself supports partial updates of constructed search indices.

Starting in block 2105, in one example implementation, an event in the event stream produced by the central asset registry captures a change to a single asset, so that the list of assets described in block 2107 is a single asset. However, an additional component monitors that event stream and singularizes multiple events occurring over a limited window in time and produces a derivative event that includes information for all the assets updated during that window in time. In an additional example implementation, the event produced by the central asset registry and carried over the event stream can include multiple events.

When additional assets remain in the event in block 2108, the process continues to block 2109 where the next updated asset is found and a new search record is started. In block 2111, the system determines the type of updated asset using information included in the event, and in block 2113 the system retrieves all searchable information about the asset from its source and includes it in the search update record. The system then uses the relationship registry to find all assets directly related to the (current) asset in block 2117. The search record is further constructed in block 2121 where the related assets' identifying information is included in the search record. In block 2125, the updated record is submitted to the search engine for indexing. The process (blocks 2109-2125) repeats when there are remaining assets in the event in block 2108. Otherwise, in block 2129 the system creates and sends an event including a list of all assets updated during the process, and the process ends.

Removing Sensitive Content from Schedules

It is sometimes desirable for content to be withheld from the public because current events make that content distasteful. For instance, a natural disaster may have struck a location, and content that references that location might be temporarily pulled from distribution in consideration of audiences who have family or friends harmed in the disaster.

Figure 16:
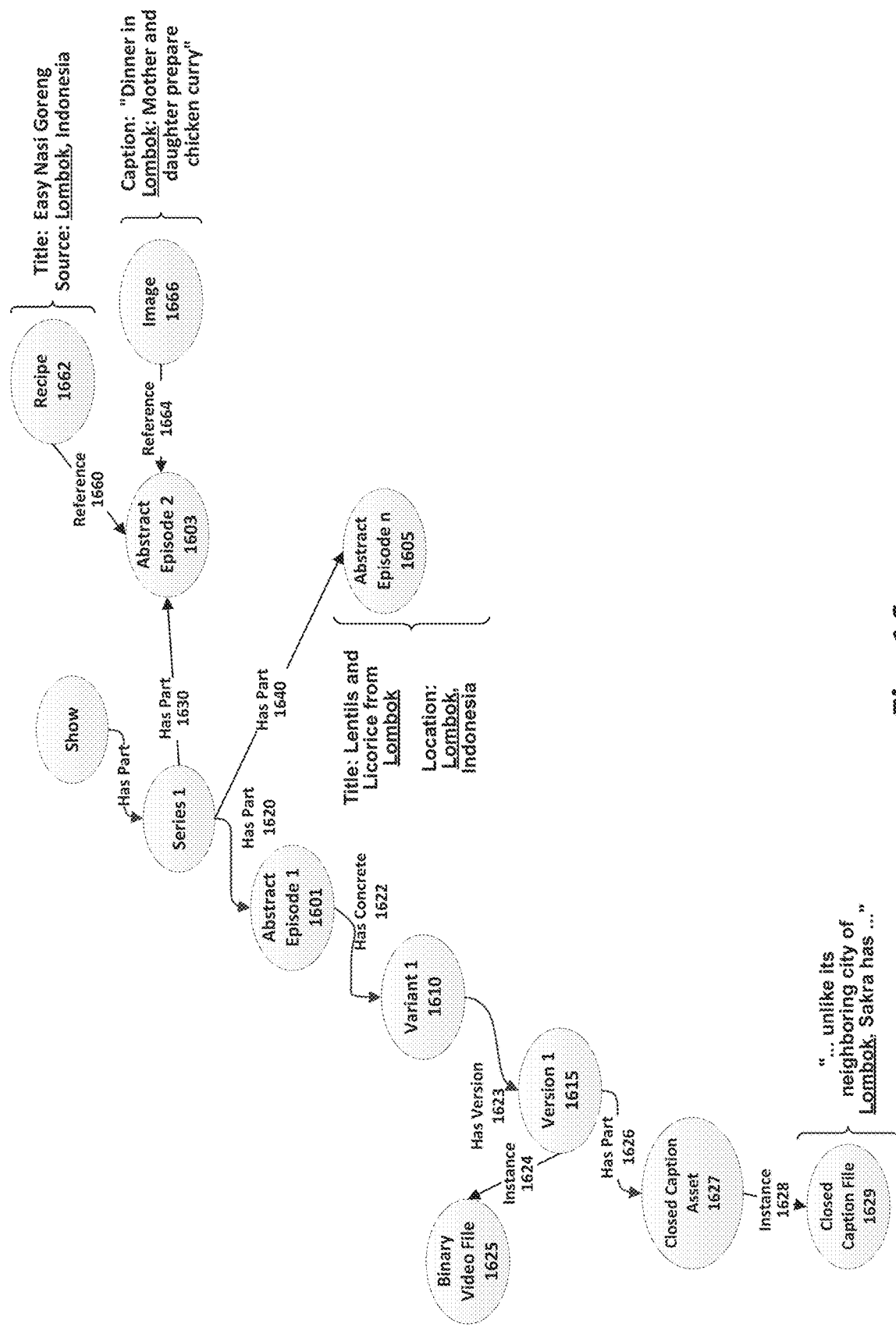
FIG. 16 is an adaption of FIG. 4, depicting properties and relationships in an example media search system of the invention for removing sensitive content from programming schedules.

In a first example, a user can use the federated search application 1920 (in FIG. 19) to search for "Lombok," a city in Indonesia. The search engine 1910 can identify all media assets with "Lombok" in the title, or in other relevant information, such as the location where the media was recorded. As shown in FIG. 16, episodic content, titles, and locations are associated and stored at the "abstract episode" representation. Because the search index data is built by traversing relationships (shown in FIG. 16) provided by the relationship registry (e.g., reference numeral 151 in FIGS. 1 and 1851 in FIG. 18). The search application is able to identify not just the abstract episode as matching "Lombok," but different variants and versions of the abstract episode (e.g., episodes in different video formats or edited for different time or sponsorships). The search engine 1910 then returns this information to the search application 1920.

Additionally, all programs in the United States have accompanying closed caption information and quite often programs distributed internationally have subtitle or caption files. Closed caption files are also media assets and are managed independently in a DAM in the plurality of satellite DAMs federated by the central asset registry (such as central asset registry 101 in FIG. 1 or 1801 in FIG. 18). In one example implementation of the invention, the text of the closed caption files is also indexed by the search engine 1920, so that any program mentioning the word "Lombok" in the dialogue of the show can be identified. And further, using the "Has Part" relationship (e.g., 1630), that closed caption media asset can be linked back to the version with which it is associated. By determining whether any "Variant" relationship(s) exist to other versions, related programs in a different video format can be identified.

As introduced above, FIG. 16 is an adaption of FIG. 4, depicting the properties and relationships in one example system that illustrate this use case. The term "Lombok" is present in the closed caption text file 1629 (i.e., " . . . unlike its neighboring city of Lombok, Sakra has . . . ."). The "Instance" relationship 1628 links that closed caption file to the closed caption asset 1627. By virtue of the "Has Part" relationship 1626, the closed caption asset 1627 is linked to an episode "Version 1" 1615. Following the "Has Version" relationship 1623, the "Version 1" asset 1615 is linked to a "Variant" node 1610 representing a distinct video format (Variant 1). Further, following the "Has Concrete" relationship 1622 results in search result #1: Abstract Episode 1601.

Automated matching against either the audio tracks of the "Binary Video File" 1625 or image-based recognition of "Lombok" in the video frames can also score a match, and that following the "Instance" relationship 1624 to the "Version 1" 1615 and through the "Has Version" relationship 1623 to "Variant 1" 1610 and ultimately through the "Has Concrete" 1622 relation to "Abstract Episode 1" 1601. This can be an alternate path to including Abstract Episode 1 1601 as a search result, or potentially a duplicate result if multiple paths to the episode are present.

Additionally, in "Abstract Episode n" 1605, the term "Lombok" appears in both the title and location metadata for the asset (i.e., Title: "Lentil and Licorice from Lombok" and Location: "Lombok, Indonesia"). Abstract Episode n 1605 is search result #2.

Following similar logic and leveraging the relationship registry (e.g., 151 and 1851) to identify related media assets (regardless of which satellite Media DAM in which they are managed), one can just as easily identify recipes related to "Lombok," images related to those recipes, and broadcast episodes in which those recipes are featured.

In FIG. 16, the "Recipe" asset 1662 has metadata ("Source") that includes the "Lombok" term (i.e., "Source: Lombok, Indonesia"). Following the "Reference" relationship 1660 to the "Abstract Episode 2" 1603 to which it is associated, results in search result #3.

Similarly, in FIG. 16, the Caption metadata for the "Image" asset 1666 includes the term "Lombok." (i.e., "Dinner in Lombok: Mother and daughter prepare chicken curry"). Following the "Reference" relationship 1664 to the "Abstract Episode 2" 1603 to which it is associated, results in a duplicate of search result #3.

Although video programs feature heavily in these examples, note that no single media asset type is required. A recipe can be related to an image and still have the properties of both the recipe and the image (as well as the nature of the relationship) indexed for search purposes.

In this manner, all episodes, images, and recipes featuring the term "Lombok" in their descriptive metadata or as part of the actual content of the media are returned by the federated media search application (1920 in FIG. 19), noting that such entities span a plurality of Media DAMs and that, additionally, the relationships between the entities (e.g., between Recipe 1662 and Image 1666 to Abstract Episode 2 1603) are also known and returned.

Furthermore, any of the media assets (e.g., recipe, image, episode, and other media assets) can be related to a person, either through a "Has Part" relationship or a specific role that person may have in that particular media asset. For example, in FIG. 16, "Bobby Smith" can be shown as related via a "Host" relationship to "Abstract Episode n" 1605) or an organization, such as a Publisher. Those entities as well, can be managed in a satellite system that—while not a Media DAM per se—would participate as a satellite system and participate in relationships with managed media assets.

Searching for Content Associated with Talent

It is common to search for inventory content that features or mentions a specific person for promotional or legal purposes, for example. For instance, a celebrity talent might be returning to host a new show, and marketing staff might want to re-run prior content featuring that celebrity in concert or in preparation for the new show launch.

In the first example, a user can use the federated media search application (1920 in FIG. 19) to search for "Bobby Smith," a prior host of one or more Shows. The search engine 1910 can identify all media assets with a relationship to the person "Bobby Smith" or assets with "Bobby Smith" in the descriptive metadata for the media asset. Episodic content, titles, and descriptions are associated and stored at the "abstract episode" representation. Because the search index data is built by traversing relationships provided by the relationship registry (151, 1851) the federated media search application 1920 identifies not just the abstract episode as matching "Bobby Smith" but different variants and versions of the abstract episode (e.g., in different video formats or edited for a different time or sponsorship).

Additionally, most programs have accompanying closed caption or subtitling information with text representations of the program's dialogue. These text files are also media assets and are managed independently in a DAM as a part of the plurality of satellite DAMs federated by the central asset registry. In one example implementation of the invention, the texts of the closed caption files are also indexed by the search engine, so that any program mentioning the words "Bobby Smith" can be identified. And further, using the "Has Part" relationship, that closed caption media asset can be linked back to the "concrete episode" with which it is associated. By determining whether any "Variant" relationship(s) exist to other "concrete episodes," related programs in a different video formats can be identified.

Figure 17:
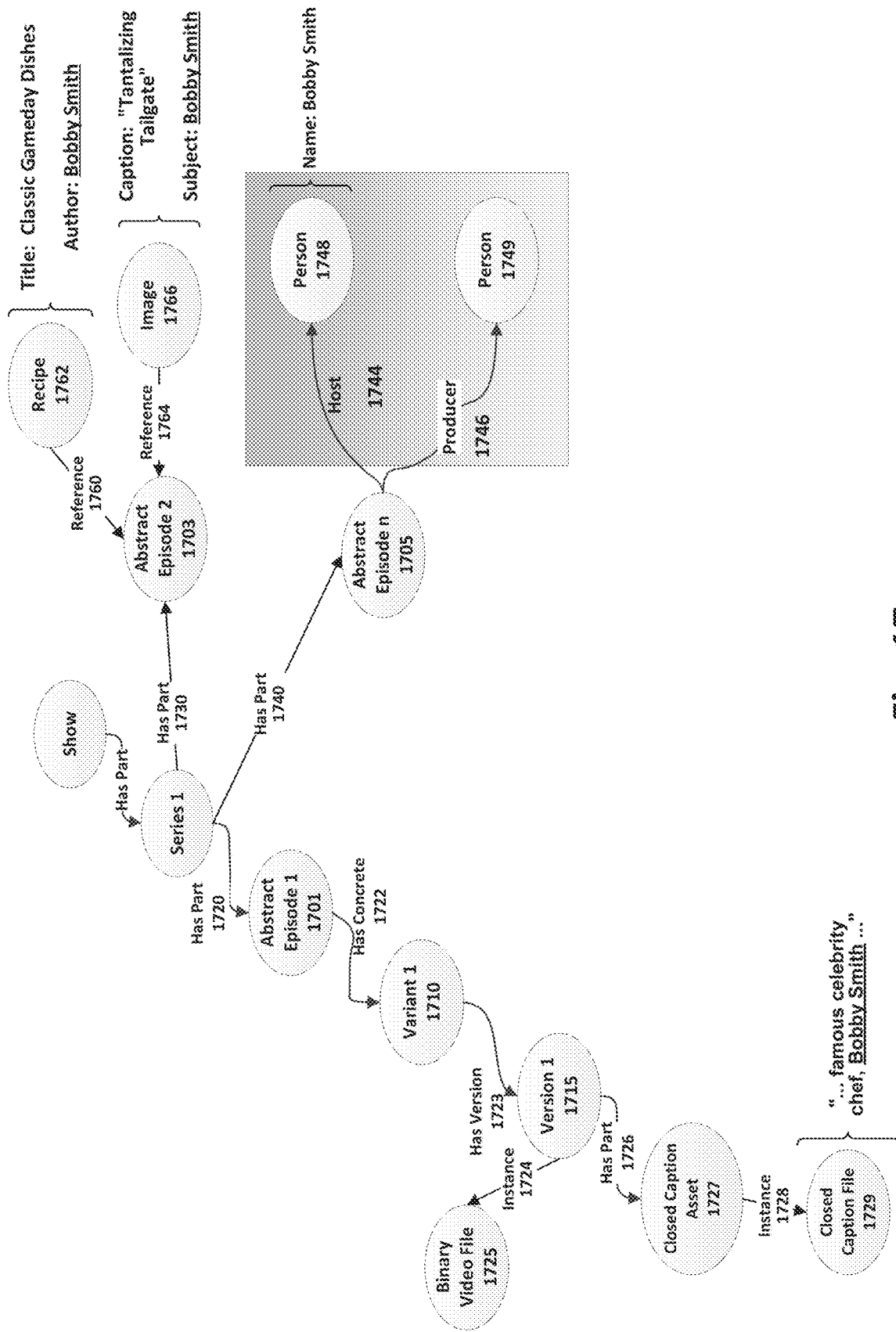
FIG. 17 is a further adaptation of FIGS. 4 and 16 and illustrates an example search system of the invention for searching for content associated with talent.

FIG. 17 is an adaptation of FIG. 16, depicting the properties and relationships in one example system that has been used to illustrate an example of searching for content associated with talent. The name "Bobby Smith" is present in the closed caption text file 1729 (i.e., " . . . famous celebrity chef, Bobby Smith . . . ."). The "Instance" relationship 1728 links that closed caption file to the closed caption asset 1727. By virtue of the "Has Part" relationship 1726, the closed caption asset 1727 is linked to an episode "Version" (e.g., "Version 1" 1715). Following the "Has Version" relationship 1723, the "Version" asset 1715 is linked to a "Variant 1" node 1710 representing a distinct video format. Further following the "Has Concrete" relationship 1722 results in search result #1: Abstract Episode 1 1701.

Continuing with an example in FIG. 17, automated matching against either the audio tracks of the "Binary Video File" 1725 or to facial recognition of Bobby Smith in the video frames can also score a match, and that following the "Instance" relationship 1724 to the "Version 1" asset 1715. "Version 1" 1715 has a "Has Version" 1723 relationship to the "Variant 1" asset 1710. It, in turn, is linked to "Abstract Episode 1" 1701 via the "Has Concrete" relationship 1722 between the "Abstract Episode 1" asset 1701 and the "Variant 1" asset 1710. This can be an alternate path to including Abstract Episode 1 1701 as a search result, or potentially a duplicate result if multiple paths to the episode are present.

Additionally, "Abstract Episode n" 1705 has a "Host" 1744 relationship to the "Person" entity 1748. The name attribute of the Person entity is "Bobby Smith." Due to relationship of the person to Abstract Episode n by virtue of the "Host" relationship 1744, Abstract Episode n 1705 is search result #2.

Following similar logic and leveraging the Relationship registry (151, 1851) to identify related media assets (regardless of in which satellite Media DAM they are managed), one can just as easily identify recipes related to "Bobby Smith," images related to those recipes, and episodes that feature those recipes.

For example, in FIG. 17, the "Recipe" asset 1762 has metadata ("Author") that includes the name "Bobby Smith." Following the "Reference" relationship 1760 to the "Abstract Episode 2" 1703 to which it is associated, results in search result #3.

Similarly, in FIG. 17, the Subject metadata for the "Image" asset 1766 includes the (Subject) name "Bobby Smith." Following the "Reference" relationship 1764 to the "Abstract Episode 2" 1703 to which it is associated, results in a duplicate of search result #3.

In this manner, all episodes, images, and recipes featuring the name "Bobby Smith" in their descriptive metadata or as part of the actual content of the media are returned by the federated media search application 1920, noting that such entities span a plurality of Media DAMs and that, additionally, the relationships between the entities (e.g., Recipe 1762 and Image 1766 to Abstract Episode 1703) are also known and returned.

Initiating Other Workflows

In many instances, a user is searching for media assets in order to complete some business function that is related to that media asset. The invention builds upon its knowledge of the asset returned in a search result in combination with the knowledge that the central asset registry system has of the underlying media DAMs to provide a mechanism for the user to perform a variety of actions on that media asset. Prior to the invention, a user would need to have access and knowledge of the source DAMs and/or other business systems and applications in order to complete those actions.

Figure 22:
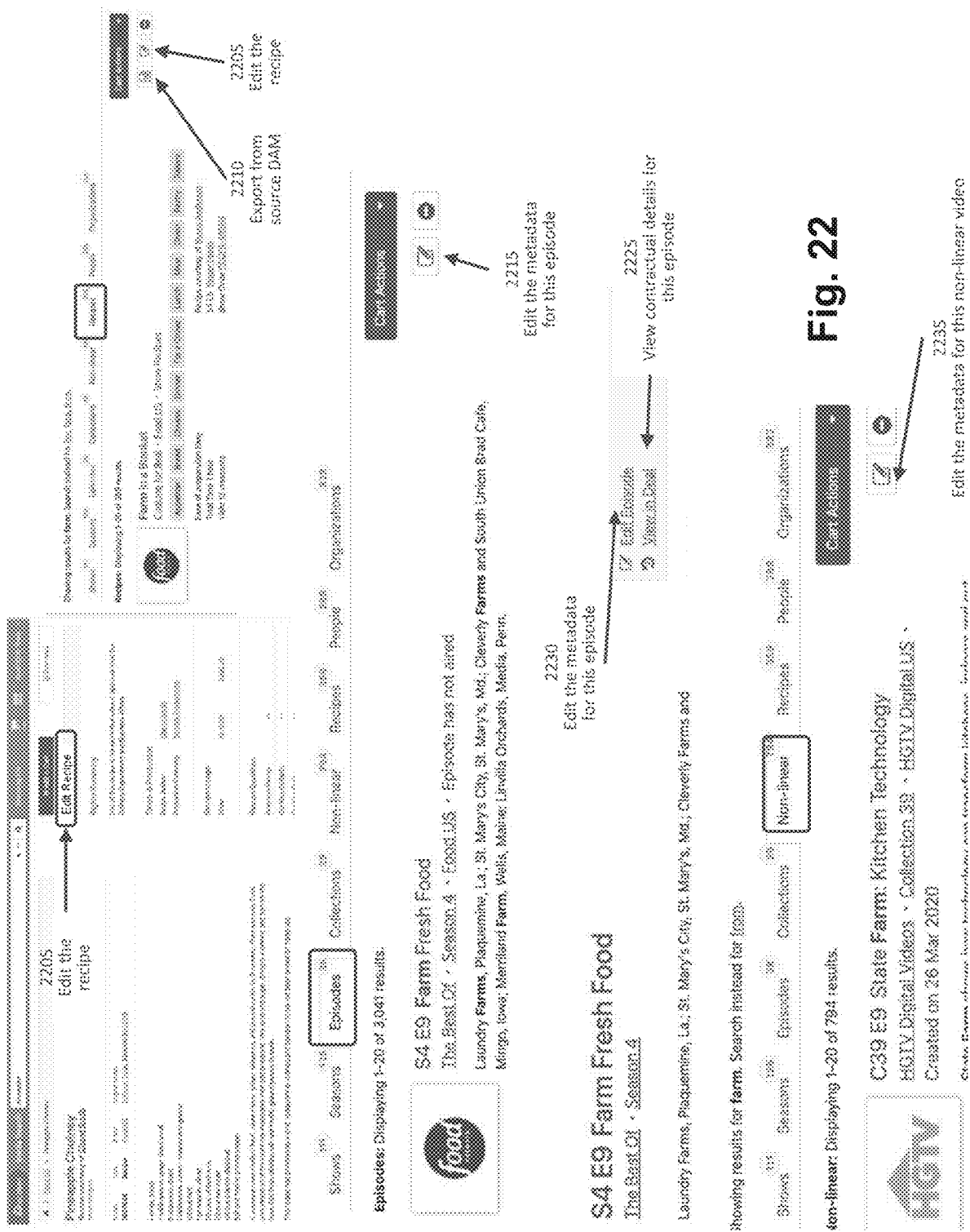
FIG. 22 shows an example implementation of the media search invention and mechanisms to edit available information in a media asset, including a recipe.

In one example implementation of the invention, for any recipe that is returned as a search result, the user is provided multiple mechanisms to edit the available information in the recipe (e.g., author, title, servings, ingredients, preparation steps, and other recipe information) with an example editing icon 2205 illustrated in FIG. 22. In doing so, the federated media search application 1920 transfers the user directly to the exact spot in the culinary application (a DAM for digital recipes) in which the recipe metadata can be changed, without guidance from the user. In other words, the user does not need to have knowledge or familiarity with the structure or navigation of the culinary application that manages recipe assets because the search application is aware of all recipe-related identifiers for the recipe media asset. The search application transfers that information to the culinary application, which initializes processing within the specific recipe.

In one example implementation of the invention, the search application provides a simple mechanism (e.g., a button 2210 next to the search result) that will export and download the recipe in a different digital format from the source DAM. This is also illustrated in FIG. 22.

In one example implementation, for any video that is returned as a search result, the user is provided multiple mechanisms to edit the available information in the video (e.g. title, description, associated talent, keyword classifications, and other video attributes) with examples 2215 also illustrated in FIG. 22. In doing so, the search application directs the user to the exact spot in the video metadata application (e.g., a DAM for digital video) in which the video metadata can be changed, without guidance from the user. In other words, the user does not need to have knowledge or familiarity with the structure or navigation of the video metadata application that manages video assets because the search application is aware of all video-related identifiers for the video media asset and transfers that information to the video metadata application, which is then able to initialize its processing with the specific video.

In one example implementation, the search application allows the user to easily view the contractual agreement that provided for the commission of the episode. Once again in this case, the user does not need to have knowledge or familiarity with the structure or navigation of the digital DAM that manages media contracts because the search application is aware of all video-related identifiers for the video media asset and transfers that information to the system that makes, retrieves, and displays contractual information, which is then able to initialize its processing with the specific video. FIG. 22 illustrates an editing mechanism 2225 in the search result details that allows the user to view the contractual details for the episode.

In one example implementation, using like capabilities to Episode metadata editing, the search application provides multiple mechanisms 2215, 2230 for editing the available descriptive metadata for a Season of a television show.

In one example implementation, using like capabilities to Episode and Season metadata editing, the search application provides multiple mechanisms (e.g., 2235) for editing the available descriptive metadata for a television show.

Thus far the discussion has focused on initiating workflows upon a single media asset, but the invention also provides capabilities of adding media assets to a virtual "shopping cart" (referred to as a "Media Cart") upon which the user can initiate actions in bulk against a group of media assets.

Figure 23:
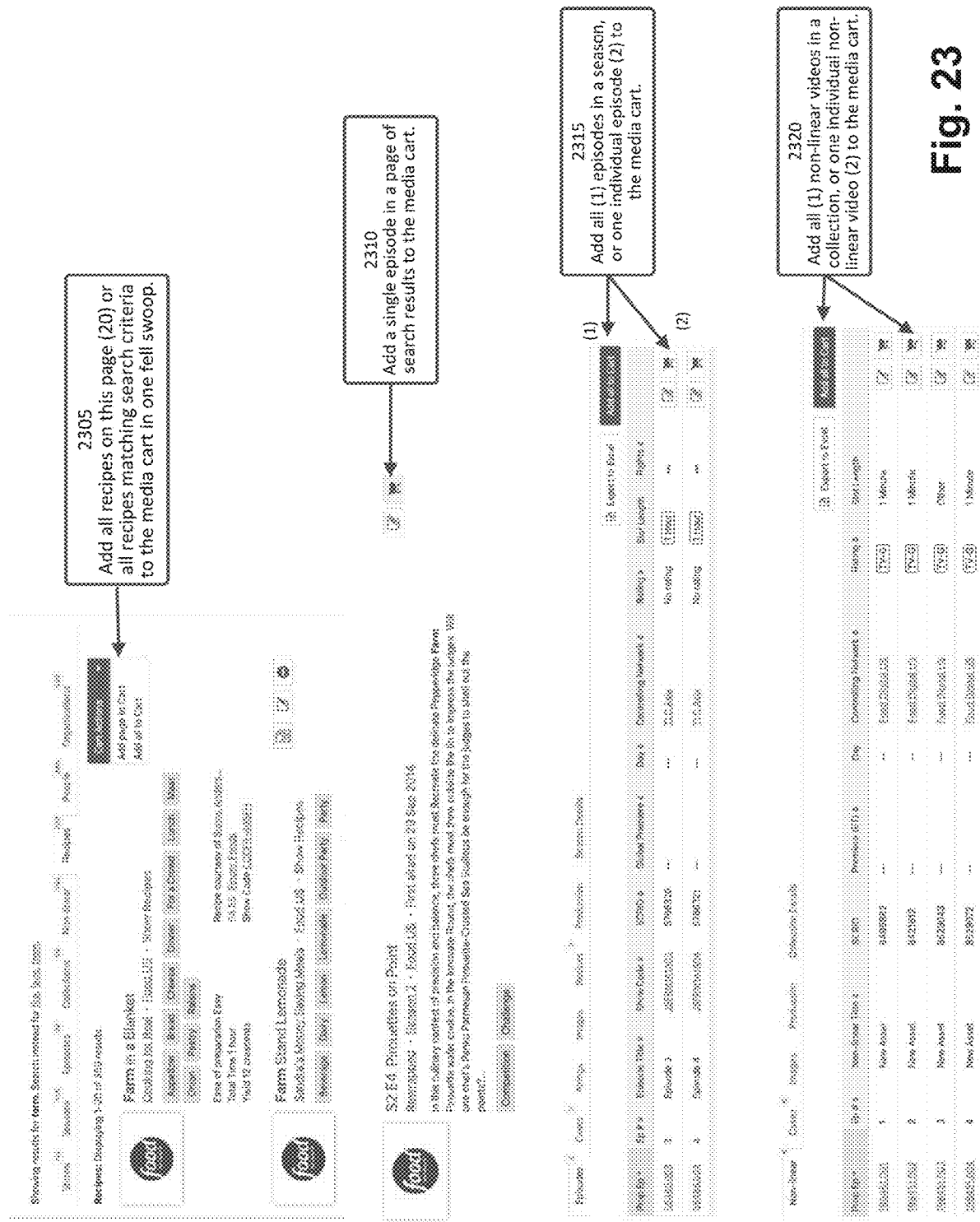
FIG. 23 shows an example implementation of the media search invention and mechanisms to add media assets to a media cart.

The Media Cart can include a heterogeneous collection of media assets, though the search application presents them segregated by asset type. The search application provides multiple mechanisms to add media assets to the Media Cart singularly and in bulk. Several examples are depicted in FIG. 23. For example, Cart Actions 2305 can be performed to add all 20 recipes on the page or all recipes matching search criteria to the media cart as one action. Additionally, a single episode in a page of search results can be added 2310 to the media cart. Further, an example 2315 where all episodes in a season or one individual episode can be added to the media cart, and another example 2320 where all non-linear videos in a collection or one individual non-linear video can be added to the media cart.

Users can perform actions on the collection of media assets for a given asset type. Some actions apply to all media asset types. Others apply to a single type or subset of media asset types. In one example implementation, users can request a video transcode (i.e., converting a video encoded in one format or specification to another) be performed on a video or videos. In one implementation users can bulk edit the metadata for a program, changing the location or categorical classification of all episodes to the same value in one action.

In one example implementation, users can review the list of assets of a given type present in the media cart as a file readable by other applications, such as Microsoft's Excel.

The central asset registry can manage enterprise assets in a variety of media asset management systems, including satellite locations. Assets in the satellite locations can be registered as local media assets outside the view of the enterprise, or can be registered as enterprise media assets and tracked and utilized as a part of the enterprise under the watch of the central registry. The system does not need to move physical assets from satellite locations to other databases or repositories. The central asset registry provides an enterprise-wide view of all the enterprise assets. In this manner, system network traffic is minimized, there are fewer calls to access and move assets, and the assets can be stored most efficiently.

The creation of a central asset registry separate from the individual repositories is key in providing a pluggable architecture with the ability to plug in different repositories by geographic location, asset type, or other considerations as business needs change. The use of a graph database for the central asset registry offers optimized speed and flexibility to traverse relationships and add new relationship types.

We claim:

1. A computerized media search system for searching, viewing, and organizing content and metadata of digital assets in a distributed repository framework, the system comprising:
   a processor for executing applications stored in a non-transitory computer-readable medium, the applications comprising:
      a search index data collector service that
         constructs a linked cross-referenced representation of enterprise digital assets stored in a plurality of federated repositories based on relationship attributes of the enterprise digital assets which are stored in a relationship registry; and
         provides the linked cross-referenced representation of the enterprise digital assets in the plurality of federated repositories to a search engine,
   wherein the system includes local digital assets and the enterprise digital assets, and
   wherein the linked cross-referenced representation is created only for the enterprise assets.

2. The system of claim 1 further comprising:
   a federated search service that provides an independent programming interface to the search engine and services queries and retrieval requests for the enterprise digital assets from the plurality of federated repositories.

3. The system of claim 2 further comprising:
   a federated media search application that initiates workflows and operations on the enterprise digital assets from the plurality of federated repositories as a result of the queries and retrieval requests.

4. The system of claim 1 further comprising:
   a central registry of digital assets, wherein the central registry of digital assets receives digital asset rights attributes, relationship attributes, asset identifiers, and location attributes concerning the enterprise digital assets from at least one of the plurality of federated repositories based on metadata tags of the enterprise digital assets when an enterprise digital asset is saved to at least one of the plurality of federated repositories.

5. The system of claim 1 wherein the relationship attributes of the digital assets are stored in a relationship registry component of a central registry.

6. The system of claim 5, wherein the relationship registry includes an asset relationship hierarchy for rapid navigation across enterprise digital assets incorporating multiple media types.

7. The system of claim 1, wherein the cross-referenced representation of the enterprise digital assets in the digital asset management system is a graph database.

8. The system of claim 7, wherein the graph database includes graph objects corresponding to relationship attributes of the enterprise digital assets and a categorization of the graph objects representing a relationship hierarchy of the enterprise digital assets.

9. The system of claim 7, wherein, the graph database includes a property graph data model with nodes, relationships, rights, properties, and labels in a relationship hierarchy of the enterprise digital assets.

10. The system of claim 1,
   wherein information corresponding to the enterprise digital assets are stored in at least the federated repository and a satellite repository, and
   wherein the satellite repository maintains information corresponding to a local digital asset with metadata tags.

11. The system of claim 10, wherein at least one of the set of the plurality of federated repositories and the satellite repository are located in disparate geographic locations.

12. The system of claim 10 further comprising:
   a satellite registry of digital assets, wherein the satellite registry of digital assets receives digital asset rights attributes, relationship attributes, asset identifiers, and location attributes concerning a local digital asset from the satellite repository based on the metadata tags of the local digital asset when a local digital asset is saved to the satellite repository.

13. The system of claim 12, wherein a federated media search application builds a satellite registry index of digital assets for each satellite registry by
   receiving a digital asset attribute from the satellite registry;
   searching the central registry for relationship attributes of the digital asset associated with the retrieved digital asset attribute;
   constructing a list of related digital assets and their corresponding satellite registries;
   retrieving additional digital asset attributes for each of the listed related digital assets; and
   repeating the receiving, searching, constructing, and retrieving steps for each satellite registry.

14. The system of claim 13, wherein the federated media search application further builds a satellite registry index of digital assets for each satellite registry by
   cross-referencing the received digital asset attribute and the retrieved digital asset attributes for each of the listed related digital assets across all of the satellite registries.

15. The system of claim 14, wherein, in response to a type of search query, the federated media search application
   receives a digital asset attribute that corresponds to the type of search query;
   searches the search index based on the received digital asset attribute to identify digital assets in the repositories that satisfy the type of search query; and
   returns a representation of identified digital assets corresponding to the received digital asset attributes to the search engine.

16. The system of claim 15, wherein, in response to the type of search query, the federated search service also
   receives a selection of an identified digital asset corresponding to the received digital asset attribute;
   searches the search index based on relationship attributes of the selected digital asset to identify related digital assets in the repositories; and
   returns a representation of identified related digital assets to a search engine.

17. The system of claim 16, wherein, in response to the type of search query, the federated search service also
   displays a relationship attribute of the identified related digital assets to the selected digital asset.

18. A computerized media search system for searching, viewing, organizing, and editing content and metadata of digital assets in a distributed repository framework, the system comprising:

a processor for executing applications stored in a non-transitory computer-readable medium, the applications comprising:

a search index data build service that constructs a list of enterprise digital assets from a satellite repository, collects asset attributes from each of the listed digital assets, and creates a search record for each of the listed digital assets, wherein the search record for each of the listed digital assets includes the asset attributes of the listed digital asset;

a relationship registry that determines enterprise assets related to each of the listed digital assets based upon a relationship attribute of the listed digital asset and updates the search record for each of the listed digital assets to include identifying information of the related assets, wherein the system includes local digital assets and the enterprise digital assets, and wherein the relationship attribute is created only for the enterprise assets.

19. The system of claim 18, wherein the search index data build service constructs the list of digital assets from the satellite repository using at least one of the set of a central registry composition service layer and a service layer of a satellite DAM (Digital Asset Management) repository corresponding to the satellite repository.

20. The system of claim 18, further comprising:

a federated search service that provides an independent programming interface to a search engine and services queries for the digital assets.

* * * * *